(12) United States Patent
Fukushima et al.

(10) Patent No.: US 7,428,469 B2
(45) Date of Patent: *Sep. 23, 2008

(54) THREE-DIMENSIONAL-INFORMATION DETECTING SYSTEM AND THREE-DIMENSIONAL-INFORMATION INPUTTING DEVICE

(75) Inventors: Masamitsu Fukushima, Saitama (JP); Yasuo Oda, Kuki (JP); Masamitsu Ito, Minamisaitama-gun (JP); Toshihiko Horie, Ageo (JP)

(73) Assignee: Wacom Co., Ltd. (JP)

( * ) Notice: Subject to any disclaimer, the term of this patent is extended or adjusted under 35 U.S.C. 154(b) by 134 days.

This patent is subject to a terminal disclaimer.

(21) Appl. No.: 11/252,231

(22) Filed: Oct. 18, 2005

(65) Prior Publication Data

US 2006/0253804 A1 Nov. 9, 2006

(30) Foreign Application Priority Data

Oct. 19, 2004 (JP) .............................. 2004-304742

(51) Int. Cl.
  G06F 15/00 (2006.01)
  G01B 3/22 (2006.01)
  G01B 5/20 (2006.01)
  G01B 7/28 (2006.01)

(52) U.S. Cl. ................. 702/167; 335/265; 335/209; 600/9; 600/13; 345/6; 345/419; 382/162; 382/285

(58) Field of Classification Search ............... 702/153, 702/167, 168, 192; 335/265, 209, 268; 600/9, 600/13; 345/419, 418, 6; 382/285, 162; 356/954

See application file for complete search history.

(56) References Cited

U.S. PATENT DOCUMENTS

| | | | | |
|---|---|---|---|---|
| 3,801,877 | A * | 4/1974 | Griese et al. | 361/146 |
| 4,582,955 | A | 4/1986 | Blesser | |
| 5,558,091 | A * | 9/1996 | Acker et al. | 600/424 |
| 5,646,524 | A * | 7/1997 | Gilboa | 324/207.17 |
| 6,154,196 | A | 11/2000 | Fleck et al. | |
| 6,928,383 | B2 * | 8/2005 | Fukushima et al. | 702/153 |

(Continued)

FOREIGN PATENT DOCUMENTS

EP 0 259 894 3/1988

OTHER PUBLICATIONS

Adachi et al., 'Three Dimensionally Configured SQUID Vector Gradiometers for Biomagnetic Measurement', 2003, IOP Publication, pp. 1442-1446.*

(Continued)

*Primary Examiner*—Edward Raymond
*Assistant Examiner*—Elias Desta
(74) *Attorney, Agent, or Firm*—Berenato, White & Stavish, LLC

(57) ABSTRACT

A three-dimensional-information detecting system includes a switching portion that sequentially selects sensor coils of a three-dimensional-information detecting device. Electromagnetic coupling is used to perform signal transmission and reception between the sensor coils and input coils in input elements of a three-dimensional-information inputting device which are mutually perpendicularly provided. A signal received by a selected sensor coil is detected by a detecting portion. From the detected signal, three-dimensional information, such as the position and attitude of the three-dimensional-information inputting device, is calculated by a control unit.

26 Claims, 60 Drawing Sheets

The regions identified based on the direction of an orientation vector when one coil is noted;

(1701): REGION 1
(1702): REGION 2
(1703): REGION 3
(1710): IDENTIFYING OF REFERENCE AND REVERSE SIDES BY DIRECT AND INDIRECT DETECTION
(1720): IDENTIFYING OF REFERENCE AND REVERSE SIDES AND MIRROR IMAGES BY DIRECT AND INDIRECT DETECTION

U.S. PATENT DOCUMENTS 6,952,201 B2 * 10/2005 Fukushima et al. ......... 345/174
7,171,041 B2 * 1/2007 Watanabe et al. ........... 382/154

OTHER PUBLICATIONS

Ramirez et al., 'A Method of Measuring Head Movements for the Head Postures Determination in Congenital Nystagmus', Nov. 1997, pp. 1474-1477.*

Hirata et al., '3-Dimensional Interface Device for Virtual Work Space', Jul. 1992, IEEE Publication, pp. 889-896.*

Patent Abstracts of Japan vol. 017, No. 614 (P-1642), Nov. 11, 2993 & JP 05 189136 A, Jul. 30, 1993.

* cited by examiner

111: SWITCHING PORTION
112: RECEIVING CIRCUIT
113: DETECTING PORTION
114: CONTROL PORTION
116: MEMORY
117: TRANSMISSION CONTROL PORTION
118: TRANSMITTING CIRCUIT
(101): Y-SENSOR COILS
(102): X-SENSOR COILS
(103): SELECTING UNIT
(104): SIGNAL DETECTING UNIT
(105): SIGNAL GENERATING UNIT
(106): CALCULATING UNIT (a) ONE SEQUENCE OF SCANNING
(b) TIMING FOR ONE SENSOR COIL
(c) TIMING FOR ONE FREQUENCY (fn)
(d) ATTITUDE DETECTING TIMING
(201): TRANSMISSION
(202): RECEPTION
(203): SWITCHING
(204): 103 X-SENSOR COILS
(205): 78 Y-SENSOR COILS
(206): fu SCANNING
(207): fv SCANNING
(208): fw SCANNING

S301: INITIALIZATION
S302: SELECT FREQUENCIES FOR TRANSMISSION AND RECEPTION
S303: SELECT COIL FOR TRANSMISSION AND RECEPTION
S304: GLOBAL SCANNING
S305: COMPLETED FOR 3 FREQUENCIES?
S306: COIL LEVEL CORRECTION
S307: CALCULATE X- AND Y-COORDINATES AND LEVELS
S308: CALCULATE HALF-WIDTH
S309: CALCULATE Z-COORDINATE
(301): START
(302): PERFORM SIMILAR PROCESSING FOR DEVICE COILS fu, fv, AND fw

S310: CALCULATE SIGNAL RATIOS ratio_Ux and ratio_Uy

S311: DETECT θux θuy AND CALCULATE COMPOSITE ANGLE θ

S312: CALCULATE azimuth angle $\phi_0$ IN FIRST QUADRANT

S313: CALCULATE DIRECTLY-DETECTED ORIENTATION-VECTOR COMPONENTS

S314: CORRECT θ OF Z-COORDINATE

S315: CALCULATE INDIRECTLY-DETECTED ORIENTATION-VECTOR COMPONENTS

S316: IDENTIFY DETECTION REGIONS

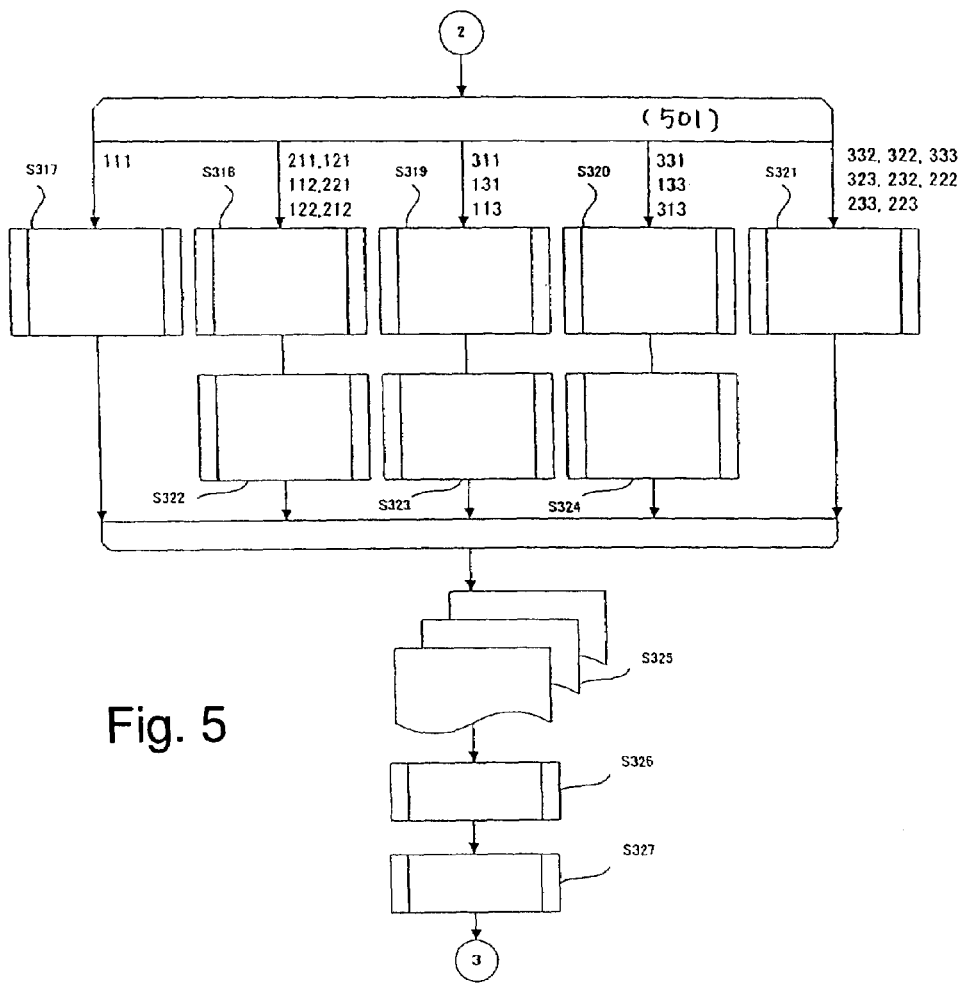

S317: IDENTIFYING OF REFERENCE AND REVERSE SIDES BASED ON ORIENTATION VECTORS (IN REGION 1)

S318: IDENTIFYING OF REFERENCE AND REVERSE SIDES BASED ON ORIENTATION VECTORS (IN REGION 1)

S319: IDENTIFYING OF REFERENCE AND REVERSE SIDES BASED ON ORIENTATION VECTORS (IN REGION 1)

S320: IDENTIFYING OF REFERENCE AND REVERSE SIDES BASED ON ADJACENT VALUES OF ORIENTATION VECTORS (IN REGION 1)

S321: EXCEPTIONAL PROCESSING BASED ON ADJACENT VALUES OF ORIENTATION VECTORS

S322: IDENTIFYING OF REFERENCE AND REVERSE SIDES AND MIRROR IMAGES BASED ON ORIENTATION VECTORS (IN REGION 2)

S323: FINDING VECTOR PRODUCT OF ORIENTATION VECTORS (IN REGIONS 3)

S324: INDIRECT DETECTION OF ORIENTATION VECTOR COORDINATES (IN REGION 3)

S325: CALCULATE AVERAGE OF WEIGHTS OF DIRECTLY DETECTED COORDINATES

S326: CALCULATE COORDINATES OF CENTER OF GRAVITY OF SPHERE

S327: GENERATE ORIENTATION VECTOR OF SPHERE (501): BRANCHING BASED ON PERMUTATIONS OF DETECTION REGIONS (1301): HEIGHT $Z_0$ (mm)

(1302): HALF-WIDTH $\Delta X$ (mm)

(1401): HEIGHT Z (mm)
(1402): ANGLE θ OF INCLINATION (DEGREES)

The regions identified based on the direction of an orientation vector when one coil is noted;

(1701): REGION 1

(1702): REGION 2

(1703): REGION 3

(1710): IDENTIFYING OF REFERENCE AND REVERSE SIDES BY DIRECT AND INDIRECT DETECTION (1720): IDENTIFYING OF REFERENCE AND REVERSE SIDES AND MIRROR IMAGES BY DIRECT AND INDIRECT DETECTION

| f v | 1 | | | 2 | | | 3 | | | |
|---|---|---|---|---|---|---|---|---|---|---|
| f u<br>f w | 1 | 2 | 3 | 1 | 2 | 3 | 1 | 2 | 3 | (1902) |
| 1 | 111 | 211 | 311 | 121 | 221 | 321 | 131 | 231 | 331 | |
| 2 | 112 | 212 | 312 | 122 | ✕ | ✕ | 132 | ✕ | ✕ | |
| 3 | 113 | 213 | 313 | 123 | ✕ | ✕ | 133 | ✕ | ✕ | |

(1801) { rows 1,2,3 on left (1903)

↓

| f v | 1 | | | 2 | | | 3 | | |
|---|---|---|---|---|---|---|---|---|---|
| f u<br>f w | 1 | 2 | 3 | 1 | 2 | 3 | 1 | 2 | 3 |
| 1 | 1 | 4 | 6 | 8 | 10 | 10 | 11 | 10 | 13 |
| 2 | 2 | 5 | 5 | 9 | ✕ | ✕ | 9 | ✕ | ✕ |
| 3 | 3 | 5 | 7 | 9 | ✕ | ✕ | 12 | ✕ | ✕ |

(1804)

(1801): REGIONS FOR COIL fw (1802): REGIONS FOR COILS fv AND fu (1803): PERMUTATIONS OF REGIONS FOR 3 COILS fu, fv, AND fw
 (ARRANGEMENT OF REGION NUMBERS IN ORDER OF fu, fv, AND fw)

(1804): SUBROUTINE NUMBERS OF PERMUTATIONS OF REGIONS FOR 3 COILS fu, fv, AND fw

Fig. 22
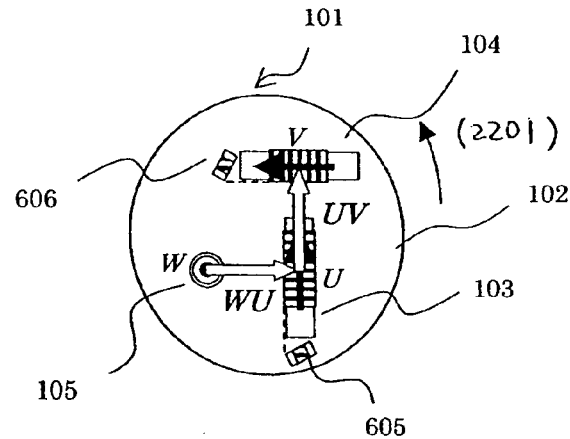
FIG. 22
(2201): ROTATION AROUND Z-AXIS
Fig. 23
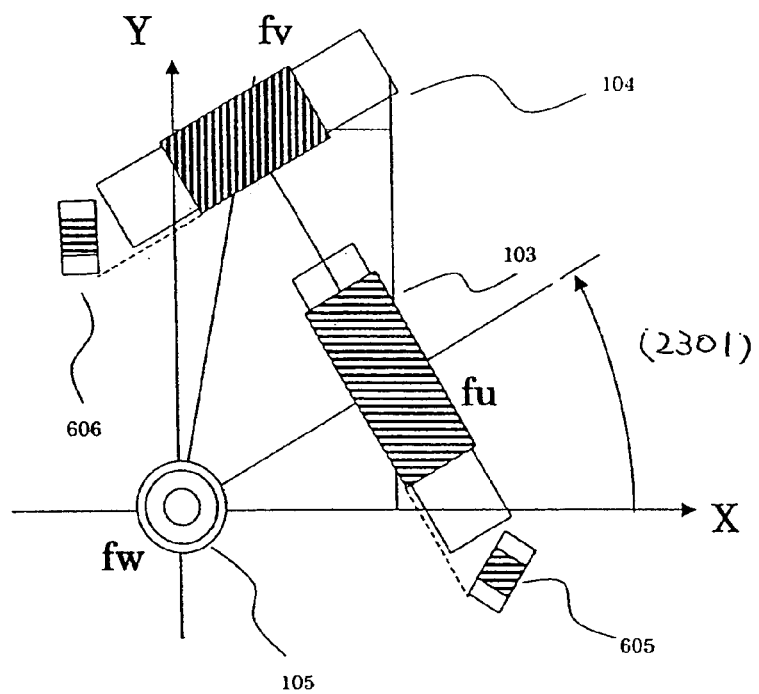
FIG. 23
(2301): ROTATION AROUND Z-AXIS Fig. 24
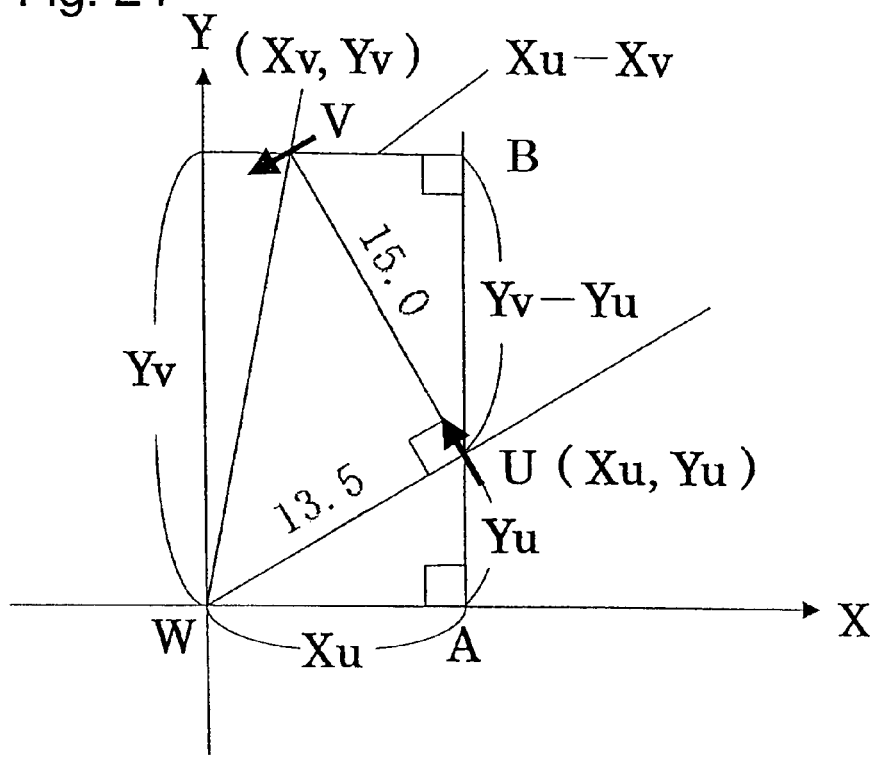
Fig. 25
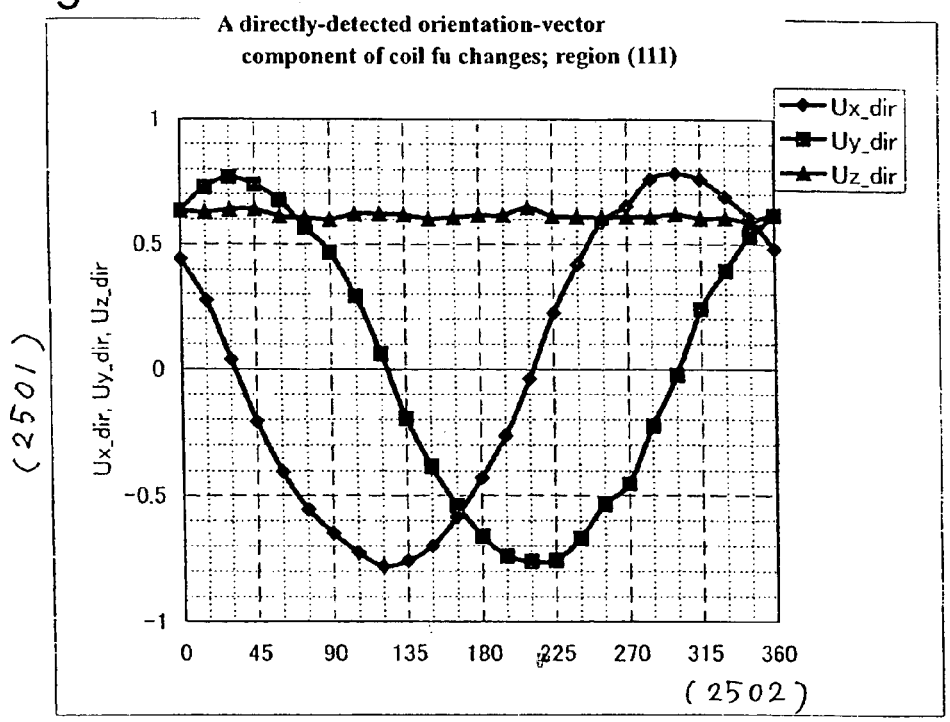
FIG. 25
(2501): DIRECTLY-DETECTED ORIENTATION-VECTOR COMPONENTS
(2502): ROTATIONAL ANGLE φ (DEGREES) IN HORIZONTAL PLANE (2601): DIRECTLY-DETECTED ORIENTATION-VECTOR COMPONENTS (2602): ROTATIONAL ANGLE $\phi$ (DEGREES) IN HORIZONTAL PLANE (2701): DIRECTLY-DETECTED ORIENTATION-VECTOR COMPONENTS (2702): ROTATIONAL ANGLE φ (DEGREES) IN HORIZONTAL PLANE (2801): INDIRECTLY-DETECTED ORIENTATION-VECTOR COMPONENTS (2802): ROTATIONAL ANGLE φ (DEGREES) IN HORIZONTAL PLANE (2901): INDIRECTLY-DETECTED ORIENTATION-VECTOR COMPONENTS (2902): ROTATIONAL ANGLE $\phi$ (DEGREES) IN HORIZONTAL PLANE (3001): DIRECTLY-DETECTED ORIENTATION-VECTOR COMPONENTS (3002): ROTATIONAL ANGLE φ (DEGREES) IN HORIZONTAL PLANE (3101): DIRECTLY-DETECTED ORIENTATION-VECTOR COMPONENTS (3102): ROTATIONAL ANGLE $\phi$ (DEGREES) IN HORIZONTAL PLANE (3201): INDIRECTLY-DETECTED ORIENTATION-VECTOR COMPONENTS (3202): ROTATIONAL ANGLE φ (DEGREES) IN HORIZONTAL PLANE (3101): DIRECTLY-DETECTED ORIENTATION-VECTOR COMPONENTS (3102): ROTATIONAL ANGLE $\phi$ (DEGREES) IN HORIZONTAL PLANE (3401): DIRECTLY-DETECTED ORIENTATION-VECTOR COMPONENTS (3402): ROTATIONAL ANGLE φ (DEGREES) IN HORIZONTAL PLANE (3501): DIRECTLY-DETECTED ORIENTATION-VECTOR COMPONENTS (3502): ROTATIONAL ANGLE φ (DEGREES) IN HORIZONTAL PLANE (3601): INDIRECTLY-DETECTED ORIENTATION-VECTOR COMPONENTS (3602): ROTATIONAL ANGLE φ (DEGREES) IN HORIZONTAL PLANE (3701): DIRECTLY-DETECTED ORIENTATION-VECTOR COMPONENTS (3702): ROTATIONAL ANGLE φ (DEGREES) IN HORIZONTAL PLANE (3801): COMPONENTS OF VECTOR BETWEEN COILS fw AND fu (3802): ROTATIONAL ANGLE φ (DEGREES) IN HORIZONTAL PLANE (3901): INDIRECTLY-DETECTED ORIENTATION-VECTOR COMPONENTS (3902): ROTATIONAL ANGLE φ (DEGREES) IN HORIZONTAL PLANE (4001): DIRECTLY-DETECTED ORIENTATION-VECTOR COMPONENTS (4002): ROTATIONAL ANGLE $\phi$ (DEGREES) IN HORIZONTAL PLANE (4101): DIRECTLY-DETECTED ORIENTATION-VECTOR COMPONENTS (4102): ROTATIONAL ANGLE φ (DEGREES) IN HORIZONTAL PLANE (4201): INDIRECTLY-DETECTED ORIENTATION-VECTOR COMPONENTS (4202): ROTATIONAL ANGLE φ (DEGREES) IN HORIZONTAL PLANE (4301): DIRECTLY-DETECTED ORIENTATION-VECTOR COMPONENTS (4302): ROTATIONAL ANGLE $\phi$ (DEGREES) IN HORIZONTAL PLANE (4401): DETECTED COORDINATE (4402): AZIMUTH ANGLE ϕu (DEGREES) OF COIL fu (4601): SIGNAL LEVEL (4602): AZIMUTH ANGLE φu (DEGREES) OF COIL fu (4701): SIGNAL LEVEL WEIGHT (4702): AZIMUTH ANGLE φu (DEGREES) OF COIL fu (4801): DETECTED COORDINATE (4802): AZIMUTH ANGLE $\phi_u$ (DEGREES) OF COIL fu (4901): DETECTED COORDINATE (4902): AZIMUTH ANGLE $\phi v$ (DEGREES) OF COIL fv (5001): MAGNITUDE AND COMPONENT OF VECTOR BETWEEN COILS fu AND fv (5002): AZIMUTH ANGLE φu (DEGREES) OF COIL fu (5101): STANDARDIZED COMPONENT OF VECTOR BETWEEN COILS fu AND fv (5102): AZIMUTH ANGLE φu (DEGREES) OF COIL fu (5201): DETECTED COORDINATE X (5202): AZIMUTH ANGLE φu (DEGREES) OF COIL fu (5301): DETECTED COORDINATE Y (5202): AZIMUTH ANGLE $\phi_u$ (DEGREES) OF COIL $f_u$ (5401): DETECTED HEIGHT Z (5402): AZIMUTH ANGLE φu (DEGREES) OF COIL fu (5901): ORIENTATION VECTOR COMPONENTS (5902): INSTALLATION COORDINATE (6001): ORIENTATION VECTOR COMPONENTS
(6002): INSTALLATION COORDINATE 7201: SWITCHING PORTION
7202: SWITCHING PORTION
7203: CONTROL UNIT
7205: MEMORY
112: RECEIVING CIRCUIT
113: DETECTING PORTION
117: TRANSMISSION CONTROL PORTION
118: TRANSMITTING CIRCUIT
(7201): Y-SENSOR COILS
(7202): X-SENSOR COILS 7301: CONTROL UNIT
7303: MEMORY
7304: SWITCHING PORTION
112: RECEIVING CIRCUIT
113: DETECTING PORTION
(7301): Y-SENSOR COILS
(7302): X-SENSOR COILS 7401: CONTROL UNIT
7403: MEMORY
7404: SWITCHING PORTION
112: RECEIVING CIRCUIT
113: DETECTING PORTION
117: TRANSMISSION CONTROL PORTION
118: TRANSMITTING CIRCUIT
(7401): Y-SENSOR COILS
(7402): X-SENSOR COILS

THREE-DIMENSIONAL-INFORMATION DETECTING SYSTEM AND THREE-DIMENSIONAL-INFORMATION INPUTTING DEVICE

CLAIM TO PRIORITY AND CROSS-REFERENCE TO RELATED APPLICATIONS

This application is related to application number 2004-304742, file Oct. 19, 2004 in Japan, the disclosure of which is incorporated herein by reference and to which priority is claimed.

1. Field of the Invention

The present invention relates to a three-dimensional-information detecting system for detecting three-dimensional information such as an input device's position and attitude in three-dimensional space, and a three-dimensional-information inputting device for inputting the three-dimensional information in the three-dimensional-information detecting system.

2. Background of the Invention

Conventionally, three-dimensional-information detecting systems that use electromagnetic induction to detect three-dimensional information, such as the position and attitude of an inputting, device in three-dimensional space, have been developed. For example, a three-dimensional-information detecting system (see, for example, Japanese Unexamined Patent Application Publication No. 2000-99259) that detects not only the attitude of an input device but also its rotational direction by using a sectorial detecting sensor has been developed.

However, in the three-dimensional-information detecting system described in Japanese Unexamined Patent Application Publication No. 2000-99259, it is difficult to detect X-, Y-, and Z-coordinates, and, in addition, complicated processing needs to be performed in order to identify reference and reverse sides of the input device. In addition, in a case in which the three-dimensional information of the input device is detected by using only mutually perpendicular sensors, which are commonly used in a magnetic induction system, it is difficult to identify the reference and reverse sides of the input device and mirror images of the input device. Thus, the above case has a problem in that it is necessary to use a sensor whose shape is a sector and which has a special and complex configuration.

In this specification, the reference and reverse sides mean that, when a certain direction of a three-dimensional-information inputting device in three-dimensional space is referred to as the reference side (or the reverse side), a direction of the inputting device at 180 degrees with respect to the certain direction is referred to as the reverse side (or the reference side). In addition, identifying of the reference and reverse sides means that, when a certain direction of the inputting device is referred to as the reference side, it is determined whether the inputting device is in a state with the reference side upward, or it is determined whether the inputting device is in a state with the reverse side upward, the reverse side having 180 degrees with respect to the reference side. In the invention described in Japanese Unexamined Patent Application Publication No. 2000-99259, when a three-dimensional-information inputting device including three input coils in a predetermined direction is directed in a certain direction, the inputting device outputs the same signal, even if the inputting device is rotated 180 degrees for one of the three input coils. In other words, when the inputting device is directed with either side upward, a sensor device detects the same signal, so that it is difficult to identify the reference and reverse sides of the inputting device.

In addition, a mirror image is an axisymmetric image based on an X-axis and/or a Y-axis when the central axis of an input coil lies on its side. When the inputting device is directed in an (x, y) direction, images that are respectively directed in a (−x, y) direction, an (x, −y) direction, and a (−x, −y) direction are mirror images. Inability to identify a mirror image means that, when the position and orientation of one input coil are noted, the one input coil cannot be distinguished from a symmetrical input coil positioned relative to the X-axis and the Y-axis. For example, in a case in which a mirror image cannot be identified, when the input coil is directed in the (x, y) direction, the level of a signal detected by the sensor device is equivalent to that obtained when the input coil is directed in the (−x, y) direction, the (x, −y) direction, or the (−x, −y) direction, so that it cannot be determined in which direction the input coil is directed.

To solve this problem, a three-dimensional-information detecting system (e.g., Japanese Unexamined Patent Application Publication No. 2000-196015) has been developed in which, by using not the sectorial detecting sensor but mutually perpendicular sensors, and sensors provided so as to obliquely cross the sensors, three-dimensional information, such as the coordinates, attitude, and rotation of an input device, can be detected.

According to the three-dimensional-information detecting system described in Japanese Unexamined Patent Application Publication No. 2000-196015, a sensor configuration can be simplified since the system has a configuration in which the oblique sensors are additionally used with the perpendicular sensors, which are commonly used in electromagnetic induction sensors. However, this three-dimensional-information detecting system also has a problem in that it is difficult in structure to determine the reference and reverse sides of the input device. This is because direct detection cannot determine the reference and reverse sides since a plurality of input coils of a pointing device are arranged in reference-and-reverse symmetrical form having no mutual eccentricity.

SUMMARY OF THE INVENTION

It is an object of the present invention to enable identifying reference and reverse sides and mirror images of a three-dimensional-information inputting device in a three-dimensional-information detecting system having a simplified configuration by providing a plurality of input coils included in the inputting device so as not to interfere with one another.

It is another object of the present invention to enable identifying reference and reverse sides and mirror images of a three-dimensional-information inputting device by a simplified configuration using the inputting device and mutually perpendicular sensors.

According to an aspect of the present invention, a three-dimensional-information detecting system is provided which includes a three-dimensional-information inputting unit including a plurality of input coils for inputting three-dimensional information, a plurality of sensor coils provided along a detecting surface so as to intersect one another, the sensor coils being electromagnetically coupled with the plurality of input coils, a selecting unit which selects sensor coils from among the plurality of sensor coils in a coil-switching manner, a signal generating unit which uses electromagnetic coupling to generate signals to be transmitted and received between the plurality of input coils and the selected sensor coils, a signal detecting unit which detects signals received by the selected sensor coils or the plurality of input coils, and a calculating unit which, based on the signals detected by the signal detecting unit, calculates three-dimensional information of the three-dimensional-information inputting unit in three-dimensional space, wherein, in the three-dimensional-information inputting unit, the plurality of input coils include first, second, and third input coils, the central axes of the first, second, and third input coils are at right angles to one another, and the central axes of the first and second input coils are coplanar.

The central position of the third input coil may be coplanar with the central axes of the first and second input coils.

According to another aspect of the present invention, a three-dimensional-information detecting system is provided which includes a three-dimensional-information inputting unit including a plurality of input coils for inputting three-dimensional information, a plurality of sensor coils provided along a detecting surface so as to intersect one another, the sensor coils being electromagnetically coupled with the plurality of input coils, a selecting unit which selects sensor coils from among the plurality of sensor coils in a coil-switching manner, a signal generating unit which uses electromagnetic coupling to generate signals to be transmitted and received between the plurality of input coils and the selected sensor coils, a signal detecting unit which detects signals received by the selected sensor coils or the plurality of input coils, and a calculating unit which, based on the signals detected by the signal detecting unit, calculates three-dimensional information of the three-dimensional-information inputting unit in three-dimensional space, wherein, in the three-dimensional-information inputting unit, the plurality of input coils include first, second, and third input coils, and the central axes of the first, second, and third input coils are at right angles to one another so as not to magnetically interfere with one another and so as not to directly intersect one another.

The first, second, and third input coils may be provided for use with a right hand.

The first, second, and third input coils may be provided for use with a left hand.

The form of the three-dimensional-information inputting unit may be a sphere, and the first, second, and third input coils may be provided in the sphere.

A composite central position of the first, second, and third input coils, and the central position of the sphere may coincide with each other.

Each input coil may have a form wound around a magnetic substance.

The first, second, and third input coils may have air cores.

The first, second, and third input coils may respectively connect to capacitors for resonance which combine with the first, second, and third input coils to form resonant circuits having different frequencies.

The three-dimensional-information detecting system may further include a plurality of series resonant circuits which are connected in series to the resonant circuits and which have resonant frequencies equal to those of corresponding resonant circuits, and a transmission signal generating circuit which generates a transmission signal. The transmission signal from the transmission signal generating circuit may be output from one input coil corresponding to one series resonant circuit by the series resonant circuit.

The three-dimensional-information detecting system may include a battery for supplying driving power to the transmission signal generating circuit.

The calculating unit may calculate at least the attitude of the three-dimensional-information inputting unit in three-dimensional space based on the signals detected by the signal detecting unit.

The calculating unit may calculate at least the coordinates of the three-dimensional-information inputting unit in three-dimensional space based on the signals detected by the signal detecting unit.

The calculating unit may calculate the attitude and coordinates of the three-dimensional-information inputting unit in three-dimensional space based on the signals detected by the signal detecting unit.

The X-coordinate and Y-coordinate of each input coil may be calculated based on at least three signals in the vicinity of a peak value in the signals detected by the signal detecting unit, and the attitude and/or coordinates of the three-dimensional-information inputting unit may be calculated by obtaining the height of the input coil from the width of signal distribution at a predetermined level value of the detected signals.

Regarding the attitude, the calculating unit may obtain the angle of inclination and azimuth angle of the three-dimensional-information inputting unit from relationships of the signals detected for the input coils by the signal detecting unit.

The calculating unit may obtain the angle of inclination and azimuth angle of the three-dimensional-information inputting unit from the sub-signal ratio of the detected signals corresponding to the input coils.

The calculating unit may obtain the angle of inclination and azimuth angle of the three-dimensional-information inputting unit from the ratios of left-and-right half-side widths of the detected signals corresponding to the input coils.

The signal generating unit may generate signals having a plurality of frequencies corresponding to the input coils, and the signals having a plurality of frequencies may be transmitted and received between the plurality of input coils and the selected sensor coils.

Signals may be transmitted from the input coils by supplying currents from the signal generating unit to the input coils, and the signal detecting unit may detect signals generated in the sensor coils.

Signals may be transmitted from the sensor coils by supplying currents from the signal generating unit to the sensor coils, and the signal detecting unit may detect signals generated in the input coils.

After signals are transmitted from the sensor coils by supplying currents from the signal generating unit to the sensor coils, the input coils may receive the transmitted signals and may send back the received signals to the sensor coils, and the signal detecting unit may detect the signals received by the sensor coils.

According to another aspect of the present invention, a three-dimensional-information inputting device including a plurality of input coils for inputting three-dimensional information is provided. The inputting device inputs three-dimensional information to a three-dimensional-information detecting device by using electromagnetic coupling to transmit and receive signals between the plurality of input coils and the detecting device, the plurality of input coils include first, second, and third input coils, and the central axes of the plurality of coils are at right angles to one another, and the central axes of the first and second coils are coplanar.

The central position of the third input coil may be coplanar with the central axes of the first and second coils.

According to another aspect of the present invention, a three-dimensional-information inputting device including a plurality of input coils for inputting three-dimensional information is provided. The inputting device inputs three-dimensional information to a three-dimensional-information detecting device by using electromagnetic coupling to transmit and receive signals between the plurality of input coils and the detecting device, the plurality of input coils include first, second, and third input coils, and the central axes of the first, second, and third input coils are at right angles to one another so as not to magnetically interfere with one another and so as not to directly intersect one another.

The first, second, and third input coils may be provided for use with a right hand.

The first, second, and third input coils may be provided for use with a left hand.

The form of the inputting device may be a sphere, and the first, second, and third input coils may be provided in the sphere.

A composite central position of the first, second, and third input coils, and the central position of the sphere may coincide with each other.

Each input coil may have a form wound around a magnetic substance.

The first, second, and third input coils may have air cores.

The first, second, and third input coils may respectively connect to capacitors for resonance which combine with the first, second, and third input coils to form resonant circuits having different frequencies.

The three-dimensional-information detecting system may further include a plurality of series resonant circuits which are connected in series to the resonant circuits and which have resonant frequencies equal to those of corresponding resonant circuits, and a transmission signal generating circuit which generates a transmission signal. The transmission signal from the transmission signal (generating circuit may be output from one input coil corresponding to one series resonant circuit by the series resonant circuit.

The three-dimensional-information detecting system may include a battery for supplying driving power to the transmission signal generating circuit. According to a three-dimensional-information detecting system of the present invention, by using a three-dimensional-information inputting device including a plurality of input coils provided so as not to electromagnetically interfere with one another, a simplified configuration enables identifying the reference and reverse sides, and mirror images of the inputting device.

In addition, by using a three-dimensional-information inputting device of the present invention, a three-dimensional-information detecting system can be constructed in which a simplified configuration enables identifying the reference and reverse sides, and mirror images of the inputting device.

BRIEF DESCRIPTION OF THE DRAWINGS

FIG. 5 is another flowchart showing the process of the three-dimensional-information detecting system according to the first embodiment of the present invention;

FIG. 22 is an illustration of the inputting device according to the first embodiment of the present invention;

FIGS. 23 and 24 are graphs showing the process of the three-dimensional-information detecting system according to the first embodiment of the present invention;

FIG. 25 is a graph illustrating region (111) in which a directly-detected orientation-vector component of coil fu changes;

DETAILED DESCRIPTION OF THE PREFERRED EMBODIMENT(S)

Figure 1:
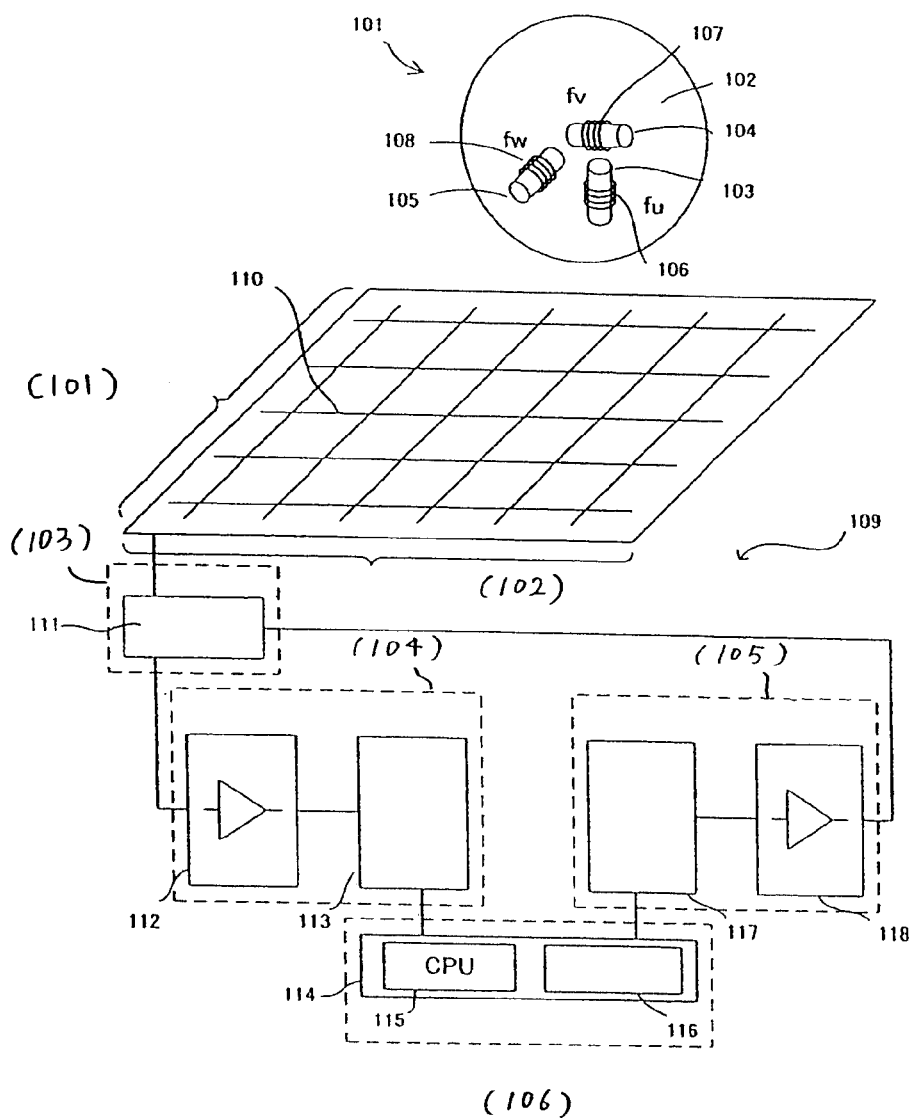
FIG. 1 is a block diagram showing a three-dimensional-information detecting system according to a first embodiment of the present invention.

Three-dimensional-information detecting systems and three-dimensional-information inputting devices according to embodiments of the present invention are described below with reference to the accompanying drawings. In the drawings concerning the embodiments, identical portions are denoted by identical reference numerals. In addition, various types of reference data (data as shown in characteristic diagrams and correcting data, which are described later) which are referred to when the coordinates and attitude of the inputting device in three-dimensional space are calculated are stored beforehand in a memory 116, which is described later.

FIG. 1 is a block diagram showing the configuration of a three-dimensional-information detecting system according to a first embodiment of the present invention. The three-dimensional-information detecting system includes a three-dimensional-information inputting device 101 (as a three-dimensional-information inputting means) for inputting three-dimensional information (e.g., an attitude such as coordinates and orientation in three-dimensional space), and a three-dimensional-information detecting device 109 (as a three-dimensional-inform detecting means) for detecting the three-dimensional information of the inputting device 101.

The inputting device 101 includes a sphere 102 and a plurality of (three in the first embodiment) input elements 103 to 105 provided in the sphere 102. In the input elements 103 to 105, input coils 106 to 108 are provided along longitudinal directions of the input elements 103 to 105. The centers of the input elements 103 to 105 coincide with the centers of the input coils 106 to 108. In the following description, for brevity of description, the input coils 106 to 108 are indicated by fu, fv, and fw, respectively.

Figure 6:
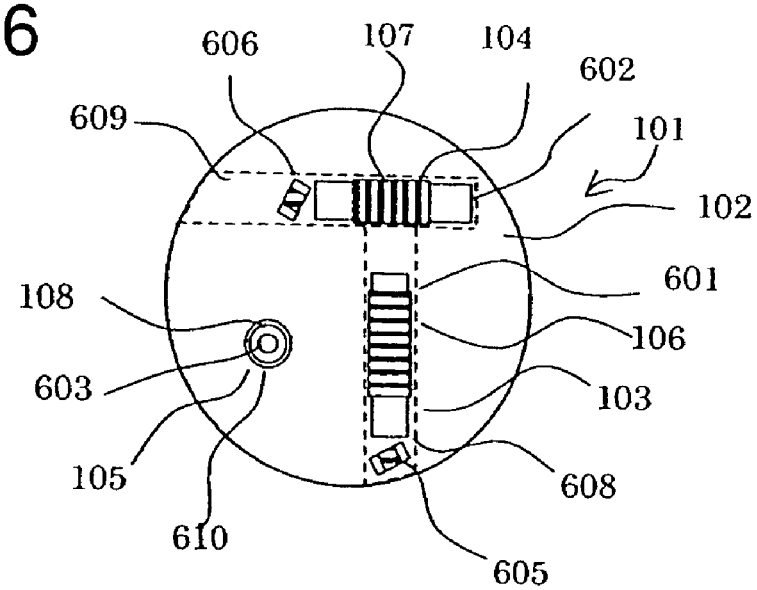
FIG. 6 is a front view of a three-dimensional-information inputting device according to the first embodiment of the present invention.
Figure 7:
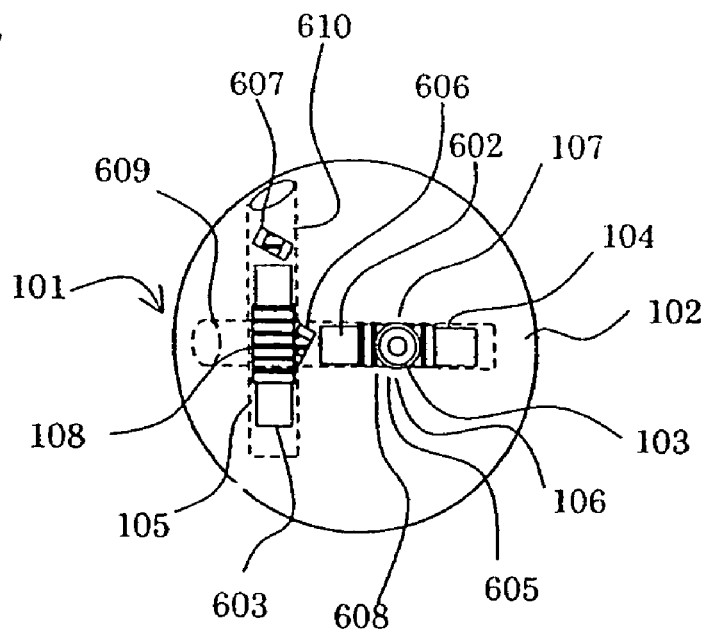
FIG. 7 is a bottom view of the inputting device according to the first embodiment of the present invention.
Figure 8:
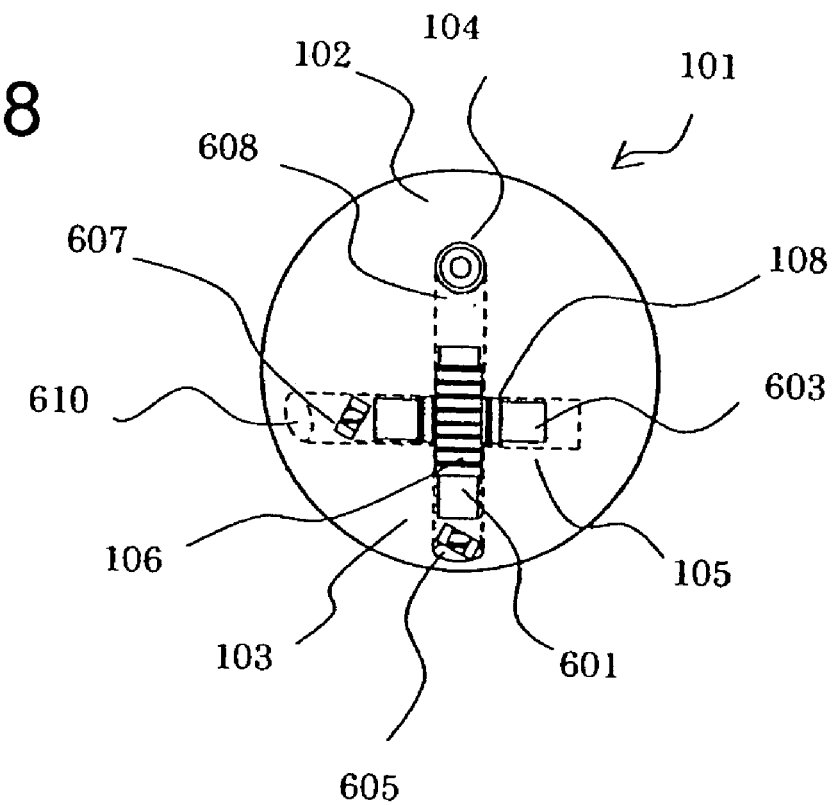
FIG. 8 is a right side view of the inputting device according to the first embodiment of the present invention.
Figure 9:
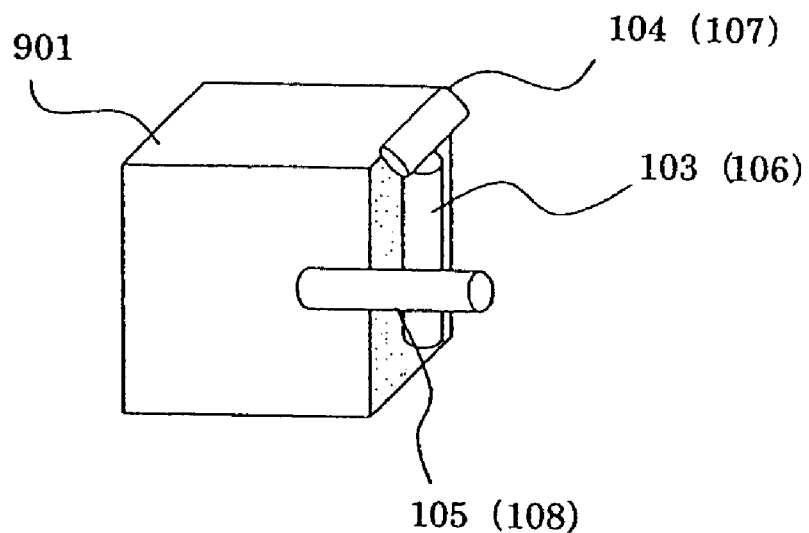
FIG. 9 is a perspective view of the inputting device according to the first embodiment of the present invention.

FIGS. 6 to 8 are illustrations of detailed configuration of the inputting device 101. FIG. 6 is a front view of the inputting device 101. FIG. 7 is a bottom view of the inputting device 101. FIG. 8 is a right side view of the inputting device 101. FIG. 9 is a perspective view illustrating the arrangement of the input elements 103 to 105 in the inputting device 101.

In FIG. 1 and FIGS. 6 to 9, the input elements 103 to 105 are provided in the sphere 102 so that axes (longitudinal central axes) passing in the longitudinal directions of the input elements 103 to 105 through the centers thereof are perpendicular to one another. The sphere 102 is made of insulating material such as resin.

As shown in FIG. 9, the arrangement of the input elements 103 to 105 is described by assuming a virtual cube 901. The input elements 103 and 104 are provided in the same plane so that their longitudinal central axes are perpendicular to each other. The input element 105 is provided so that its longitudinal central axis is perpendicular to the longitudinal central axes of the other input elements 103 to 105, with a predetermined distance provided therebetween.

In other words, a normal plane which passes through the center of the input coil 106 (the input element 103) as a first coil and which is vertical to the longitudinal axis of the input coil 106 is considered. Between the two other input coils 107 and 108, one input coil at a distance form the normal plane is called a second coil, and the other one is called a third coil. In FIG. 9, the second coil is the input coil 107, and the third coil is the input coil 108.

In the axial direction of the first input coil 106, a unit vector having magnitude 1 is considered. As the orientation of this unit vector on the reference and reverse sides, a direction in which there is the second input coil 107 (the input element 104) is selected, and this unit vector is used as an orientation vector of the first input coil 106.

Similarly, next, in the axial direction of the second input coil 107 (the input element 104), a unit vector having magnitude 1 is considered. As the orientation of this unit vector on the reference and reverse sides, a direction in which there is the third input coil 108 (the input element 105) is selected, and this unit vector is used as an orientation vector of the second input coil 107.

In addition, similarly, in the axial direction of the third input coil 108 (the input element 105), a unit vector having magnitude 1 is considered. As the orientation of this unit vector on the reference and reverse sides, an orientation that is close to the direction of a vector calculated as a vector product by multiplying the right of the orientation vector of the first input coil 106 by an orientation vector of the second input coil 107 is selected, and this unit vector is used as an orientation vector of the third input coil 108.

In the first embodiment, when a vector product that is calculated by multiplying the right of the orientation vector of the first coil 106 (the input element 103) by the orientation of the second coil 107 (the input element 104) substantially coincides with the orientation of the third coil 108 (the input element 105), it is defined that the three input coils 106 to 108 (the input elements 103 to 105) are provided in arrangement for use with a right hand. The inputting device 101 according to the first embodiment is an example of a three-dimensional-information inputting device based on arrangement for use with a right hand.

At this time, when the calculated vector product substantially coincides with a vector opposite in direction to the orientation of the third coil 108, it is defined that the three input coils 106 to 108 (the input elements 103 to 105) are provided in arrangement for use with a left hand. Although, as described below, the first embodiment is described by using an example of the inputting device 101 for arrangement for use with a right hand, even when a three-dimensional-information inputting device for arrangement for use with a left hand is used, by performing similar processing based on consideration of difference in input-coil arrangement, three-dimensional information input from the inputting device can be detected.

The input element 103 includes a core 601 formed of magnetic material, the first input coil 106, which is wound around the core 601, and a capacitor 605 connected in parallel to the first input coil 106. The input element 104 includes a magnetic core 602 formed of magnetic material, the second input coil 107, which is wound around the core 602, and a capacitor 606 connected in parallel to the second input coil 107. The input element 105 includes a core 603 formed of magnetic material, the third input coil 108, which is wound around the core 603, and a capacitor 607 connected in parallel to the third input coil 108.

The input coils 106 to 108 are wound on the cores 601 to 603 around the central portions (central positions) of the input elements 103 to 105. The first input coil 106 and the capacitor 605 constitute a first parallel resonant circuit that resonates at first resonance frequency fu. The second input coil 107 and the capacitor 606 constitute a second resonant circuit that resonates at second resonance frequency fv. The third input coil 108 and the capacitor 607 constitute a third resonance circuit at a third resonance frequency fw.

The input coils 106 and 107 are provided so that their longitudinal central axes lie in the same plane. The third input coil 108 is provided so that its central position as well as the central axes of the input coils 106 and 107 are coplanar.

In the sphere 102, cylindrical holes 608 to 610 are formed in order to hold the input elements 103 to 105 in the above arrangement, and the input elements 103 to 105 are accommodated in the holes 608 to 610 so that their positions in the sphere 102 do not shift. As described above, by arranging the input coils 106 to 108 included in the inputting device 101 so as not to mutually interfere with one another, and the detecting device 109 performs processing, which is described later, whereby identifying of the reference and reverse sides and identifying of a mirror image can be performed, and three-dimensional information, such as a position and attitude, input from the inputting device 101, can be easily detected. In addition, the inputting device 101 and the detecting device 109, which has a simplified configuration using perpendicular sensors, are used to make it possible to identify the reference and reverse sides and the mirror image, so that a simplified configuration enables detection of three-dimensional information.

In FIG. 1, the detecting device 109 includes a plurality of sensor coils 110 which are provided so as to be mutually perpendicular (in x-axis and y-axis directions in the first embodiment) in substantially the entirety of a detecting surface (the surface on the side of the inputting device 101) that is a flat top surface of the detecting device 109.

The sensor coils 110 include a plurality of sensor coils (X-sensor coils) arranged in parallel in the X-axis direction and a plurality of sensor coils (Y-sensor coils) arranged in parallel in the Y-axis direction. The sensor coils 110 are connected to a detecting portion 113 included in a signal detecting unit through a switching portion forming a switching unit that switches the sensor coils 110 and a receiving circuit 112 including an amplifying circuit. The detecting portion 113 includes a detecting circuit for detecting a received signal that detects plural types of frequency signals (frequencies fu, fv, fw in the first embodiment).

A transmission control portion 117 included in a signal generating unit includes a transmitting signal generating circuit for generating plural types of frequency signals (frequencies fu, fv, and fw in the first embodiment), and a selector circuit which selectively switches the signals generated by the transmitting signal generating circuit with predetermined timing and which outputs switched signals to a transmitting circuit 118. The transmitting circuit 118 includes an amplifying circuit, and an output end of the transmitting circuit 118 is connected to the switching portion 111.

Three types of signals having frequencies fu, fv, and fw may be simultaneously transmitted. When the three types of signals having frequencies fu, fv, and fw are simultaneously transmitted, by performing processing, such as fast Fourier transformation (FET), on the signals received by the detecting portion 113, the signal intensities of the components of the frequencies fu, fv, and fw can be calculated. In addition, when the three types of signals having frequencies fu, fv, and fw are simultaneously transmitted, a scanning time in FIG. 2, which is described later, requires a scanning time for one frequency, thus enabling a reduction in scanning time.

The detecting portion 113 and the transmission control portion 117 are connected to a control portion 114 for controlling both.

The control portion 114 includes a memory 116 that stores various types of tables and processing programs beforehand, and a central processing unit (CPU) 115 that, by executing the programs stored in the memory 116, and referring to the tables on the basis of the signals detected by the detecting portion 113, performs various types of processing such as calculation of three-dimensional information such as the coordinates and orientation of the inputting device 101 in three-dimensional space, control of selection of the sensor coils 110, and synchronization control of the detecting portion 113 and the transmission control portion 117. The sensor coils 110, the switching portion 111, the receiving circuit 112, the detecting portion 113, the transmission control portion 117, the transmitting circuit 118, and the control portion 114 are included in the detecting device 109.

The control portion 114 forms a processing unit, and the memory 116 forms a storage unit. The CPU 115 is included in a calculating unit for calculating three-dimensional information such as the three-dimensional coordinates and orientation of the inputting device 101, and is included in a synchronization control unit for controlling synchronization of the detecting portion 113 and the transmission control portion 117. In addition, the CPU 115 controls the switching portion 111 in order to perform controlling selection of the sensor coils 110, and the CPU 115 and the switching portion 111 form a selecting unit.

Figure 2:
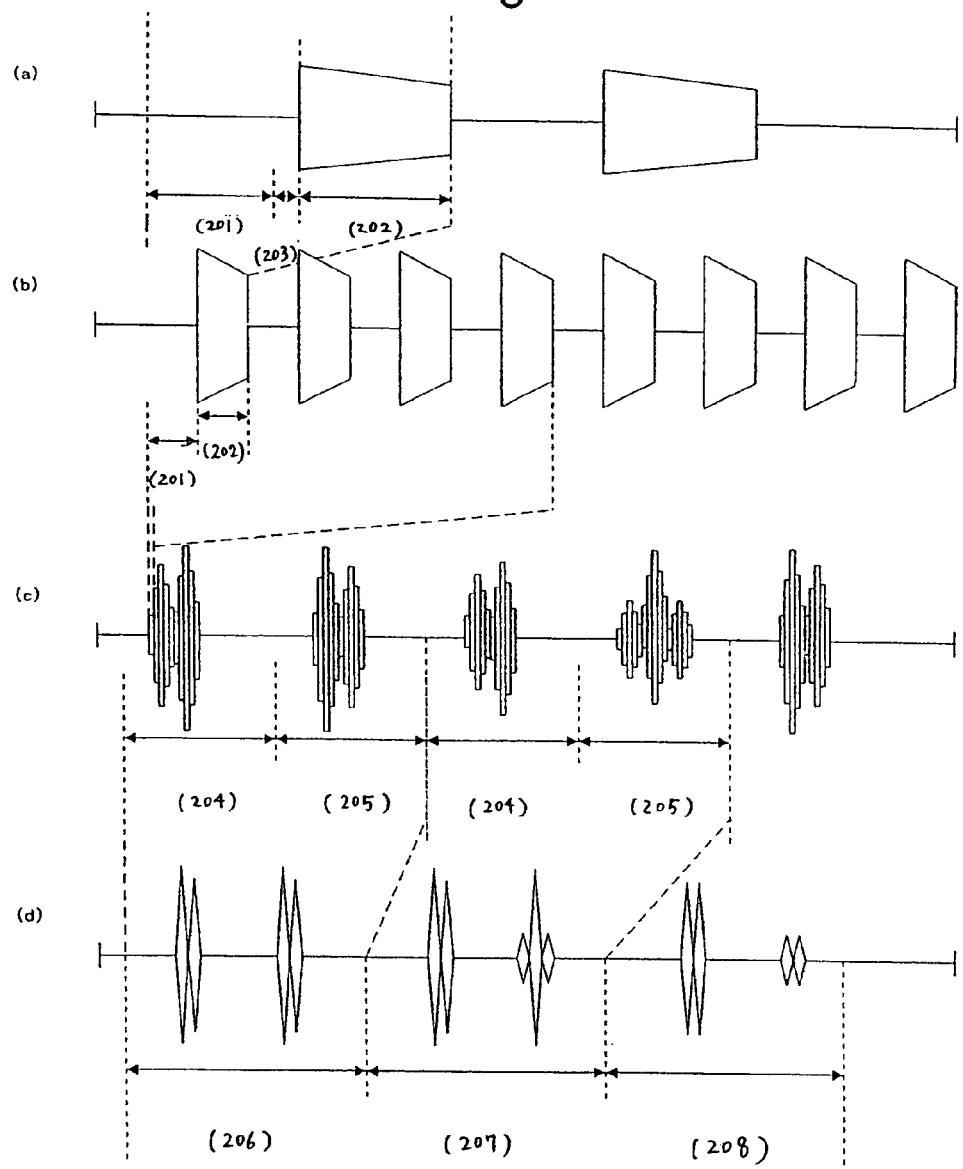
FIG. 2 is a timing chart showing the three-dimensional-information detecting system according to the first embodiment of the present invention.

FIG. 2 is a timing chart illustrating the operation of the three-dimensional-information detecting system according to the first embodiment. FIG. 2 shows an example of the three-dimensional-information detecting system which includes 103 x-sensor coils arranged in parallel in the X-axis direction, and 78 Y-sensor coils arranged in parallel which are perpendicular to the x-sensor coils.

An overview of the operation in FIG. 2 is described below. In the detecting device 109, at first, the control portion 114 controls the switching portion 111 to activate a transmitting mode (transmitting period), and selectively connects, to the transmitting circuit 118, the first sensor coil to be scanned among the sensor coils 110. In this state, in order to detect the coordinates (positions) and attitudes (orientations) of the input elements 103 to 105 (as components of the inputting device 101) in the three-dimensional space, the control portion 114 controls the transmission control portion 117 to generate signals having frequencies fu, fv, and fw corresponding to the resonant frequencies of the input elements 103 to 105, switches these signals for selection with predetermined timing, and outputs a selected signal from the sensor coils 110 via the transmitting circuit 118 and the switching portion 111. After that, the control portion 114 switches the switching portion 111 to a receiving mode (receiving period), and connects the sensor coils 110 to the receiving circuit 112 via the switching portion 111.

In the inputting device 101, the input elements 103 to 105 that correspond to the resonant frequencies of the received signals receive signals from the sensor coils 110 by electromagnetic coupling. In the case of frequency fu, a signal is output by the input element 103 including the input coil 106. In the case of frequency fv, a signal is output by the input element 104 including the input coil 107. In the case of frequency fw, a signal is output by the input element 105 including the input coil 108. In the receiving mode, when each of the input elements 103 to 105 outputs a signal, a detection signal is generated by electromagnetic coupling in the sensor coils 110.

In the receiving mode, the control portion 114 scans the X-sensor coils and Y-sensor coils of the sensor coils 110 with predetermined timing, whereby a large detection signal is obtained from a sensor coil in the vicinity of the inputting device 101. A sensor coil farther from the inputting device 101 can get a smaller detection signal. By performing the above operation for the frequencies fu, fv, and fw, signal detection for the input elements 103 to 105 is completed.

The operation is described with reference to FIG. 2. As shown in part (a) of FIG. 2, at first, in the transmitting period, the control portion 114 controls the switching portion 111 to switch to the transmitting mode, and selectively connects, to the transmitting circuit 118, the first sensor coil to be scanned among the sensor coils 110. In this state, the control portion 114 controls the transmission control portion 117 to generate a signal having frequency fu corresponding to the resonant frequency fu of the input element 103, and the generated signal is output by the selected sensor coil 110 via the transmitting circuit 118 and the switching portion 111. After that, the control portion 114 switches the switching portion 111 to the receiving mode, and connects the sensor coils 110 to the receiving circuit 112 by using the switching portion 111.

After receiving the signal having frequency fu from the selected sensor coil 110 by electromagnetic coupling, the input element 103 sends back a signal having frequency fu to the detecting device 109.

In the receiving period, a signal output from the sphere 102 is received by electromagnetic coupling by one of the X-sensor coils which is selected under the control of the control portion 114. After the signal received by the sensor coil is amplified by the receiving circuit 112, it is demodulated for signal level detection by the detecting portion 113. The transmitting operation and the receiving operation are repeatedly performed for each X-sensor coil (part (b) of FIG. 2), and the obtained detection signal levels are temporarily stored in a buffer memory (not shown). The total value of the levels is used as a detection signal level detected by the sensor coil, and data of the detection signal level is stored in the memory 116 in a form associated with the sensor coil used for detection. In the first embodiment, by repeatedly performing the transmitting operation and the receiving operation a number of times, noise reduction can be achieved. In addition, although, in order to establish similarity to a sequence of digitizing operation of the related art, the transmitting operation and the receiving operation are repeated per X-sensor coil four times, it is not always necessary to repeat the transmitting operation and the receiving operation four times, but the number of times the transmitting operation and the receiving operation are repeated can be set to any number.

Regarding frequency fu, the above transmitting and receiving operation is performed for all the X-sensor coils (103 X-sensor coils in the first embodiment) and all the Y-sensor coils (78 Y-sensor coils in the first embodiment), as shown in part (c) of FIG. 2. Following the above transmitting and receiving operation, also regarding signals having frequencies fv and fw, similar operation is performed. In this case, the signal having frequency fv that is output from the detecting device 109 is detected after being transmitted and received between the detecting device 109 and the input element 104 including the input coil 107. In addition, the signal having frequency fw that is output from the detecting device 109 is detected by the detecting device 109 after being transmitted and received between the detecting device 109 and the input coil 108. By performing operation concerning frequencies fu, fv, and fw, as described above, one cycle of operation is completed, as shown in part (d) of FIG. 2.

Figure 3:
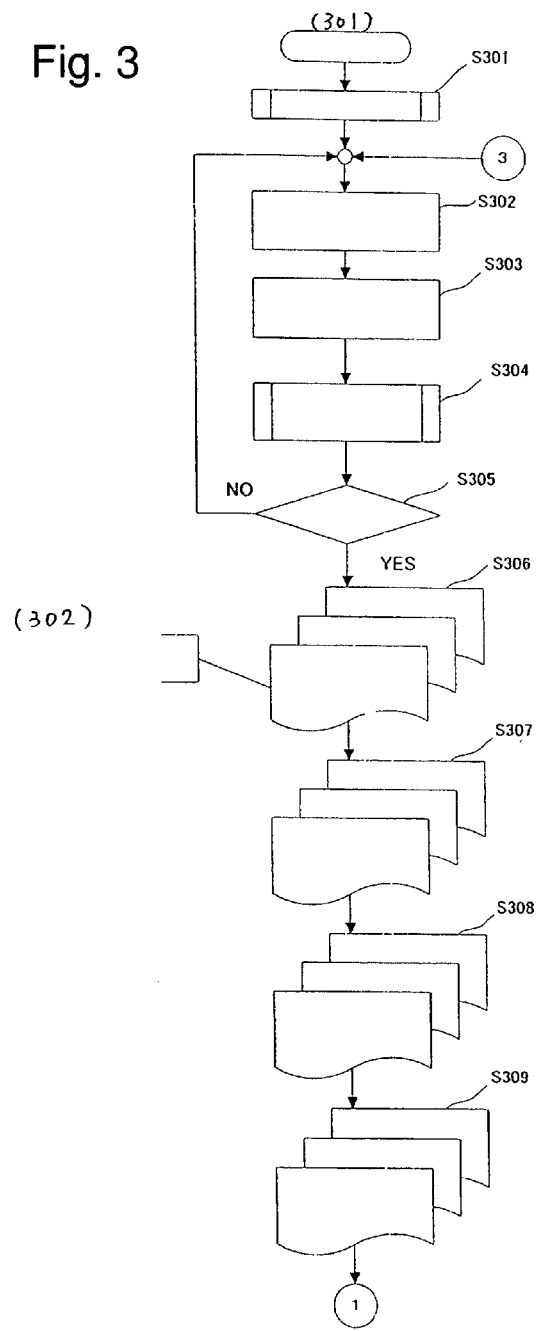
FIG. 3 is a flowchart showing a process of the three-dimensional-information detecting system according to the first embodiment of the present invention.
Figure 4:
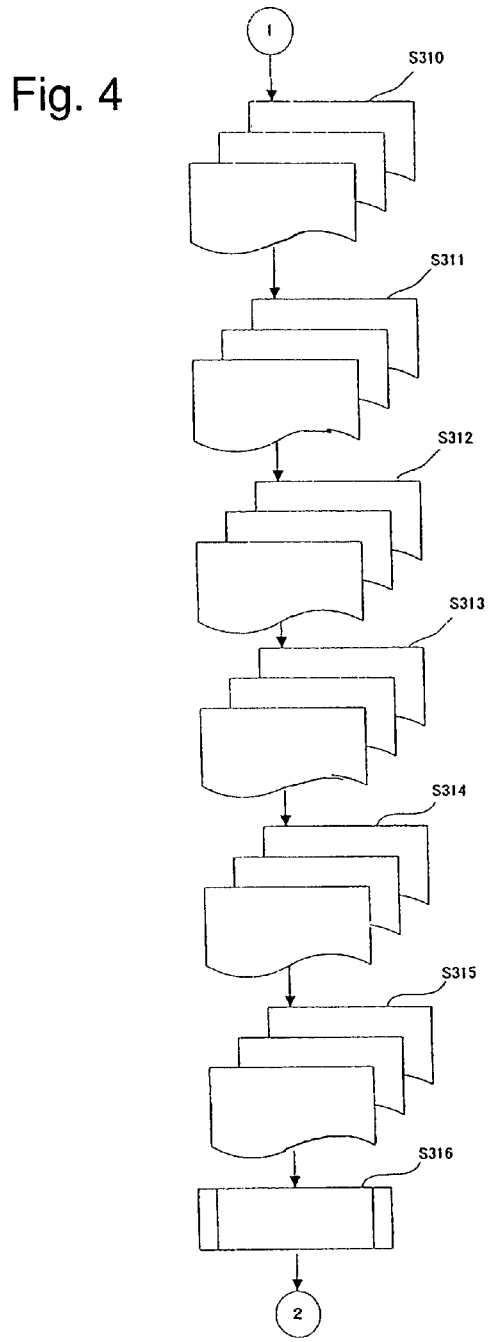
FIG. 4 is another flowchart showing the process of the three-dimensional-information detecting system according to the first embodiment of the present invention.

FIGS. 3 to 5 are flowcharts showing a process in the three-dimensional-information detecting system according to the first embodiment.

The operation of the three-dimensional-information detecting system according to the first embodiment is described with reference to FIGS. 1 to 9, and other related drawings. Detection of the position and attitude of the inputting device 101 in the three-dimensional space is basically as follows: the inputting device 101 and the detecting device 109 transmit and receive signals therebetween, whereby the sensor coils 110 detect signals from the inputting device 101, and, on the basis of the signals, the detecting device 109 directly detects the coordinates and orientations of the centers of the three input coils 106 to 108 included in the inputting device 101 which are provided having a predetermined positional relationship. Based on the central position coordinates and directions of the input coils 106 to 108, the position and attitude of the inputting device 101 are detected from predetermined mutual positional relationships of the input coils 106 to 108. When the input coils 106 to 108 are present in a region in which their orientations cannot be directly detected based on a reference-and-reverse-side relationship and a mirror image relationship, regarding coordinates, the coordinates of an input coil whose orientation cannot be directly specified are used. From a relative relationship with another input coil whose orientation can be directly detected, by calculating the orientation of the input coil whose orientation cannot be directly detected, the orientation of the input coil whose orientation cannot be directly detected are indirectly detected.

At first, in step S301 in FIG. 3, the CPU 115 and memory 116 of the control portion 114, and buffer memories in the transmission control portion 117 and the detecting portion 113 are initialized.

Next, as described with reference to FIG. 2, signals having different frequencies are sequentially transmitted with predetermined timing from the detecting device 109 to the inputting device 101. The inputting device 101 receives the signals from the detecting device 109 by electromagnetic coupling, and responds to the detecting device 109.

In step S302, by controlling the transmission control portion 117, the control portion 114 selects the frequencies of signals to be transmitted from the sensor coils 110 to the inputting device 101. As shown in part (d) of FIG. 2, the frequency selection is repeatedly performed with predetermined timing in the order of frequencies fu, fv, and fw. Thus, the control portion 114 controls the transmission control portion 117 to initially output a signal having frequency fu. Next, in step S303, by controlling the switching portion 111, the control portion 114 selectively switches the sensor coils 110 in order to transmit the signals from the transmission control portion 117 to the inputting device 101.

This supplies the selected sensor coil with the signal, having frequency fu, output from the transmission control portion 117, via the transmitting circuit 118 and the switching portion 111. After receiving the signal from the sensor coil by electromagnetic coupling, the inputting device 101 responds to the detecting device 109. In the receiving period, the detecting device 109 uses the selected sensor coil to detect the signal from the inputting device 101 by electromagnetic coupling. The signal detected by the sensor coil is input to the detecting portion 113 via the switching portion 111 and the receiving circuit 112, and the detecting portion 113 detects the level of the input signal. In step S304, by sequentially selecting (performing global scanning on) all the X-sensor coils and Y-sensor coils of the sensor coils 110 with predetermined timing, the detection operation is performed.

In step S305, it is determined whether the detecting operation has been completed for the signals having three types of frequencies fu, fv, and fw. If it is determined that the detecting operation has not been completed for all the signals having three types of frequencies fu, fv, and fw, the process returns to step S305. If it is determined that the detecting operation has been completed for all the signals having three types of frequencies fu, fv, and fw, that is, if it is determined that detection of the signals from all the input elements 103 to 105 has been completed, the process proceeds to step S306.

In the above processing, the control portion 114 stores, in the memory 116, the levels of the signals received from the inputting device 101 and data of sensor coils corresponding to the detected levels for each of frequencies fu, fv, and fw. In other words, the detected levels of the signals received from the input elements 103 to 105 and data of sensor coils corresponding to the detected levels are stored in the memory 116.

In step S306, by referring to tables, stored in the memory 116 beforehand, concerning reception levels, for the reception levels of the sensor coils 110, sensitivity variation of the reception levels of the sensor coils 110 in steps S302 to S305 is corrected. The level correction is performed for the input elements 103 to 105, that is, for all the signals having frequencies fu, fv, and fw. In addition, in step S306, for each input element, the peak of signal levels detected by the Y-sensor coils is corrected to agree with the peak of signal levels detected by the X-sensor coils.

In the subsequent steps, by representing each processing block of the flowchart with three superposed figures, it is indicated that processing is performed for all the input elements 103 to 105 (the input coils 106 to 108), that is, all the signals having frequencies fu, fv, and fw.

Details of the detecting operation are described below.

(1) Arrangement of Input Coils 106 to 108 in Sphere 102

Figure 10:
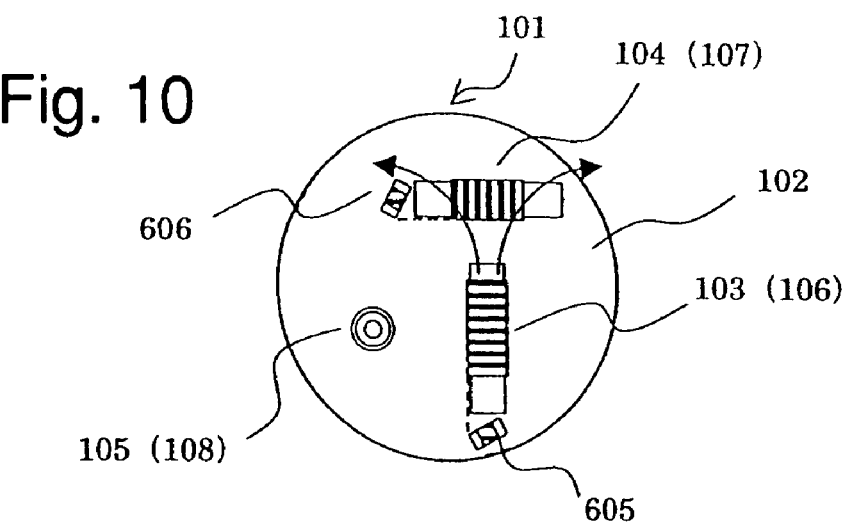
FIG. 10 is an illustration of the inputting device according to the first embodiment of the present invention.

The input coils 106 to 108 are arranged so that, when lines of magnetic force emitted from each of the input coils 106 to 108 enter different one of the input coils 106 to 108, after the lines of magnetic force are separated into right and left to cross, both cross each other, and the vectorial sum of the lines of magnetic force is zero. In other words, the input coils 106 to 108 included in the inputting device 101 are arranged so as not to interfere with one another. For facilitated adjustment, the input coils 106 to 108 were placed at intervals of 5 millimeters or greater. The sphere diameter was set to 40 millimeter so that the signals from the input coils 106 to 108 can be detected by the sensor coils 110 in the detecting device 109. In addition, the input coils 106 to 108 were provided having a distance there among so that a vector connecting the centers of two coils is large, as shown in FIG. 10. However, a too large distance causes the input coils 106 to 108 have a too large difference in signal magnitude, and expands error in the smallest signal. Thus, the distance among the input coils 106 to 108 was set as described above.

(2) Algorithm (step S307) for Detecting X- and Y-coordinates of Centers of Input Coils 106 to 108

Figure 11:
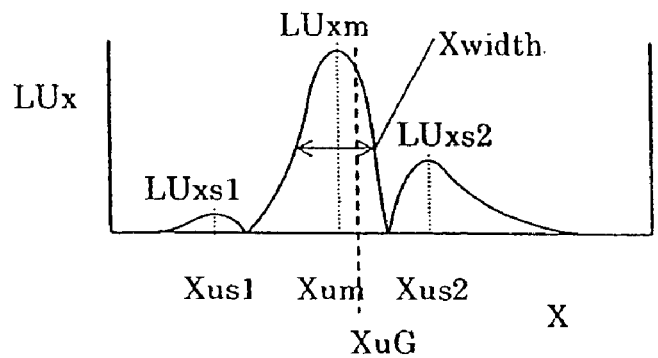
FIGS. 11 and 12 are graphs showing the process of the three-dimensional-information detecting system according to the first embodiment of the present invention.

FIG. 11 is a graph showing the signal of the input coil 106 which is detected by the X-sensor coils. The detected signal includes main signal LUxm having maximum value LUxm at X-coordiante Xum, left sub-signal LUxs1 having peak value LUxs1 at X-coordinate Xus1, and right sub-signal LUxs2 having peak value LUxs2 at X-coordinate Xus2. The value XuG is an X-coordinate calculated by weighted averaging using the above signals LUxm, LUxs1, and LUxs2, and the three coordinates Xum, Xus1, and Xus2. The value Xwidth is a half-width of main signal LUxm. Similar representation is used also for the input coils 107 and 108. However, the subscript in the case of the input coil 107 is v, and the subscript in the case of the input coil 108 is w unlike the subscript u in the case of the input coil 106.

Figure 12:
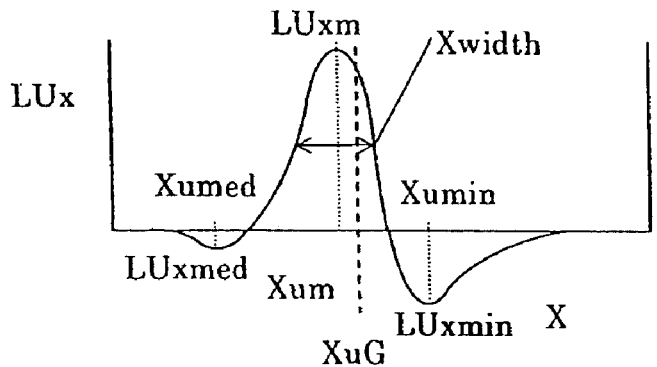

When signal magnitude determination is performed, as shown in FIG. 12, the negative sign is put to each of left and right sub-signals LUxs1 and LUxs2 before performing the determination. In FIG. 12, left sub-signal LUxmed has intermediate value LUxmed at X-coordinate Xumed (=Xus1) on the negative side, and left sub-signal has minimum value LUxmed at X-coordinate Xumin (=Xus2) on the negative side. The value XuG is an X-coordinate calculated by weighed averaging using the signals LUxm, LUxmed, and LUxmin and the two coordinates Xum and Xumin. The value Xwidth is a half-width of main signal LUxm. Although similar representation is used also for the input coils 107 and 108, the subscript is v for the input coil 107 and the subscript is w for the input coil 108 unlike the subscript u for the input coil 106.

Regarding coordinate detection, substantially linear coordinate detection can be realized by using the obtained signal values. For example, the X-coordinate of the input coil 106 is represented by $$Xu\_dir=((LUxm-|LUxmed|)*Xum+(|LUxmin|-|LUxmed|)*Xumin)/(LUxm-2*|LUxmed|+|LUxmin|)$$

Also the Y-coordinate Yu_dir of the input coil 106 is similarly detected. The X-coordinate Xv_dir of the input coil 107, and the X-coordinate Xw_dir and Y-coordinate Yw_dir of the input coil 108 are similarly detected. The subscript "dir" is an abbreviation of "direct" and represents a directly detected signal.

(3) Height (Z-coordinate) Detecting Algorithm (Steps S308, S309)

Figure 13:
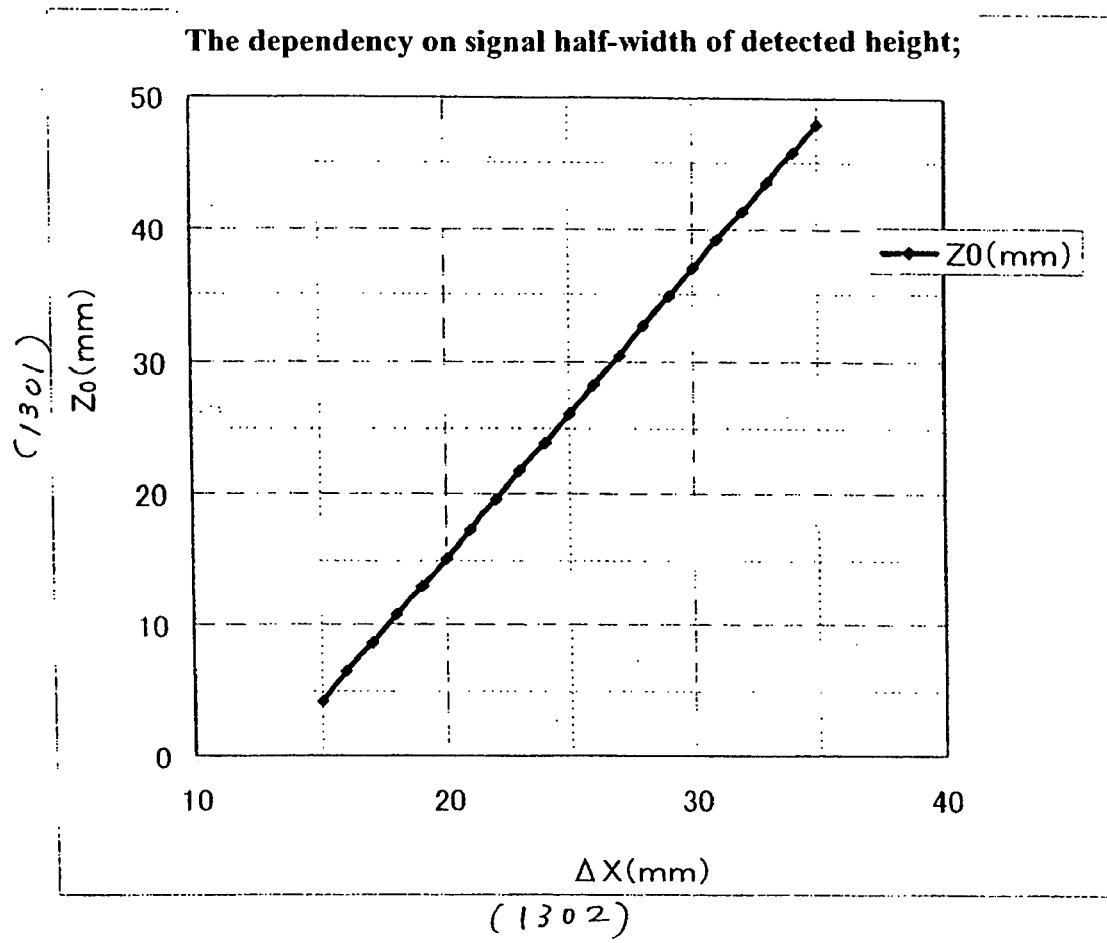
FIG. 13 is a graph illustrating the dependency on signal half-width of detected height.

FIG. 13 is a graph for detecting height $Z_0$ on the basis of a half-width of a sensor-detected signal distribution when the angle θ of inclination of input coil is zero degrees.

Figure 14:
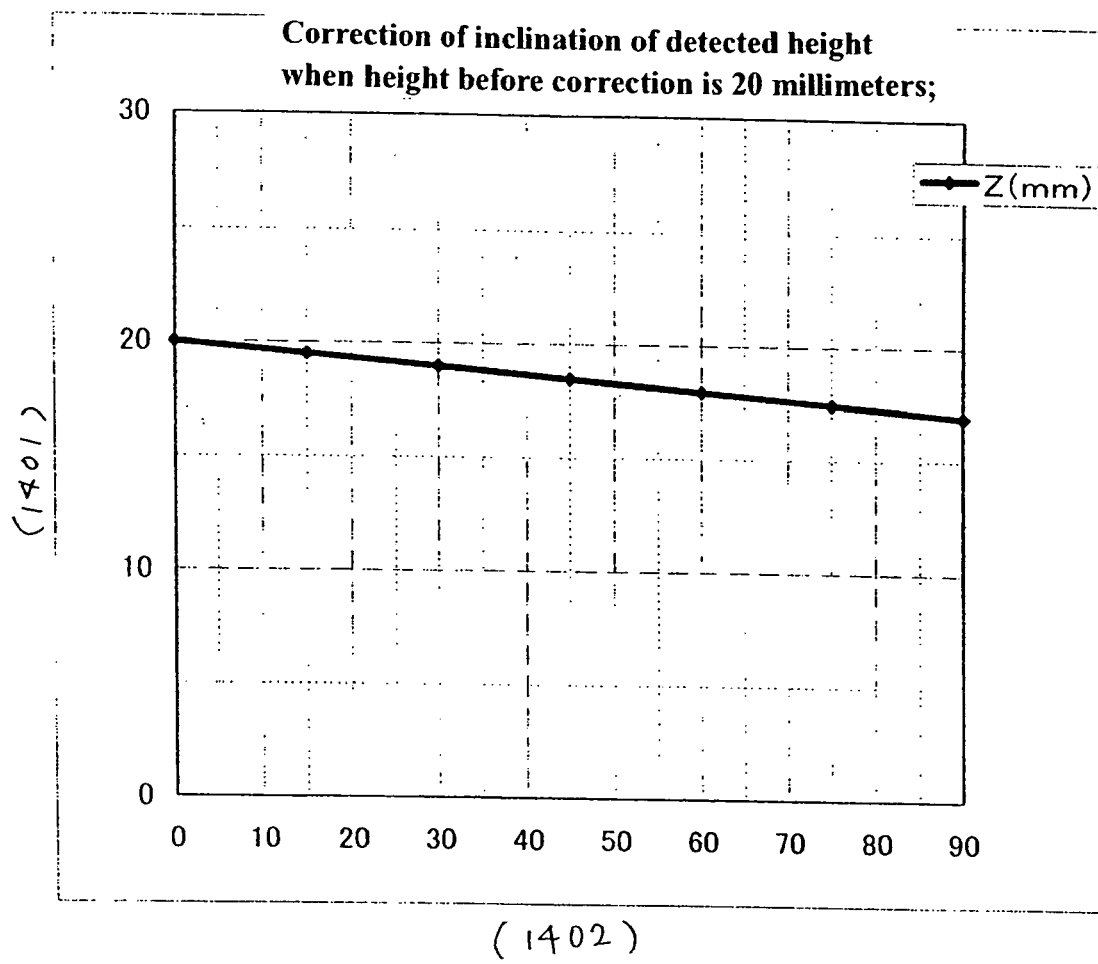
FIG. 14 is a graph illustrating correction of inclination of detected height when height before correction is 20 millimeters.

FIG. 14 is a graph for correcting height Z by angle θ of inclination since the half-width gradually increases with an increase in angle θ of inclination of input coil and height Z is detected as a high value. FIG. 14 is a characteristics graph obtained when height $Z_0$ before correction is set to 20 millimeters. The CPU 115 calculates the height coordinate Z of input coil on the basis of the half-width Xwidth found in step S308 by using the data in the graphs in FIGS. 13 and 14.

(4) Attitude Detecting Algorithm

The following algorithm is common to the input coils 106 to 108 (input elements 103 to 105). Accordingly, the case of the algorithm for the input coil 106 (the input element 103) is described below as a typical example.

At first, a resonant circuit including an input coil whose resonant frequency is, for example, 750 kHz, is placed in the center of the sphere 102 having a diameter of 40 millimeters. Signal distribution is measured by the sensor coils 110 while changing the angle θ of inclination and azimuth angle φ of the input coil.

When, in a state with the inputting device 101 inclined in the X-direction, in the signal distribution shown in FIG. 11, the angle θ of inclination is calculated by diving left and right sub-signal values LUxs1 and LUxs2 by main signal value LUxm, bad linearity is obtained. Accordingly, as described above, the lines of magnetic force are opposite in the sub-signals LUxs1 and LUxs2. Thus, the sub-signals LUxs1 and LUxs2 are set to be negative. The minimum value LUxmin and intermediate value LUxmed of X-components of the signal from the input coil 106 which is detected by the sensor coils 110 are calculated (FIG. 12).

Next, by using maximum value LUxm, intermediate value LUxmed, and minimum value LUxmin, the following ratios ratio_Ux and ratio_Uy are calculated (step S310).

$$\text{Ratio ratio}\_Ux=(LUxmed-LUxmin)/(LUxm-LUxmin)$$

$$\text{Ratio ratio}\_Uy=(LUymed-LUymin)/(LUym-LUymin)$$

Next, by using the ratios ratio_Ux and ratio_Uy, the X-direction component θux and Y-direction component θuy of the angle θ of inclination of the input coil 106 (the input element 103) are calculated (step S311).

In other words, for X-direction inclination θx, the ratio ratio_Ux (substantially) linearly changes from 0 to 180 degrees. Thus, the X-direction component θux of the angle θ of inclination of the input coil 106 can be detected from the ratio ratio_Ux, as described below. Also the Y-direction component θuy of the angle θ of inclination when the input coil 106 is inclined in the Y-direction can be represented by the following similar expression.

$$θux=\text{ratio}\_Ux*180 \text{ (degrees)}$$

θuy=ratio_Uy*180 (degrees)

When the minimum value, intermediate value, and maximum value of the Y-components of the signal from the input coil 106 which are detected by the sensor coils 110 are represented by LUmin, LUymed, and LUym, respectively, Ratio ratio_Uy=(LUymed−LUymin)/(LUym−LUymin)

In the case of the inputting device 101 having a combination of three input coils 106 to 108 as shown in FIG. 10, correction is performed in the following manner.

In a state with the input coil 106 positioned in parallel with the X-axis or the Y-axis, the characteristic of dependency on angle θu of inclination of ratio ratio_Ux is close to linear form. However, in the case general azimuth angle φu, the ratio ratio_Ux is not linear for X-direction component θux of azimuth angle φu but is sub-linear. When azimuth angle φu=0 (degrees), signal ratio ratio_Ux slightly shifts from linear form. Accordingly, by storing beforehand, in the storage unit, values (degrees) of angle θux of inclination in the X-direction for the ratio ratio_Ux in correcting table form, correction is performed so that angle θux of inclination in the X-direction can be linearly detected.

Detection of Composite Angle θ of Inclination

In step S311, composite angle θ of inclination that represents the angles θ of inclination of the input coils 106 to 108 is geometrically calculated.

In addition, the ratios ratio_Ux and ratio_Uy of the input coil 106 (the input element 103), the ratios ratio_Vx and ratio_Vy of the input coil 107 (the input element 104), and the ratio_Wx and ratio_Wy of the input coil 108 (the input element 105) are calculated.

Since the above composite angle θ of inclination has a shift from linear form, it is corrected by using a correction coefficient table stored in the storage unit beforehand. The angle θux (degrees) of inclination in the X-direction and angle θuy (degrees) of inclination in the Y-direction of the input coil 106 which are obtained after the correction are represented with a correction coefficient by θux=(ratio_Ux*"correction coefficient")*180 (degrees)

θuy=(ratio_Uy*"correction coefficient")*180 (degrees)

The angle θvx (degrees) of inclination in the X-direction and angle θvy (degrees) of inclination in the Y-direction of the input coil 107 (the input element 104) which are obtained after the correction, and angle θwx (degrees) of inclination in the X-direction and angle θwy (degrees) of inclination in the Y-direction of the input coil 108 (the input element 105) which are obtained after the correction are similarly calculated.

Figure 15:
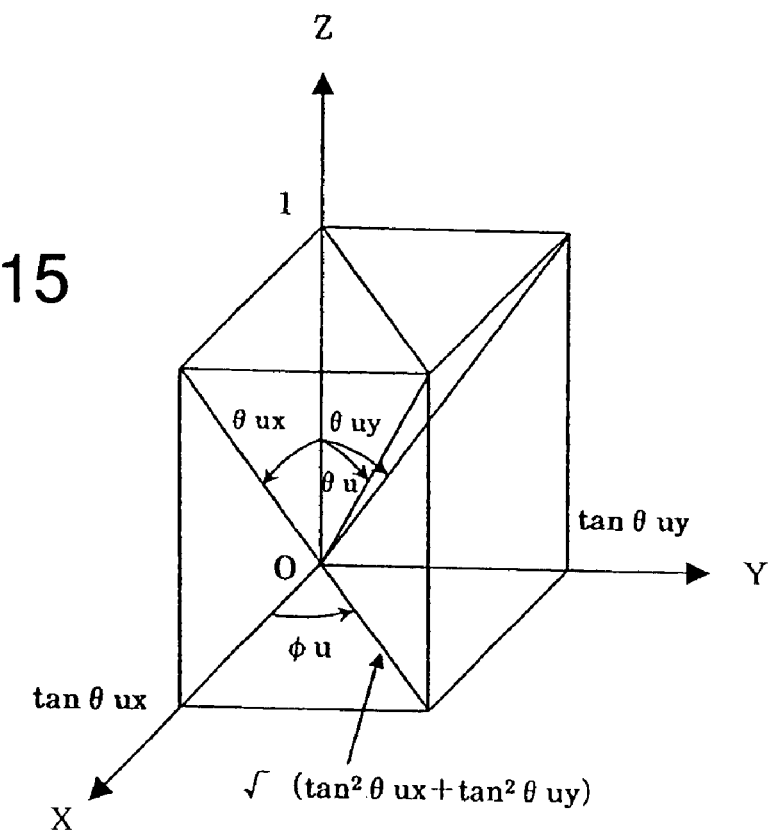
FIG. 15 is a three-dimensional graph illustrating the process of the three-dimensional-information detecting system according to the first embodiment of the present invention.

As shown in FIG. 15, from the corrected angle θux of inclination in the X-direction and corrected angle θuy of inclination in the Y-direction of the input coil 106 (the input element 103), the angle (composite angle) θu of inclination of the input coil 106 (the input element 103) is calculated as follows:

θu=tan$^{-1}$ [√(tan$^2$ θux+tan$^2$ θuy)]*180/π (degrees)

Also the angle (composite angle) θv of inclination of the input coil 107 (the input element 104) and the angle (composite angle) θw of inclination of the input coil 108 (the input element 105) are similarly calculated.

Detection of φ

In step S312, the azimuth angle θ$_0$ of the input coil 106 (the input element 103) in the first quadrant is calculated.

At first, to accurately calculate azimuth angle φ, the following signal ratio ratio_Ux2 is separately calculated.

ratio_Ux2=(√|LUxmin|−√|LUxmed|)/(√|LUxm+√|LUxmin|)

Also signal ratio ratio_Uy2 is similarly calculated by ratio_Uy2=(√|LUymin|−√|LUymed|)/(√|LUym+√|LUymin|)

Signal ratios ratio_Vx2 and ratio_Vy2 of the input coil 107 (the input element 105), and signal ratios ratio_Wx2 and ratio_Wy2 of the input coil 108 (the input element 105) are similarly calculated.

From the ratio of a value obtained by multiplying the square root of the signal, the azimuth angle φ$_0$ of the input coil 106 (the input element 103) in the first quadrant is calculated.

φu$_0$=tan$^{-1}$ {(√LUym·ratio_Uy2)/(√LUxm·ratio_Ux2)}·180/π (degrees)

Also the azimuth angle φv0 of the input coil 107 (the input element 104) in the first quadrant and the azimuth angle φw0 of the input coil 108 in the first quadrant are similarly calculated.

Next, general azimuth angles φu, φv, and φw are calculated, with the type of quadrant limited.

Figure 16:
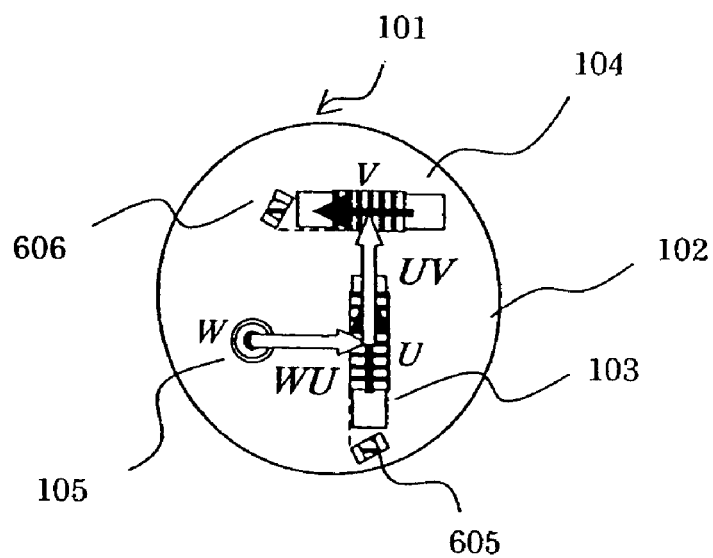
FIG. 16 is an illustration of the inputting device according to the first embodiment of the present invention.

In this case, when an orientation vector and coordinates cannot be directed based on a signal detected by the sensor coils 110, they can be indirectly calculated based on vectors connecting the centers of a plurality of input coils, or identifying of the reference and reverse sides and identifying of a mirror image can be performed (see FIG. 16).

Figure 17:
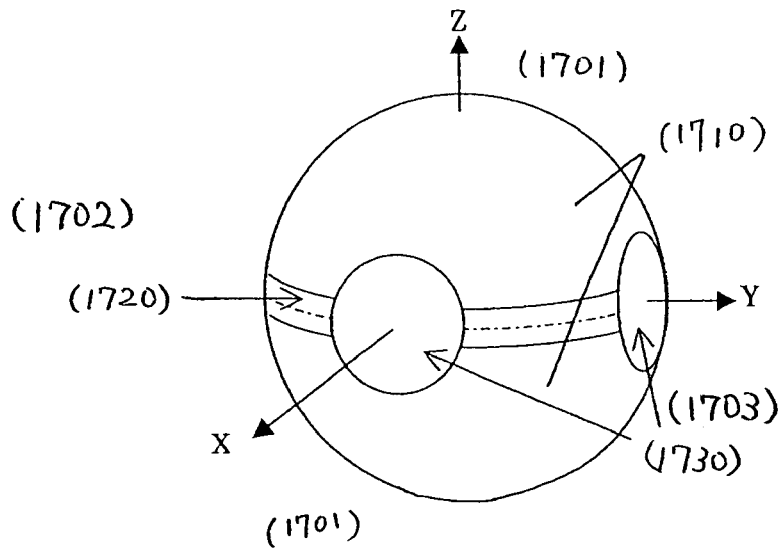
FIG. 17 is an illustration of regions identified based on the direction of an orientation vector when one coil is noted.

A three-dimensional space region around an input coil is divided into three regions (region 1 to region 3) as shown in FIG. 17 likened to the Earth. A region in which the input coil can be directly detected, that is, a region in a direction in which the input coil is directed, is referred to as region 1. In region 1, it is impossible to identify the reference and reverse sides (determining to which of the northern hemisphere and the southern hemisphere the input coil is directed) by performing only direct detection.

In addition, a region in which it is necessary to perform not only identifying of the reference and reverse sides but also identifying of a mirror image, with the input coil lying on its side (in a state with the input coil in parallel with the sensor coils 110), is referred to as region 2. Finally, a region in which an orientation and coordinates need to be indirectly detected is referred to as region 3.

When considering the above for three input coils 106 to 108, the number of permutations of regions is substantially thirteen since there is the constraint that the input coils 106 to 108 are mutually perpendicular. In each of the thirteen cases, detection is performed.

Example of Region Identifying Calculation

Regarding the input coil 106 (fu):

(i) When the Z-component is Uz<Uz_min, region 2 is identified, where Uz_min represents a predetermined threshold value; and (ii) In region 3, the input coil 106 (the input element 103) is in parallel with the X-axis or the Y-axis, or is in a state close to antiparallel, and the following value UXZ or Uyz is small.

$Uxz=\sqrt{(Ux^2+Uz^2)}$ $Uyz=\sqrt{(Uy^2+Uz^2)}$ $Uxyz\_min=Min(Uxz,Uyz)$

These represent a region in the vicinity of the direction of the X-axis or the Y-axis. In this case, Min(Uxz, Uyz) represents a function for selecting smaller one of Uxz and Uyz. When Uxz<Uxyz_min, or Uyz<Uxyz_min, region 3 is identified.

Figures 18, 19:
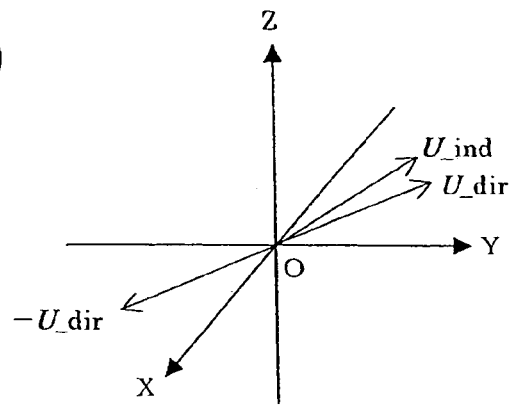
FIG. 18 is an illustration of the process of the three-dimensional-information detecting system according to the first embodiment of the present invention.
FIGS. 19, 20, and 21 are graphs showing the process of the three-dimensional-information detecting system according to the first embodiment of the present invention.

FIG. 18 consists of tables representing the coordinates and attitudes of the input coils 106 to 108 (the input elements 103 to 105) and region division for detection. FIG. 18 also shows permutations of input coils fu, fv, and fw, and the thirteen subroutine numbers, in FIG. 5, performed based thereon. However, even permutations that theoretically never happen include also combinations that can happen due to error in detecting the orientation vectors of the input coils fu, fv, and fw. In addition, combinations that hardly happen are excluded.

Example of Indirect Detection (i) For brevity of description, the vector between two input coils is represented by two bold italic capital alphabetic letters.

A vector from the center of coil fu to the center of coil fv is represented by *UV*. The components of the vector between two input coils is represented by adding lowercase letters x, y, and z to two alphabetic letters. When the X-, Y-, and Z-components are represented by UVx, UVy, and UVz, respectively, $UVx=Vx-Ux$ $UVy=Vy-Uy$ $UVz=Vz-Uz$ Orientation vector U_ind (which is an abbreviation of "indirect" and which represents an indirectly detected signal) for indirect detection of coil fu is standardized by dividing vector *UV* between coils fu and fv by its magnitude |*UV*|, as represented by $U\_ind=UV/|UV|$ where the symbols "| |" indicate that a value therein is an absolute value, that is, the magnitude of a vector.

(ii) A vector from the center of the coil fw to the center of the coil fu is represented by *WU*. When the X-, Y-, and Z-components of vector *WU* are represented by WUx, WUy, and WUz, respectively, $WUx=Ux-Wx$ $WUy=Uy-Wy$ $WUz=Uz-Wz$ orientation vector V_ind for indirect detection of the coil fv is standardized by diving the vector *WU* between the coils fw and fu by its magnitude |*WU*|. The vectors *WU* and V_dir are opposite in direction. Accordingly, when calculating the vector V_ind, a negative sign is added as shown in the following expression.

$V\_ind=-WU/|WU|$ (iii) Orientation vector W_ind for indirect detection of the coil fw is standardized such that, after identifying the reference and reverse sides, or indentying a mirror image, the vector product (U_dir×V_dir) of orientation vectors U_dir and V_dir for direct detection of the coils fu and fv is calculated and is divided by its magnitude |U_dir×V_dir|.

$W\_ind=(U\_dir \times V\_dir)/|U\_dir \times V\_dir|$ where "dir" represents an abbreviation of "direct".

Orientation Vector Detection

Due to error in measurement, in general, the directly detected orientation vector and the indirectly detected orientation vector slightly differ. However, since the difference is small, in the regions 1 and 2, the directly detected orientation vector and the indirectly detected orientation vector are used to enable identifying of the reference and reverse sides and identifying of a mirror image.

As described above, orientation vectors directly detected by the input coils fu, fv, and fw are represented by U_dir, V_dir, and W_dir, respectively. In addition, orientation vectors indirectly detected by the input coils fu, fv, and fw are represented by U_ind, V_ind, and W_ind, respectively.

(i) Detection Region (111)

For the detection region (111), binary decision is used to identify the reference and reverse sides (step S317). In other words, when considering vector −U_dir that is opposite to directly detected orientation vector U_dir, one that has a smaller vector difference from indirectly detected orientation vector U_dir is employed (see FIG. 19).

Regarding the input coil fu, if $|U\_dir-U\_ind| \leq |U\_dir+U\_ind|$, $U\_dir=U\_dir$, and, if $|U\_dir-U\_ind| > |U\_dir+U\_ind|$, $U\_dir=-U\_dir$.

Regarding the input coil fv, if $|V\_dir-V\_ind| \leq |V\_dir+V\_ind|$, $V\_dir=-V\_dir$, and, if $|V\_dir-V\_ind| > |V\_dir+V\_ind|$, $V\_dir=-V\_dir$.

Regarding the input coil fw, if $|W\_dir-W\_ind| \leq |W\_dir+W\_ind|$, $W\_dir=W\_dir$, and, if $|W\_dir-W\_ind| > |W\_dir+W\_ind|$, $W\_dir=-W\_dir$.

The representation |U_dir−U_ind| represents the magnitude of vector (U_dir−U_ind). This also applies to the other expressions. The symbol "=" indicates that a left side is substituted by a right side. This also applies to the other expressions.

(ii) Detection Region (112)

In the case of the detection region (112), only the orientation vector W is substantially in parallel with the X-Y plane and differs from the X-axis or the Y-axis. Binary decision is used to identify the reference and reverse sides (step S318).

Regarding the input coil fu, if $|U\_dir-U\_ind| \leq |U\_dir+U\_ind|$, $U\_dir=U\_dir$, and, if $|U\_dir-U\_ind| > |U\_dir+U\_ind|$, $U\_dir=-U\_dir$.

Regarding the input coil fv, if $|V\_dir-V\_ind| \leq |V\_dir+V\_ind|$, $V\_dir=-V\_dir$, and, if $|V\_dir-V\_ind| > |V\_dir+V\_ind|$, $V\_dir=-V\_dir$.

Vector Product

Figure 20:
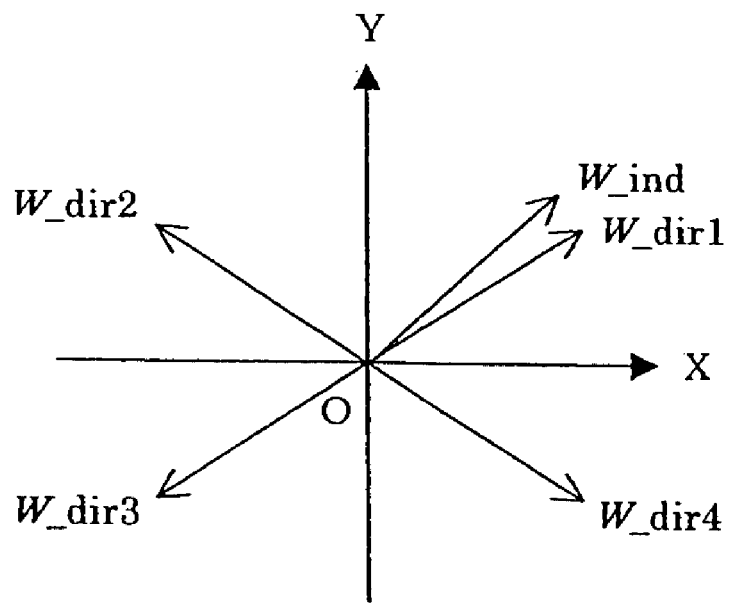

As shown in FIG. 20, by multiplying the directly detected orientation vectors U_dir and V_dir after identifying the reference and reverse sides, the vector product is calculated and used as the indirectly detected orientation vector w_ind of the coil fw. Since the coil fw lies on its side ($\theta=90$ degrees), for the directly detected orientation vector W_dir mirror images that have the X-axis or the Y-axis as lines of symmetry appears. Among them, one that is the closest to the orientation vector W_ind is a real image. It is used as W_dir. In addition, since the mirror images appear when the Z-component is in the vicinity of zero, regarding vectors W_dir2 and W_dir4 corresponding to the mirror images, their Z-components are set to Wz_dir and −Wz_dir respectively. In other words W_ind is represented by $$W\_ind=(U\text{-}dir\times V\_dir)/|U\_dir\times V\_dir|$$

Identifying of Reference and Reverse Sides and Identifying of Mirror Image

The identifying the reference and reverse sides and the identifying of a mirror image are performed by selection among four items (step S322).

Assuming $W\_ind=(Wx\_ind,Wy\_ind,Wz\_ind)$, $W\_dir1=(Wx\_dir,Wy\_dir,Wz\_dir)$, $W\_dir2=(-Wx\_dir,Wy\_dir,Wz\_dir)$, $W\_dir3=(-Wx\_dir,-Wy\_dir,-Wz\_dir)$, and $W\_dir4=(Wx\_dir,-Wy\_dir,Wz\_dir)$, if $|W\_dir1-W\_ind|\leq|W\_dir2-W\_ind|$ and $|W\_dir1-W\_ind|\leq|W\_dir3-W\_ind|$ and $|W\_dir1-W\_ind|\leq|W\_dir4-W\_ind|$, W_dir=W_dir1.

In addition, if $|W\_dir2-W\_ind|\leq|W\_dir1-W\_ind|$ and $|W\_dir2-W\_ind|\leq|W\_dir3-W\_ind|$ and $|W\_dir2-W\_ind|\leq|W\_dir4-W\_ind|$, W_dir=W_dir2.

If $|W\_dir3-W\_ind|\leq|W\_dir1-W\_ind|$ and $|W\_dir3-W\_ind|\leq|W\_dir2-W\_ind|$ and $|W\_dir3-W\_ind|\leq|W\_dir4-W\_ind|$, W_dir=W_dir3.

If $|W\_dir4-W\_ind|\leq|W\_dir1-W\_ind|$ and $|W\_dir4-W\_ind|\leq|W\_dir2-W\_ind|$ and $|W\_dir4-W\_ind|\leq|W\_dir3-W\_ind|$, W_dir=W_dir4.

For the detection regions (121) and (211), processing substantially similar to the above is performed.

(iii) Detection Region (122)

Identifying of Reference and Reverse Sides

In the case of the detection region (122), both the orientation vectors V and W are substantially in parallel with the X-Y plane and differ from the X-axis or the Y-axis. The identifying of the reference and reverse sides is performed by binary decision (step S318).

In other words, regarding the input coil fu, if $|U\_dir-U\_ind|\leq|U\_dir+U\_ind|$, $U\_dir=U\_dir$, and, if $|U\_dir-U\_ind|>|U\_dir+U\_ind|$, $U\_dir=-U\_dir$.

Identifying of Reference and Reverse Sides and Identifying of Mirror Image

Figure 21:
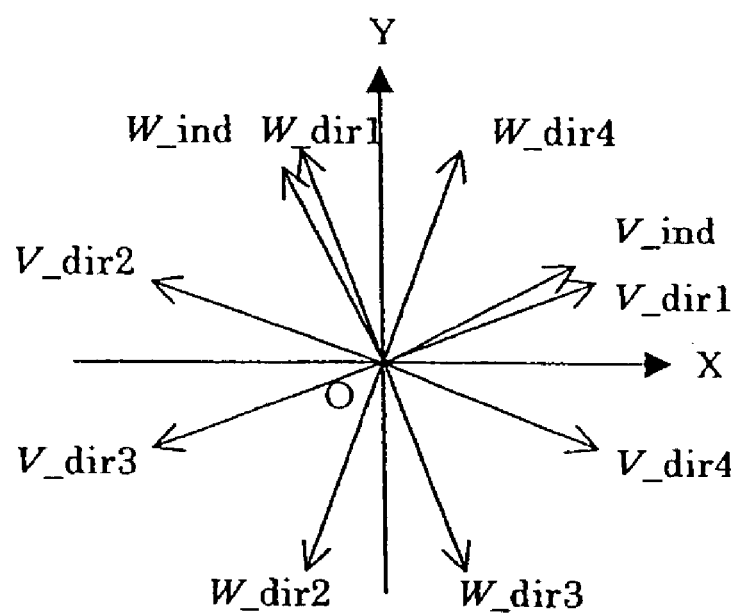

Regarding the input coil fv, the identifying the reference and reverse sides and the identifying of a mirror image are performed by selection among four items (see FIG. 21) (step S322).

In other words, regarding the input coil fv, assuming $V\_ind=(Vx\_ind,Vy\_ind,Vz\_ind)$, $V\_dir1=(Vx\_dir,Vy\_dir,Vz\_dir)$, $V\_dir2=(-Vx\_dir,Vy\_dir,Vz\_dir)$, $V\_dir3=(-Vx\_dir,-Vy\_dir,-Vz\_dir)$, and $V\_dir4=(Vx\_dir,\_Vy\_dir,Vz\_dir)$, if $|V\_dir1-V\_ind|\leq|V\_dir2-V\_ind|$ and $|V\_dir1-V\_ind|\leq|V\_dir3-V\_ind|$ and $|V\_dir1-V\_ind|\leq|V\_dir4-V\_ind|$, V_dir=V_dir1.

If $|V\_dir2-V\_ind|\leq|V\_dir1-V\_ind|$ and $|V\_dir2-V\_ind|\leq|V\_dir3-V\_ind|$ and $|V\_dir2-V\_ind|\leq|V\_dir4-V\_ind|$, V_dir=V_dir2.

If $|V\_dir3-V\_ind|\leq|V\_dir1-V\_ind|$ and $|V\_dir3-V\_ind|\leq|V\_dir2-V\_ind|$ and $|V\_dir3-V\_ind|\leq|V\_dir4-V\_ind|$, V_dir=V_dir3.

If $|V\_dir4-V\_ind|\leq|V\_dir1-V\_ind|$ and $|V\_dir4-V\_ind|\leq|V\_dir2-V\_ind|$ and $|V\_dir4-V\_ind|\leq|V\_dir3-V\_ind|$, V_dir=V_dir4.

Here, by using the orientation vectors U_dir and V_dir obtained after identifying the reference and reverse sides, vector multiplication is performed to calculate W_ind.

Identifying of Reference and Reverse Sides and Identifying of Mirror Image p Regarding the input coil fw, the identifying the reference and reverse sides and the identifying of a mirror image are performed by selection among four items (see FIG. 21) (step S322) in the following manner.

In other words, regarding the input coil fw, assuming $W\_ind=(Wx\_ind,Wy\_ind,Wz\_ind)$, $W\_dir1=(Wx\_dir,Wy\_dir,Wz\_dir)$, $W\_dir2=(-Wx\_dir,Wy\_dir,Wz\_dir)$, $W\_dir3=(-Wx\_dir,-Wy\_dir,-Wz\_dir)$, and $W\_dir4=(Wx\_dir, -Wy\_dir, Wz\_dir)$, if $|W\_dir1-W\_ind| \leq |W\_dir2-W\_ind|$ and $|W\_dir1-W\_ind| \leq |W\_dir3-W\_ind|$ and $|W\_dir1-W\_ind| \leq |W\_dir4-W\_ind|$, $W\_dir=W\_dir1$.

If $|W\_dir2-W\_ind| \leq |W\_dir1-W\_ind|$ and $|W\_dir2-W\_ind| \leq |W\_dir3-W\_ind|$ and $|W\_dir2-W\_ind| \leq |W\_dir4-W\_ind|$, $W\_dir=W\_dir2$.

If $|W\_dir3-W\_ind| \leq |W\_dir1-W\_ind|$ and $|W\_dir3-W\_ind| \leq |W\_dir2-W\_ind|$ and $|W\_dir3-W\_ind| \leq |W\_dir4-W\_ind|$, $W\_dir=W\_dir3$.

If $|W\_dir4-W\_ind| \leq |W\_dir1-W\_ind|$ and $|W\_dir4-W\_ind| \leq |W\_dir2-W\_ind|$ and $|W\_dir4-W\_ind| \leq |W\_dir3-W\_ind|$, $W\_dir=W\_dir4$.

For the detection regions (211), (121), (221), and (212), substantially similar processing is also performed.

(iv) Detection Region (113)

Identifying of Reference and Reverse Sides

Identifying of the reference and reverse sides in the case of the detection region (113) is performed by binary decision (step S319) in the following manner (step S319).

Regarding the input coil fu, if $|U\_dir-U\_ind| \leq |U\_dir+U\_ind|$, $U\_dir=U\_dir$, and if $|U\_dir-U\_ind| > |U\_dir+U\_ind|$, $U\_dir=-U\_dir$.

Regarding the input coil fv, if $\text{Sign}(Vz\_dir)=-\text{Sign}(WUz)$, $V\_dir=V\_dir$, and if $\text{Sign}(Vz\_dir)=\text{Sign}(WUz)$, $V\_dir=-V\_dir$.

In the above expressions, "Sign( )" represents a function representing a sign. It produces −1 when it represents a negative sign, and produces =1 when it represents a positive sign. In addition, regarding the input coil fw, W_ind is found from the following vector product, and W_ind is used as W_dir.

$W\_ind = U\_dir \times V\_dir$

In the case of the detection regions (131) and (311), substantially similar processing is performed.

(v) Detection Region (331) (step S320)

A calculation example is described in which the coil fw is used as a reference, with the coils fu, fv, and fw set as θ=90 degrees for the coil fu, θ=90 degrees for the coil fv, and θ=0 degrees for the coil fw. Since θ=0 degrees for the coil fw, the three coils have substantially equal heights. Accordingly, a description of Z is omitted.

A case is described below in which the sphere is placed on a small dish on the sensor coils 110, which are X-Y sensors, and the sphere is rotated along the Z-axis, having the attitude shown in FIG. 22 (plan view), with the X- and Y-coordinates of the center of the sphere maintained. For brevity of description, it is assumed that the center of the input coil fw (the input element 105) is at the coordinate origin.

Regarding both the input coil fu (the input element 103) and the input coil fv (the input element 104), a case in which not their azimuth angles but the central coordinates of the input coils fu and fv lie in the first quadrant to the second quadrant is considered.

When the general azimuth angles of the input coil fu (the input element 103) and the input coil fu (the input element 104) are represented by φu and φv, respectively, the coordinates of the centers of the input coil fu (the input element 103) and the input coil fu (the input element 104) are respectively represented by (Xu, Yu) and (Xv, Yv), and are indicated by symbols U and V, respectively.

FIG. 23 is a partially enlarged view of FIG. 22. FIG. 24 is a graph illustrating processing. The following description uses FIGS. 22 to 24.

In FIG. 24, right triangle ΔUWA and right triangle ΔVUB are similar to each other.

Thus, $Xu:Yu=(Yv-Yu):(Xu-Xv)$ $$\therefore Xu/Yu=(Yv-Yu)/(Xu-Xv) \quad (1)$$

Here, setting k=15.0 mm/13.5 mm=1.111, $$(Yv-Yu)/Xu=(Xu-Xv)/Yu=k \quad (2)$$

From the right side of expression (2), $Xu-Xv=kYu$ $$\therefore Xu=Xv+kYu \text{ (particularly fu, 90 degrees} \leq \phi u \leq 135 \text{ degrees)} \quad (3)$$

From the left side of expression (2), $Yu-Yv=kXu$ $$\therefore Yu=Yv-kXu \text{ (particularly } fu, 135 \text{ degrees} \leq \phi u \leq 180 \text{ degrees)} \quad (4)$$

From expression (1), $(Xu-Xv)Xu=(Yv-Yu)Yu$ $\therefore Xu-Xv=(Yv-Yu)Yu/Xu$ $$\therefore Xv=Xu+(Yu-Yv)Yu/Xu \quad (5)$$

By substituting Expression (4) for expression (5), $$\begin{aligned} Xv &= Xu + [\{(Yv-kXu)-Yv\}(Yv-kXu)]/Xu \\ &= Xu - k(Yv-kXu) \\ &= Xu - kYv + k^2 Xu \end{aligned} \quad (6)$$

$\therefore Xv = (1+k^2)Xu -$
$kYv$(particularly $fv$, 225 degrees $\leq \phi v \leq$ 270 degrees)

In addition, from expression (1), similarly to the manner for deriving expression (5), $(Yv-Yu)Yu=(Xu-Xv)Xu$ $\therefore Yv-Yu=(Xu-Xv)Xu/Yu$ $$\therefore Yv=Yu+(Xu-Xv)Xu/Yu \quad (7)$$

By substituting expression (3) for expression (7), $$Yv = Yu + [\{(Xv + kYu) - Xv\}(Xv + kYu)]/Yu \quad (8)$$
$$= Yu + k(Xv - kYu)$$
$$\therefore Yv = (1 + k^2)Yu +$$
$$kXv \text{(particularly } fv, 180 \text{ degrees} \leq \phi v \leq 225 \text{ degrees)}$$

After all, the above four expressions (3), (4), (6), and (8) are used for calculation for indirect detection. It is found that, by using indirectly detected coordinates with directly detected coordinates, the X- and Y-coordinates of two coils fu and fv are detected.

The above expressions for calculation are effective in all the quadrants. In other words, since the general azimuth angles of the input coils fu and fv are θu and θv (northern hemisphere: the Z-component of the coil fw is positive, Wz>0), in particular, regarding the coil fu, when 45 degrees≦φu≦135 degrees, 225 degrees≦φu≦315 degrees, that is, regarding the coil fv, when 135 degrees≦φv≦225 degrees, −45 degrees φv≦45 degrees, $Xu=Xv+kYu$ (indirect detection)

$Yu=Yu$ (direct detection)

$Xv=Xv$ (direct detection)

$Yv=(1+k^2)Yu+kXv$ (indirect detection)

In particular, regarding the coil fu, when 135 degrees≦φu≦225 degrees, −45 degrees≦φu≦45 degrees, that is, regarding the coil fv, when 45 degrees≦φv≦135 degrees, 225 degrees≦φv≦315 degrees, $Xu=Xu$ (direct detection)

$Yu=Yv-kXu$ (indirect detection)

$Xv=(1+k^2)Xu-kYv$ (indirect detection)

$Yv=Yv$ (direct detection)

The above expressions represent coordinate detection in the northern hemisphere.

In the southern hemisphere, the sign of k is inverse (the southern hemisphere: the Z-component of the coil fw is negative, Wz<0). In particular, regarding the coil fu, when 45 degrees≦φu≦135 degrees, 225 degrees≦φu≦315 degrees, that is, regarding the coil fv, 135 degrees≦φv≦225 degrees, −45 degrees≦φv≦45 degrees, $Xu=Xv-kYu$ (indirect detection)

$Yu=Yu$ (direct detection)

$Xv=Xv$ (direct detection)

$Yv=(1+k^2)Yu-kXv$ (indirect detection)

In particular, regarding the coil fu, when 135 degrees≦φu≦225 degrees, −45 degrees≦φu≦45 degrees, that is, regarding the coil fu, 45 degrees≦φv≦135 degrees, 225 degrees≦φv≦315 degrees, $Xu=Xu$ (direct detection)

$Yu=Yv+kXu$ (indirect detection)

$Xv=(1+k^2)Xu+kYv$ (indirect detection)

$Yv=Yv$ (indirect detection)

Next, the X- and Y-coordinates (Xw, Yw) of the center of the coil fw are added.

$Xu=Xu+Xw$ $Yu=Yu+Yw$ $Xv=Xv+Xw$ $Yv=Yv+Yw$

By using these expressions, the positional coordinates of the centers of the coils fu and fw, with a predetermined position as a reference, are obtained.

The case of the detection region (111) is described below. For brevity of description, regarding coordinates, in a state with the center of the sphere 102 fixed, and the sphere 102 rotated around the vertical axis in a horizontal plane, the angle θ of inclination and azimuth angle φ of each input coil (input element), and dependencies on the rotational angle in the horizontal plane of the X-, Y-, and Z-coordinates of the centers of the input coils (input elements) were measured. The detection region (111) remained unchanged in the order of the coils fu, fv, and fw.

Figure 26:
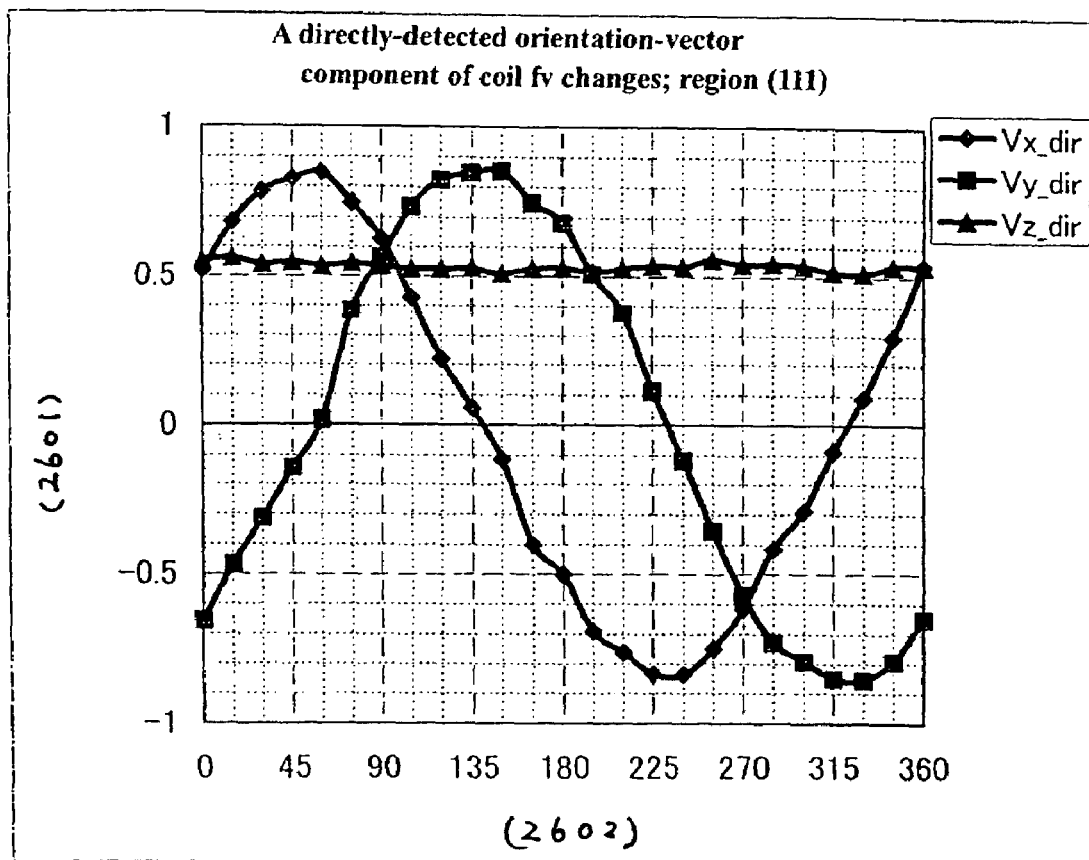
FIG. 26 is a graph illustrating region (111) in which a directly-detected orientation-vector component of coil fv changes.
Figure 27:
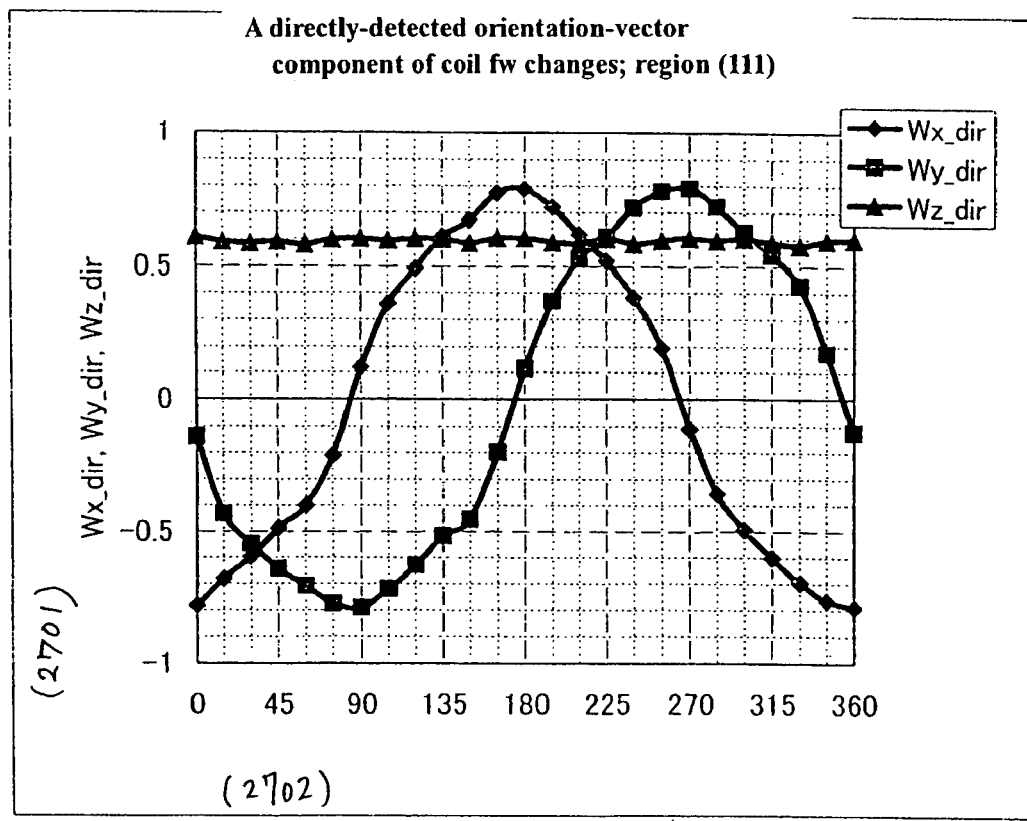
FIG. 27 is a graph illustrating region (111) in which a directly-detected orientation-vector component of coil fw changes.

FIGS. 25 to 27 show the results of plotting, for the rotational angle φ in the horizontal plane, the directly detected orientation vectors Ux_dir, Uy_dir, Uz_dir, Vx_dir, Vy_dir, Vz_dir, Wx_dir, Wy_dir, and Wz_dir, while rotating the fu, fv, and fw by 15 degrees.

Figure 28:
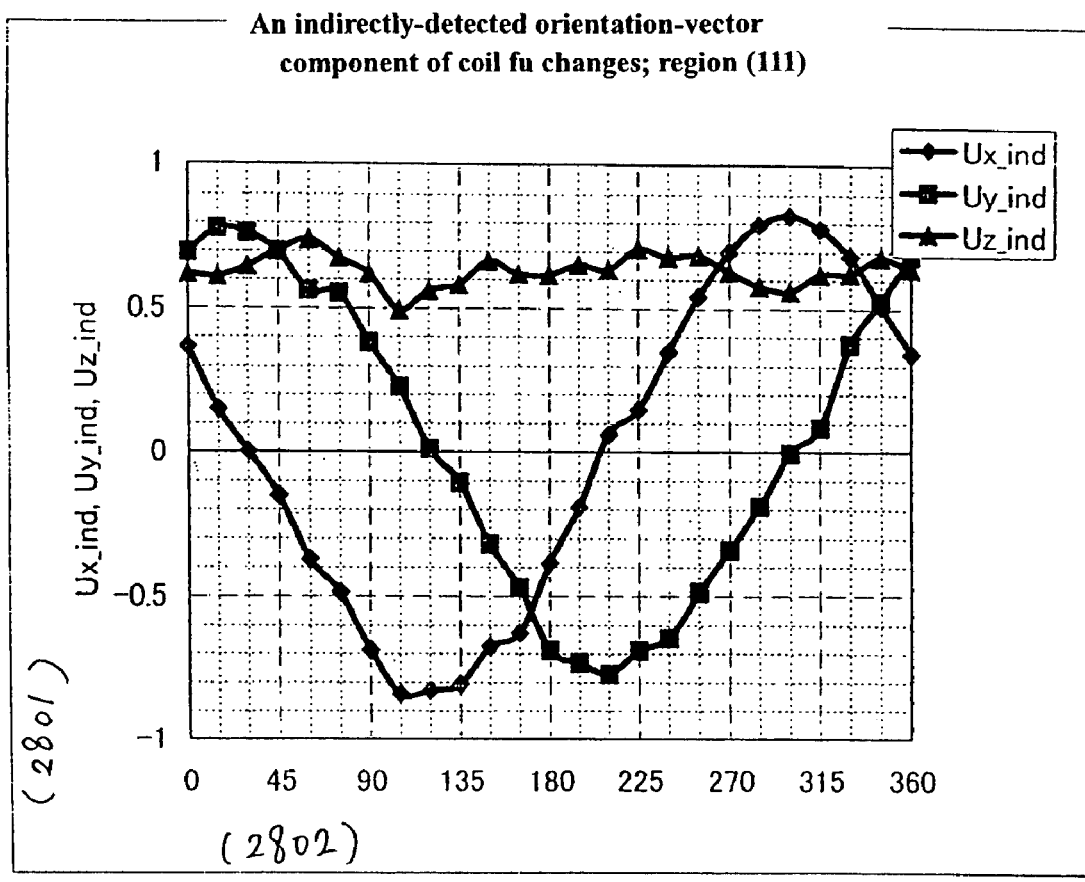
FIG. 28 is a graph illustrating region (111) in which an indirectly-detected orientation-vector component of coil fu changes.
Figure 29:
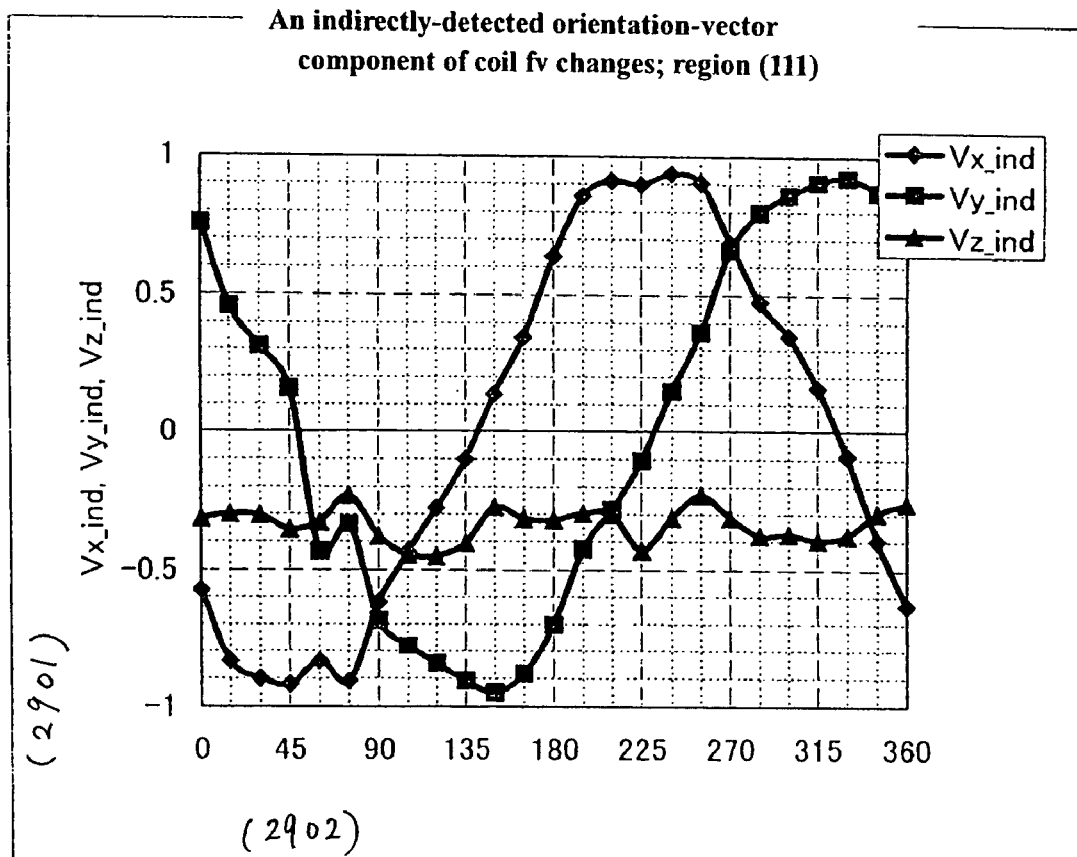
FIG. 29 is a graph illustrating region (111) in which an indirectly-detected orientation-vector component of coil fv changes.

Next, based on the X-, Y-, and Z-coordinates of the three input coils fu, fv, and fw, inter-coil vectors UV and WU are calculated and standardized. FIGS. 28 and 29 show indirectly-detected orientation-vector components Uxjnd, Uy_ind, Uzjnd, Vx_ind, Vy_ind, and Vz_ind of the coils fu and fv which are obtained from the inter-coil vectors UV and Wu.

When the identifying of the reference and reverse sides is performed by comparing the directly-detected orientation-vector components of the coil fu with the indirectly-detected orientation-vector components of the coil fu, it is preferable that the directly-detected orientation-vector components be unchanged. However, it is found that, when the identifying of the reference and reverse sides is performed by comparing the directly-detected orientation-vector components of the coil fv with the indirectly-detected orientation-vector components of the coil fv, the directly-detected orientation-vector components of the coil fv must be inverted.

Figure 30:
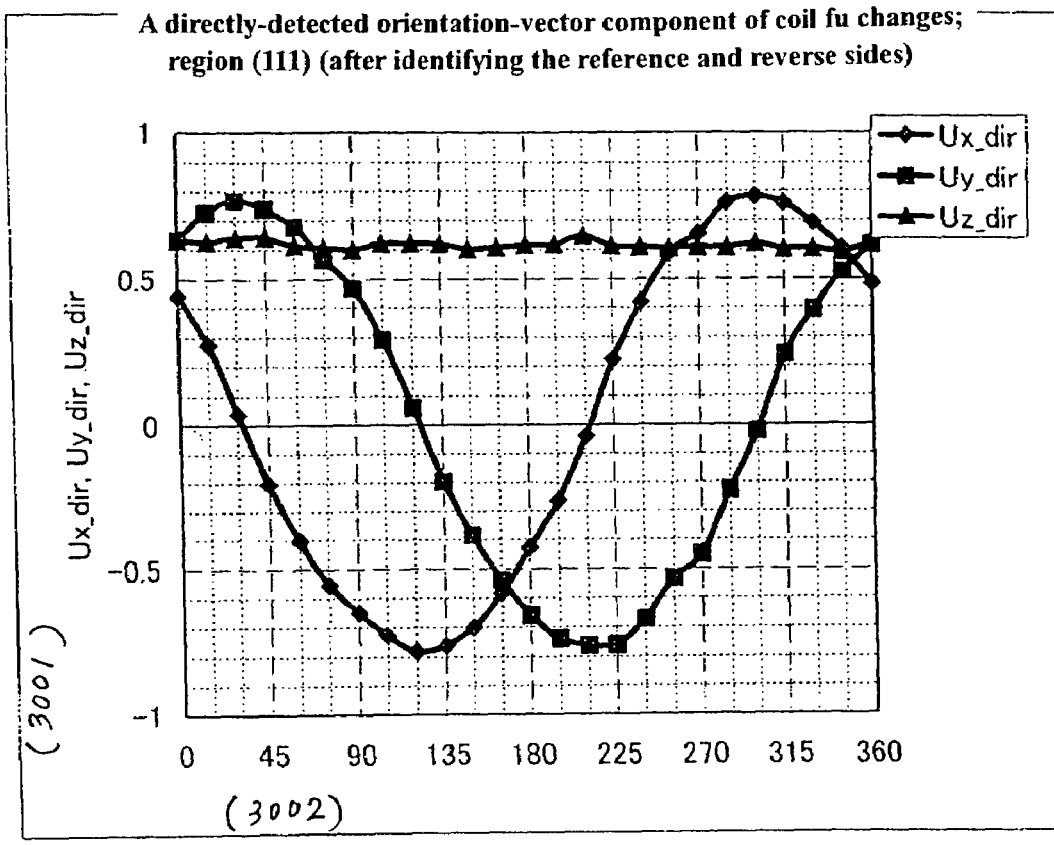
FIG. 30 is a graph illustrating region (111) (after identifying the reference and reverse sides) in which a directly-detected orientation-vector component of coil fu changes.
Figure 31:
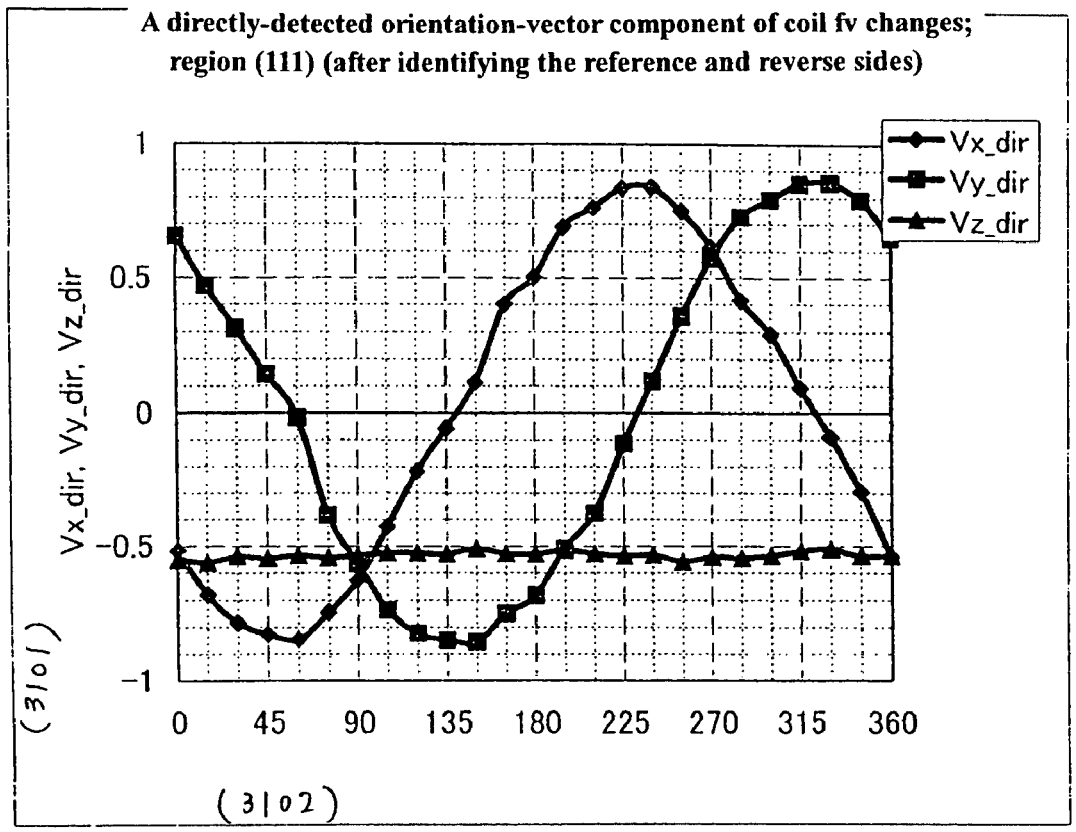
FIG. 31 is a graph illustrating region (111) (after identifying the reference and reverse sides) in which a directly-detected orientation-vector component of coil fv changes.
Figure 32:
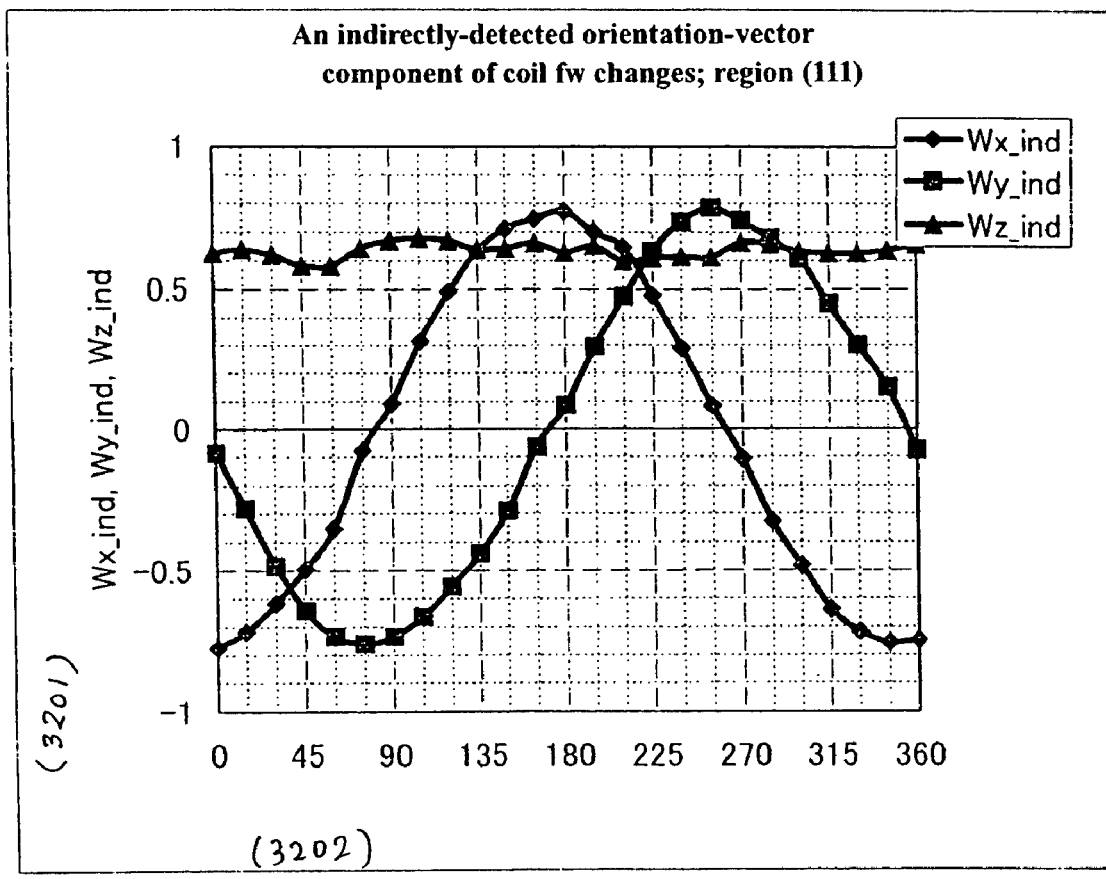
FIG. 32 is a graph illustrating region (111) in which an indirectly-detected orientation-vector component of coil fw changes.

Accordingly, after performing the identifying of the reference and reverse sides, the directly-detected orientation-vector components of the coil fv are as shown in FIGS. 30 and 31. The result of calculating the vector product of the orientation vector of the coil fu after identifying the reference and reverse sides and the orientation vector of the coil fv after identifying the reference and reverse sides and standardizing the vector product is shown as indirectly-detected orientation-vector components of the coil fw in FIG. 32.

Figure 33:
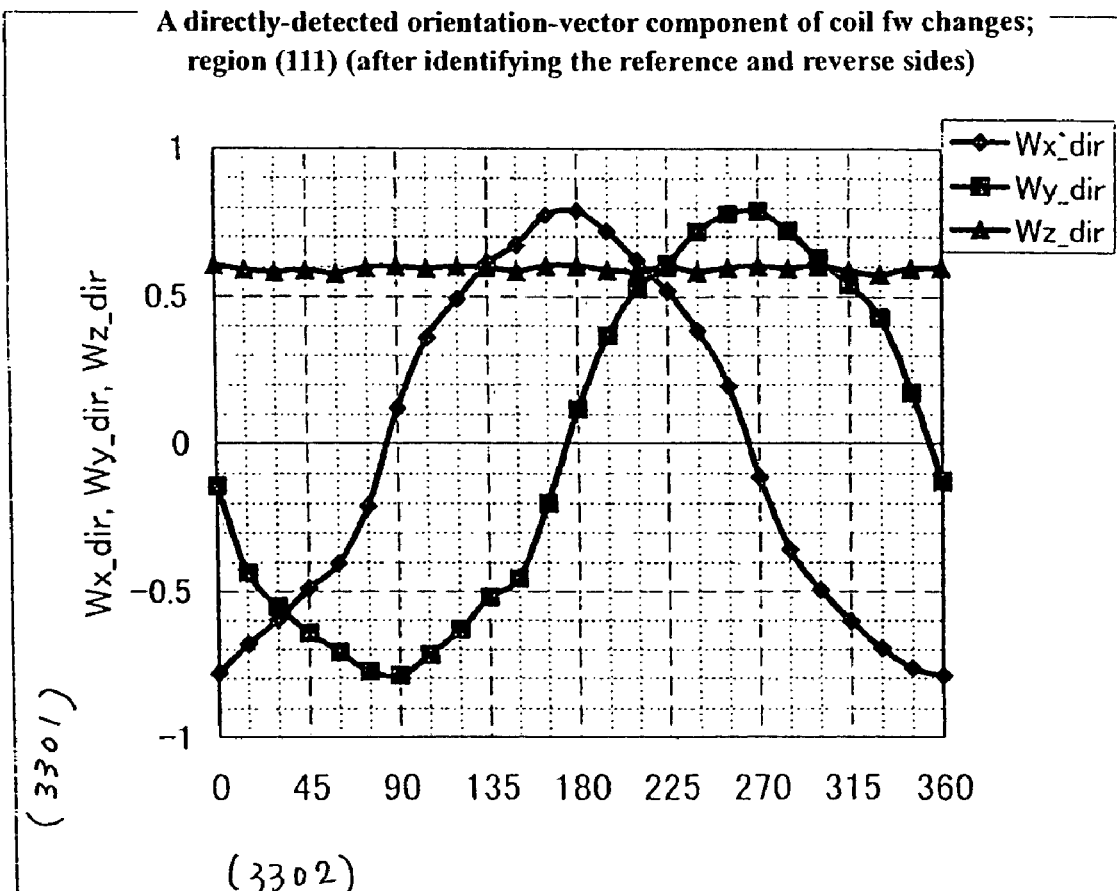
FIG. 33 is a graph illustrating region (111) (after identifying the reference and reverse sides) in which a directly-detected orientation-vector component of coil fw changes.
Figure 34:
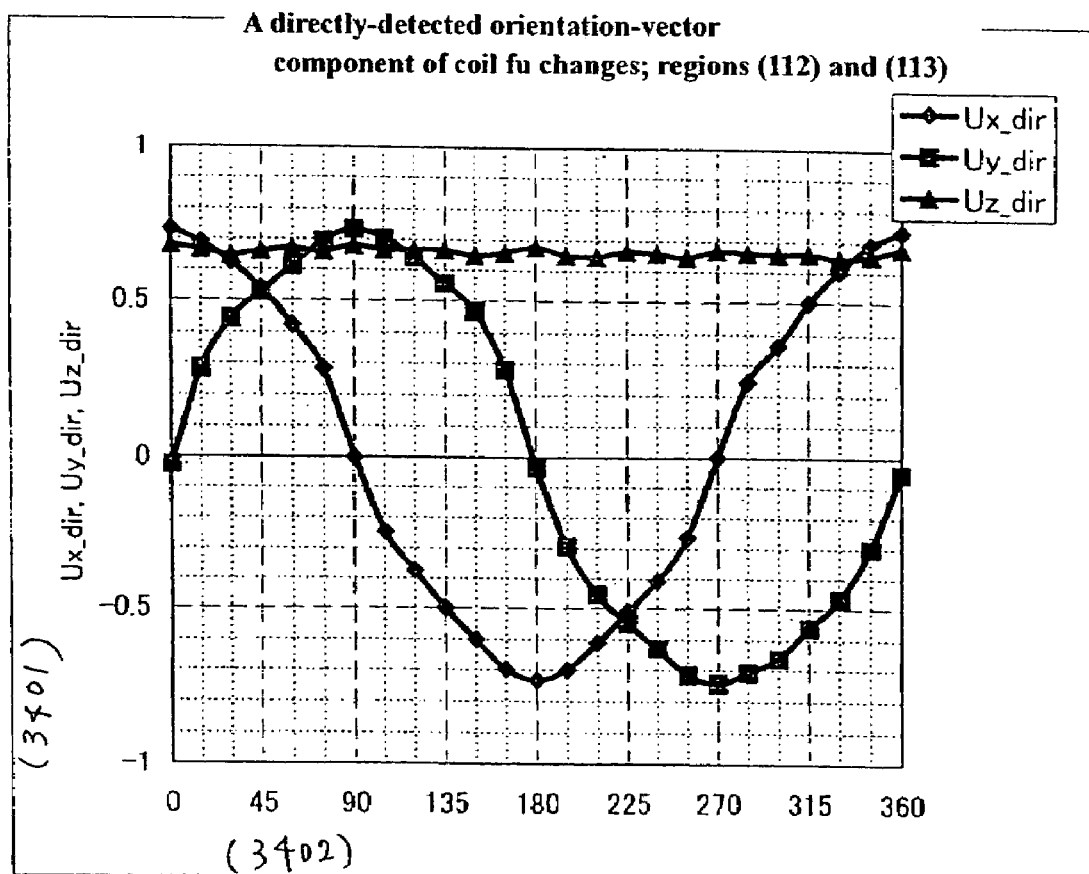
FIG. 34 is a graph illustrating regions (112) and (113) in which a directly-detected orientation-vector component of coil fu changes.
Figure 35:
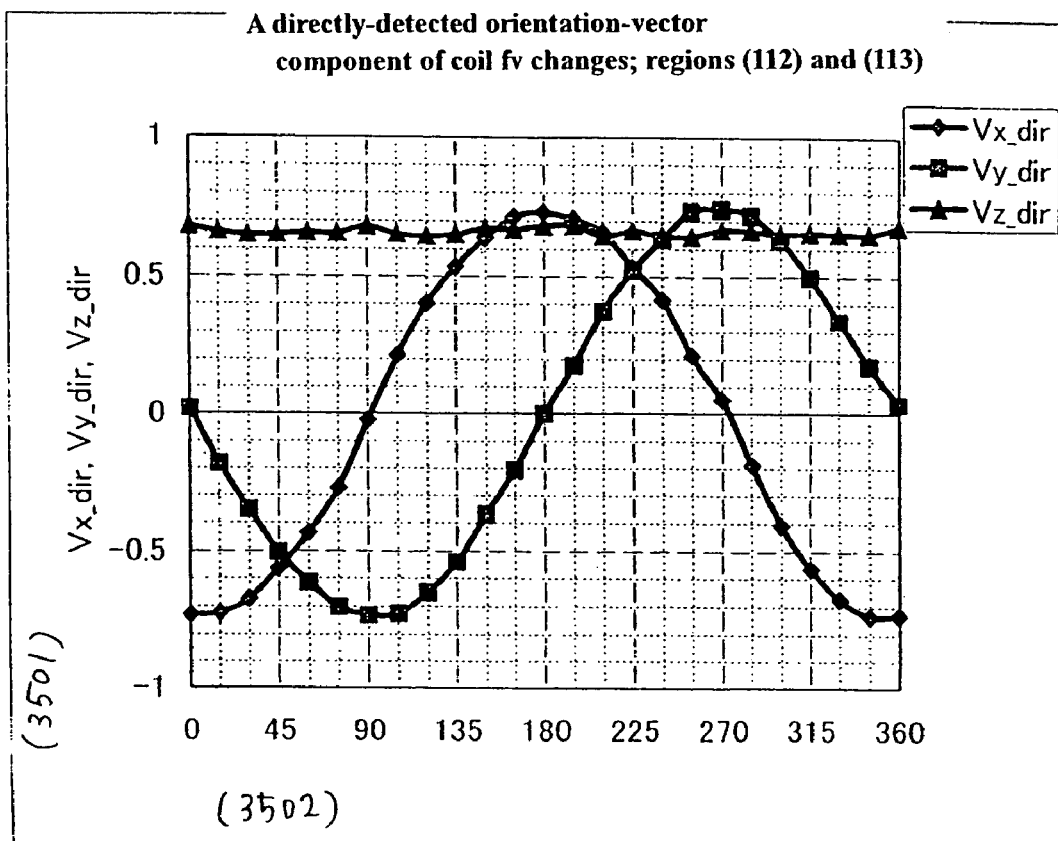
FIG. 35 is a graph illustrating regions (112) and (113) in which a directly-detected orientation-vector component of coil fv changes.
Figure 36:
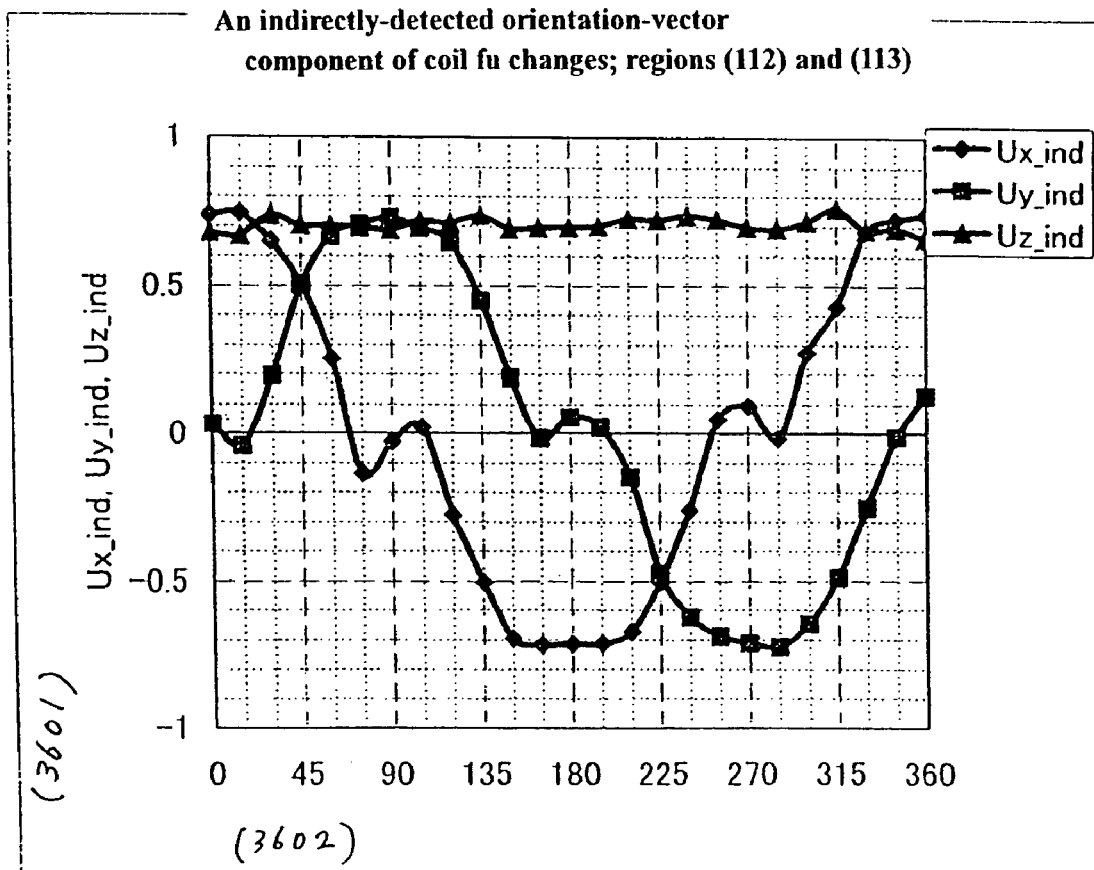
FIG. 36 is a graph illustrating regions (112) and (113) in which an indirectly-detected orientation-vector component of coil fu changes.
Figure 37:
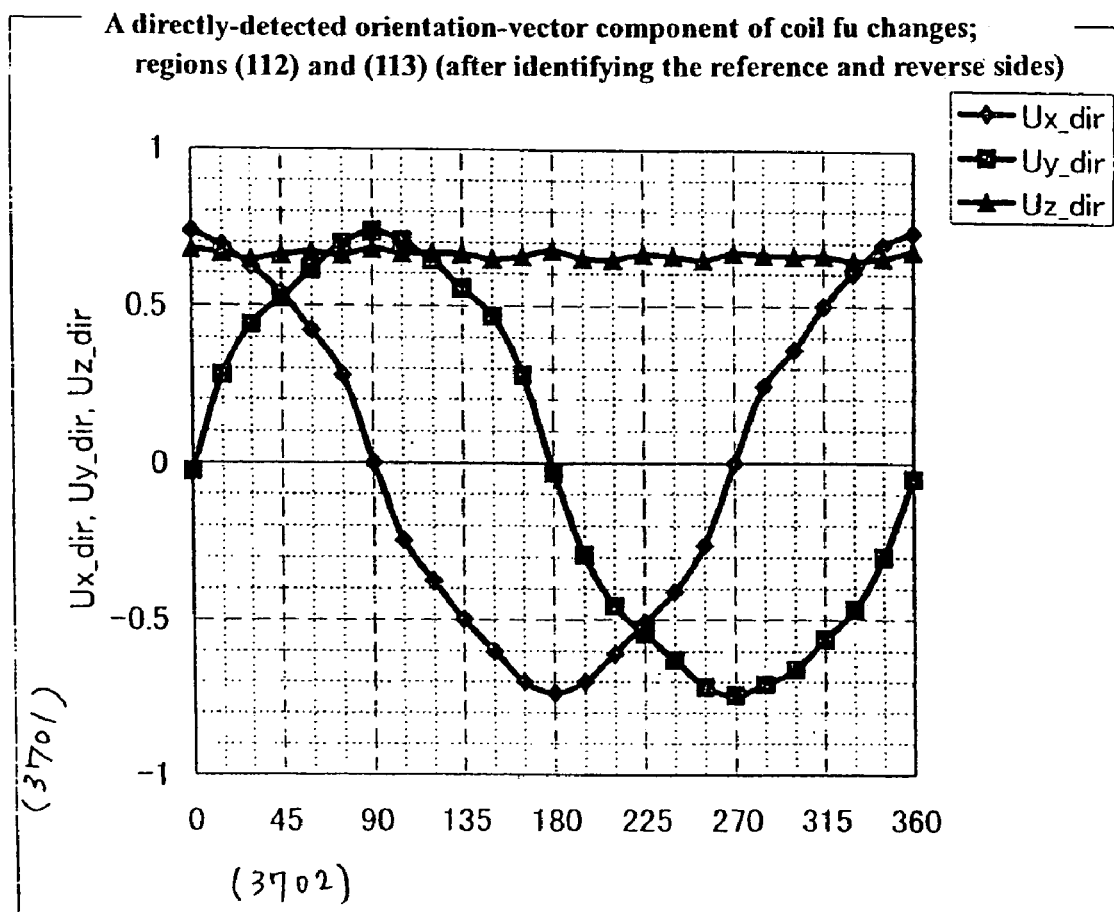
FIG. 37 is a graph illustrating regions (112) and (113) (after identifying the reference and reverse sides) in which a directly-detected orientation-vector component of coil fu changes.
Figure 38:
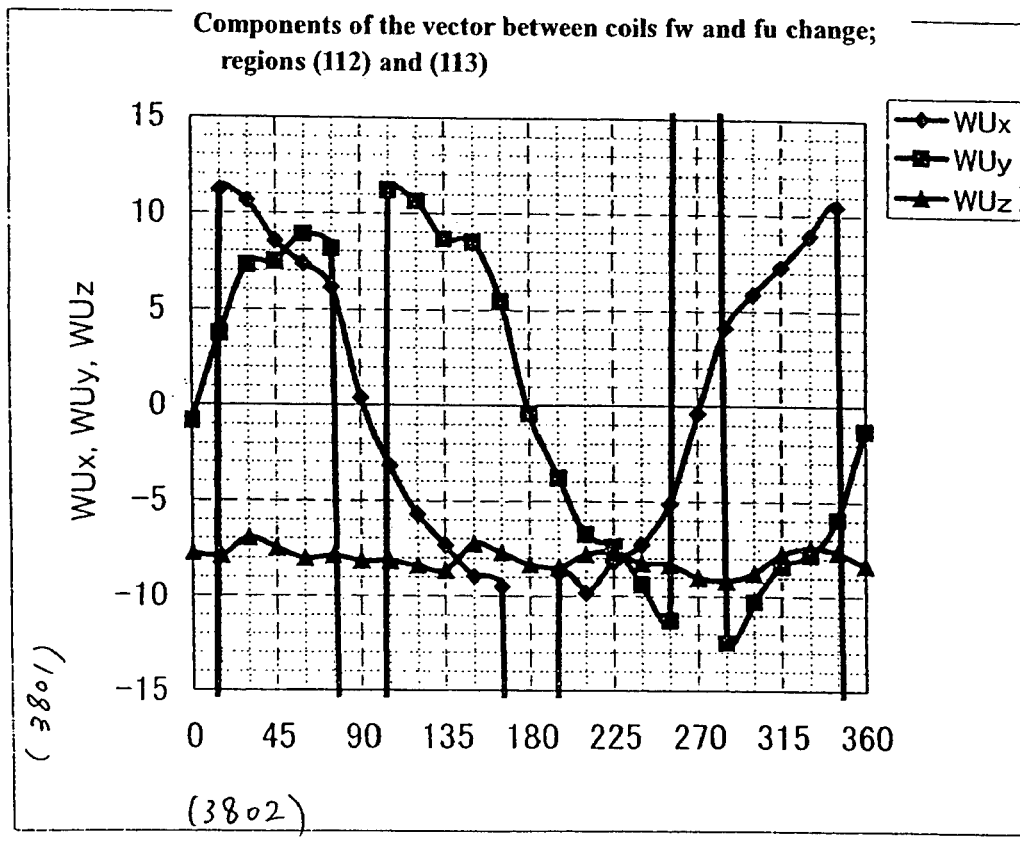
FIG. 38 is a graph illustrating regions (112) and (113) in which components of the vector between coils fw and fu change.
Figure 39:
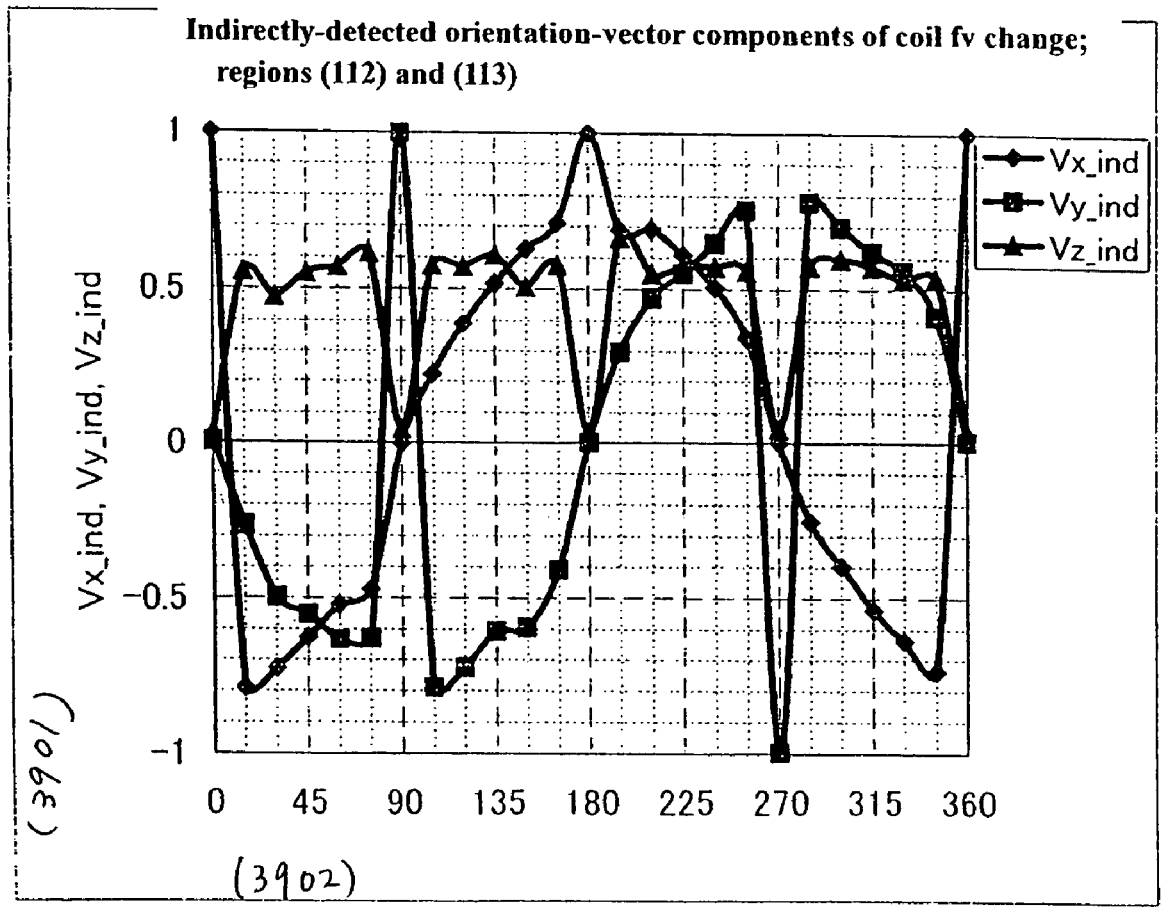
FIG. 39 is a graph illustrating regions (112) and (113) in which indirectly-detected orientation-vector components of coil fv change.
Figure 40:
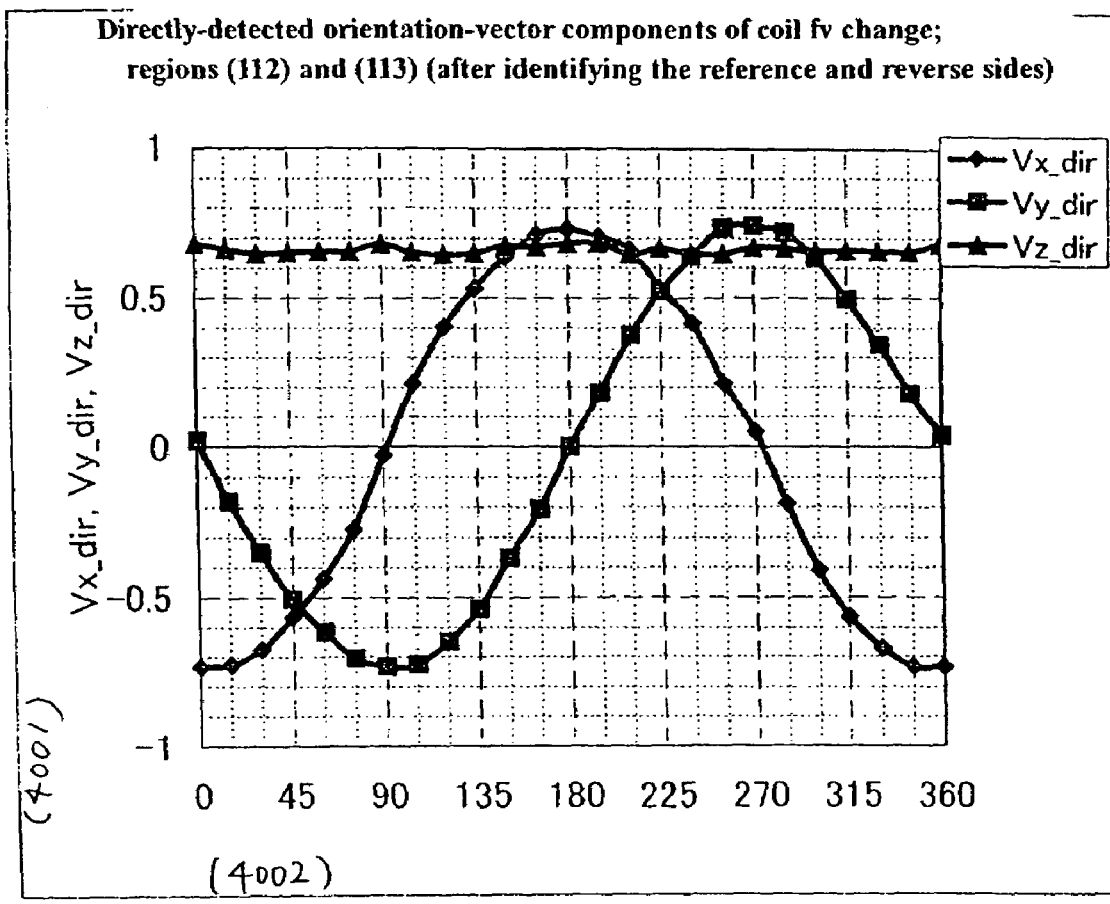
FIG. 40 is a graph illustrating regions (112) and (113) (after identifying the reference and reverse sides) in which directly-detected orientation-vector components of coil fv change.
Figure 41:
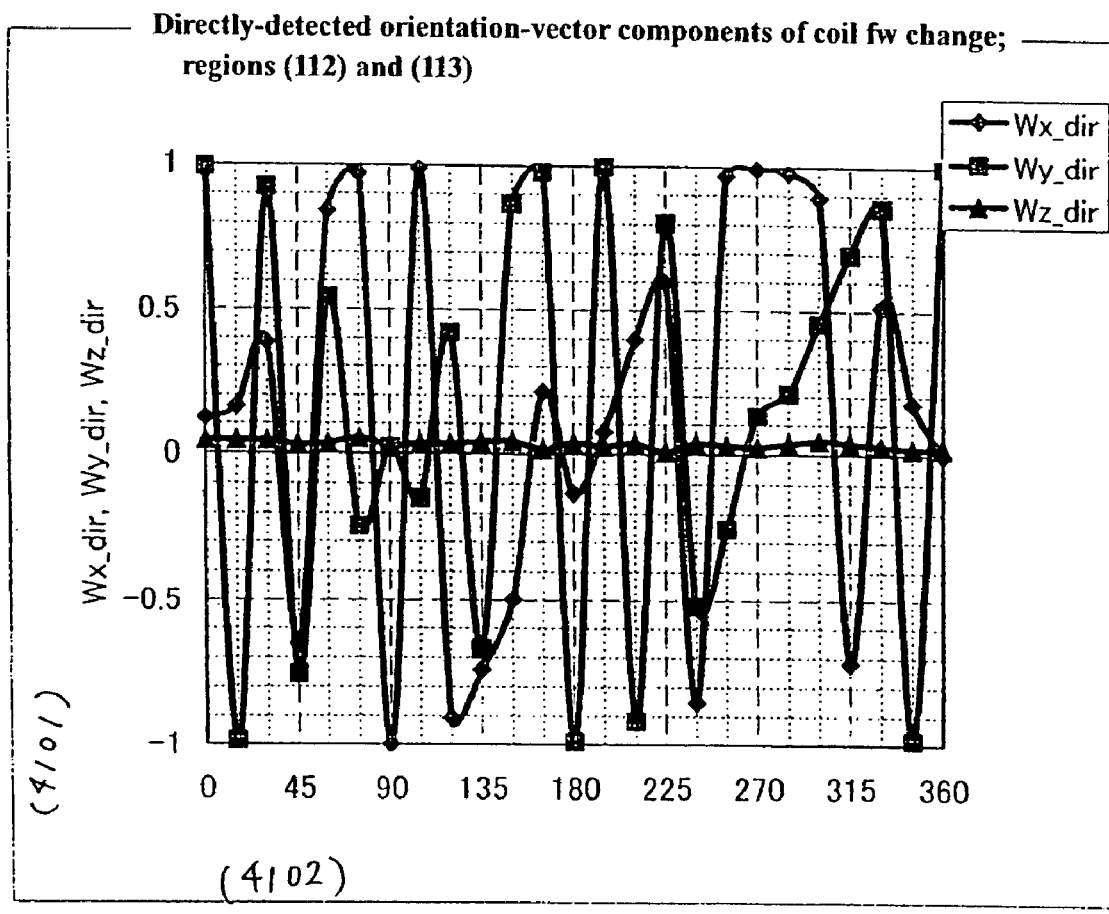
FIG. 41 is a graph illustrating regions (112) and (113) in which directly-detected orientation-vector components of coil fw change.
Figure 42:
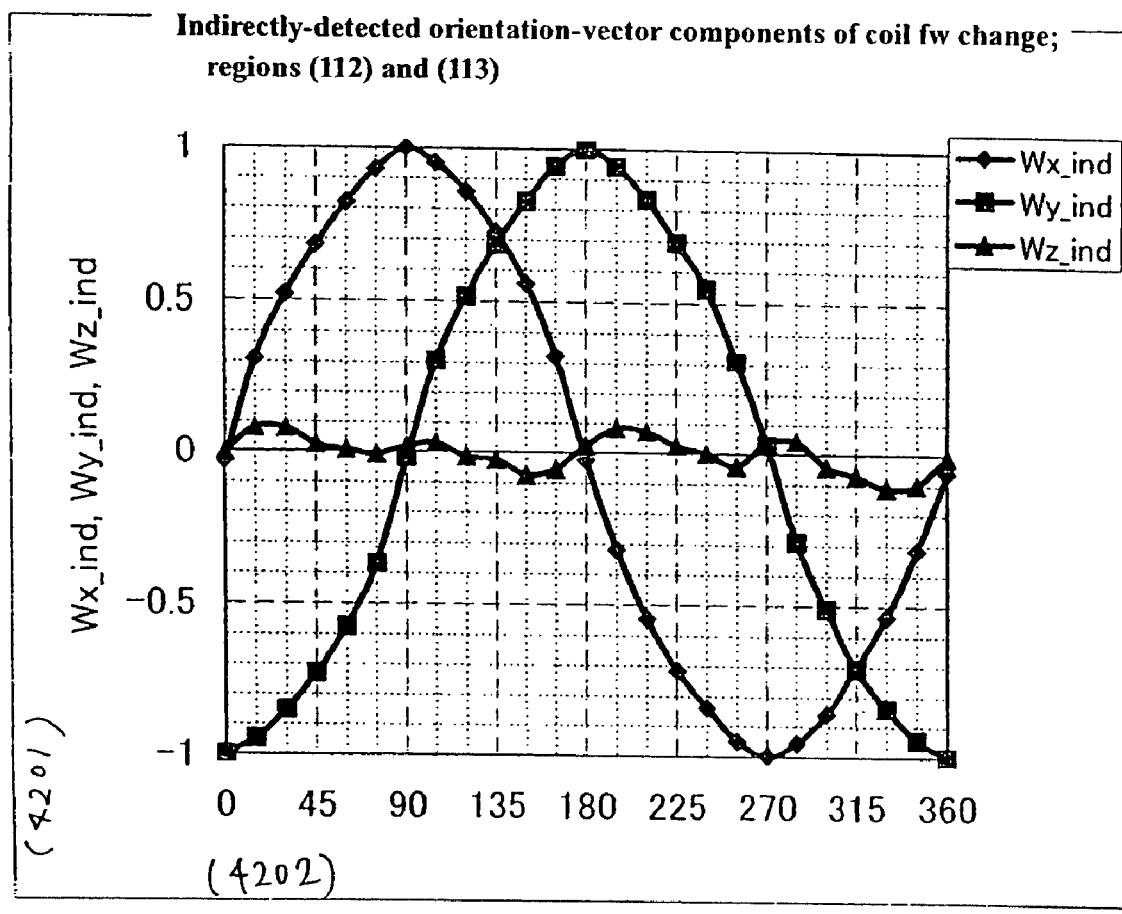
FIG. 42 is a graph illustrating regions (112) and (113) in which indirectly-detected orientation-vector components of coil fw change.
Figure 43:
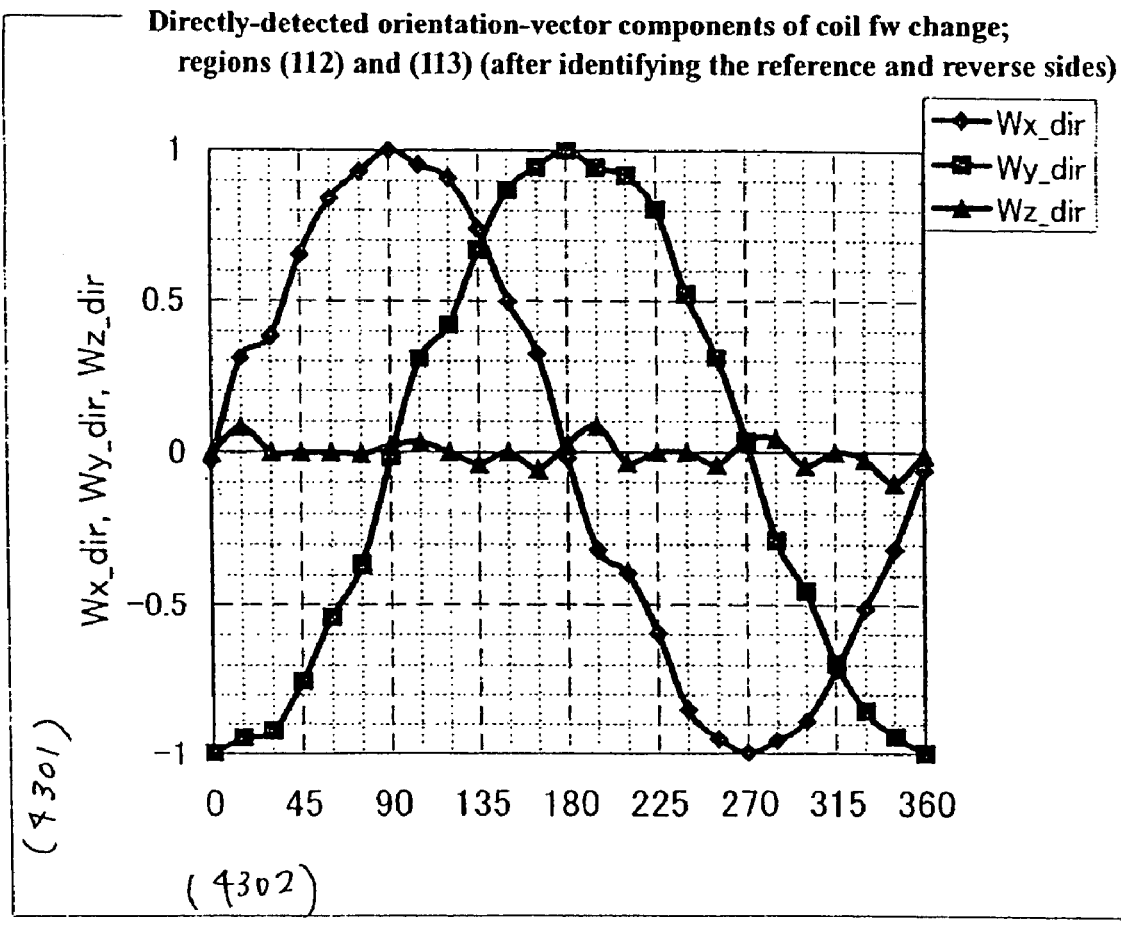
FIG. 43 is a graph illustrating regions (112) and (113) (after identifying the reference and reverse sides) in which directly-detected orientation-vector components of coil fw change.

When, in this case, the identifying of the reference and reverse sides is performed by comparing the directly-detected orientation-vector components of the coil fw with the indirectly-detected orientation-vector components of the coil fw, it is preferable that the directly-detected orientation-vector components of the coil fw be unchanged, as shown in FIG. 33 (similar to FIG. 27).

In the case of the detection regions (112) and (113), processing similar to the above can be performed. Graphs corresponding to the above case are shown in FIGS. 34 to 43. However, by using sign (WUz), the reference and reverse sides are identified.

Next, the cases of the detection regions (331), (221), (321), and (231) are described below. For brevity of description, regarding coordinates, in a state with the center of the sphere 102 fixed, and the sphere 102 rotated around the vertical axis in a horizontal plane, the angle θ of inclination and azimuth angle φ of each input coil (input element), and dependencies on the azimuth angle (azimuth angle φu of the coil fu) in the horizontal plane of the X-, Y-, and Z-coordinates of the centers of the input coils (input elements) were measured. The detection region changed to the detection regions (331), (221), (321), and (231) in the order of the input coils fu, fv, and fw.

Figure 44:
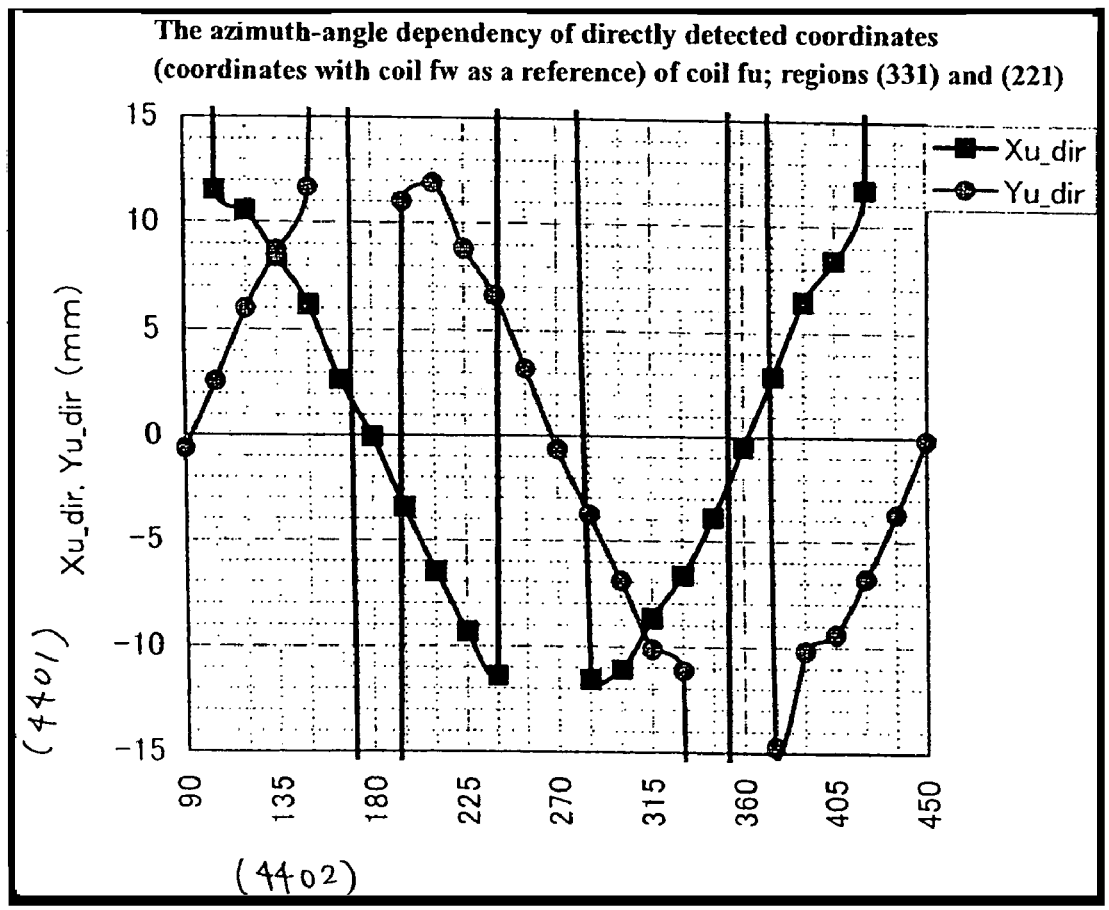
FIG. 44 is a graph illustrating regions (331) and (221) of the azimuth-angle dependency of directly detected coordinates (coordinates with coil fw as a reference) of coil fu.

FIG. 44 shows the results of plotting, for the azimuth angle φu of the coil fu, when the angle θ of the coil fw=0 degrees, the X- and Y-coordinates of the center of the coil fu, while rotating the azimuth angles φ of the coils fu and fv by 15 degrees.

Since both the coils fu and fv are laid on their sides (θ=0 degrees), when each coil becomes in parallel with the X-axis and the Y-axis, its X- and Y-coordinates become indefinite. This state is shown in FIG. 44. In FIG. 44, the X- and Y-coordinates Xu and Yu of the center of the coil fu are obtained when the X- and Y-coordinates of the center of the coil fw are used as the origin. Although the Z-coordinate is constant, it does not become indefinite.

Figure 45:
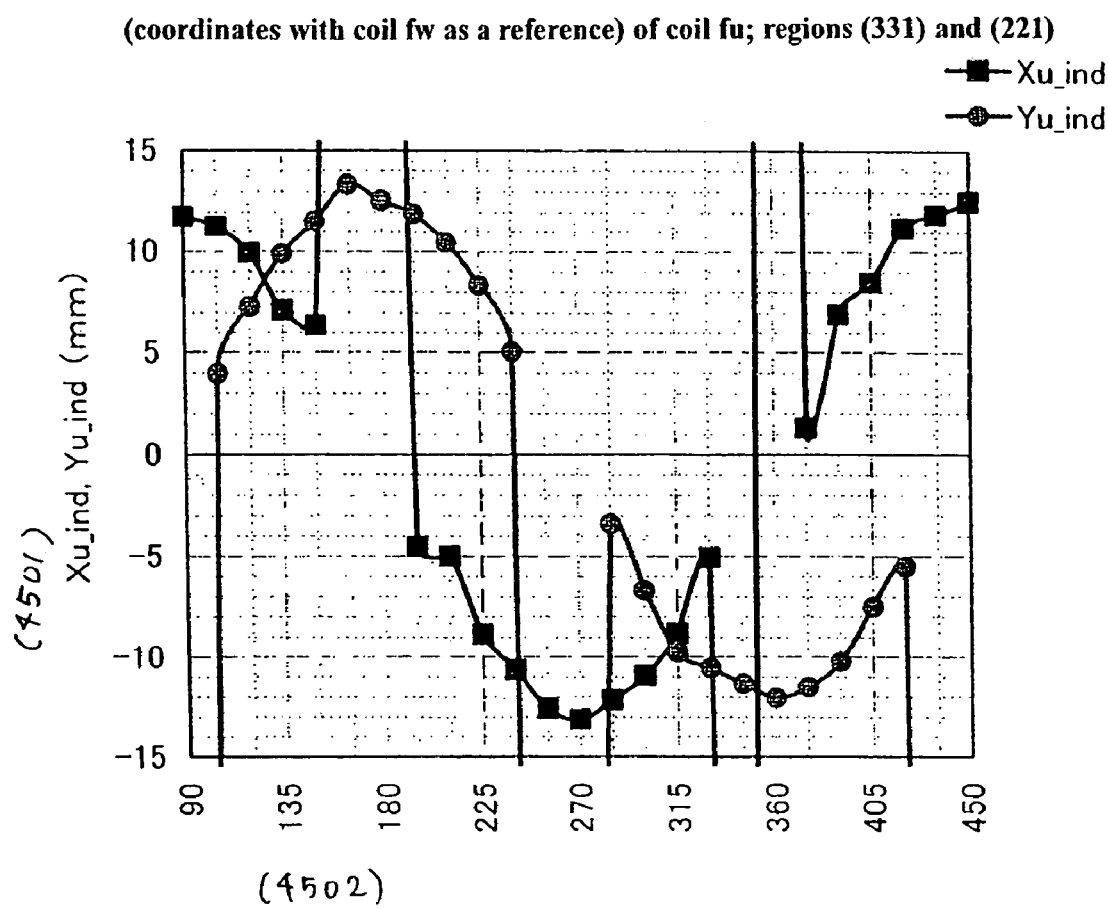
FIG. 45 is a graph illustrating regions (331) and (221) of the azimuth-angle dependency of indirectly detected coordinates (coordinates with coil fw as a reference) of coil fu.
Figure 46:
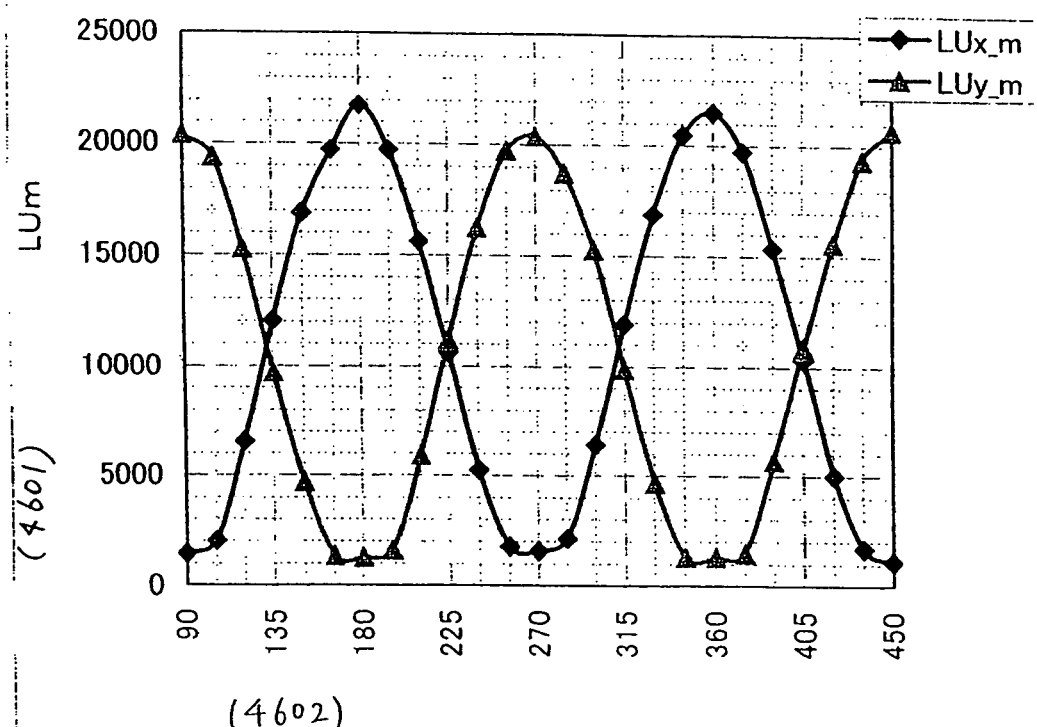
FIG. 46 is a graph illustrating regions (331) and (221) of the azimuth-angle dependency of peak values of the signal level of coil fu.
Figure 47:
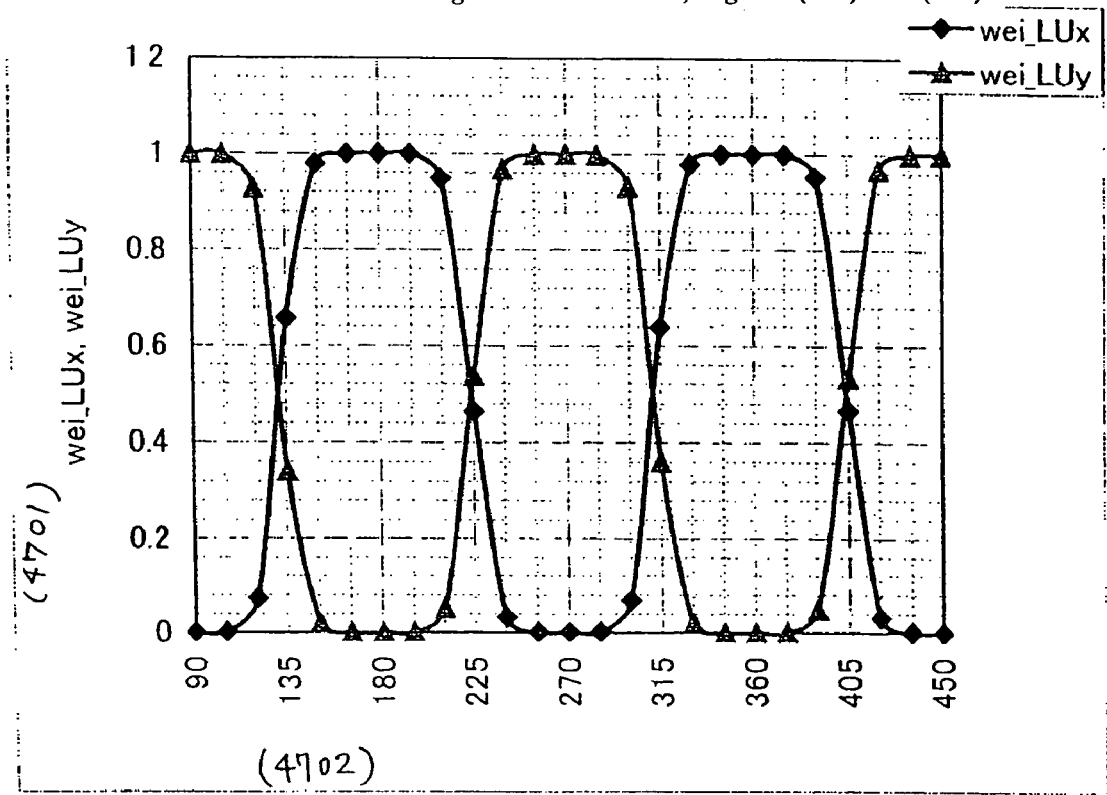
FIG. 47 is a graph illustrating regions (331) and (221) of the azimuth-angle dependency of a weight on the basis of the signal level of coil fu.

FIG. 45 shows the indirectly detected X- and Y-coordinates Xujnd and Yu_ind of the center of the coil fu when the coil fu is changed, as described above. The comparison with FIG. 44 indicates that the indirectly detected coordinates are indefinite at azimuth angles different from those for the directly detected coordinates. Here, by averaging the weights of the directly detected coordinates and the indirectly detected coordinates, the weight-averaged values are set so as to have consecutively smooth changes without having rapid changes when selectively switching the directly detected coordinates and the indirectly detected coordinates (step S325). Accordingly, in order to effectively use coordinates that are directly detected and indirectly detected, a weight for weight averaging is set. The result of plotting the peak values of X- and Y-signals of the coil fu is as shown in FIG. 46. As represented by each of the following expressions, the peak values are used to make a ratio and the ratio is cubed to generate weights wei_LUxm and wei_LUym as shown in FIG. 47.

$$wei\_LUxm=(LUxm/(LUxm+LUym))^3$$

$$wei\_LUym=(LUym/(LUxm+LUym))^3$$

Figure 48:
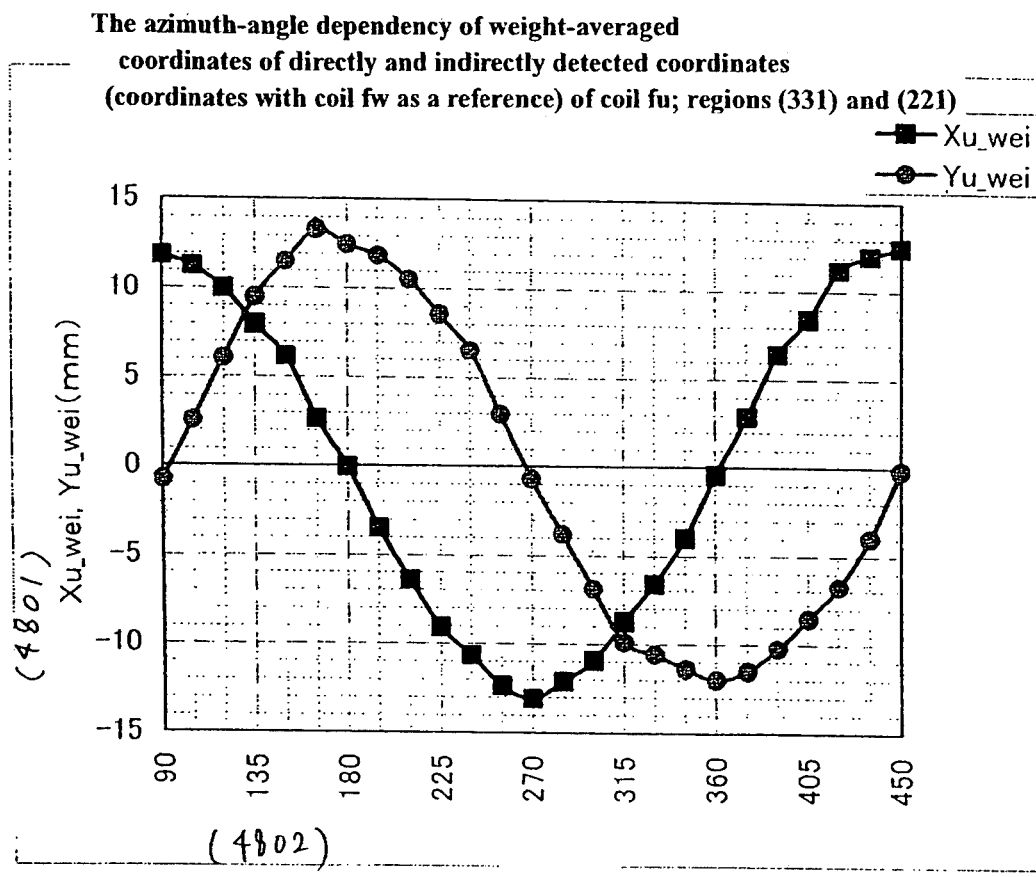
FIG. 48 is a graph illustrating regions (331) and (221) of the azimuth-angle dependency of weight-averaged coordinates of directly and indirectly detected coordinates (coordinates with coil fw as a reference) of coil fu.

When using the weights wei_LUxm and wei_LUym to average the weights of the directly detected coordinates and the indirectly detected coordinates by $$Xu\_wei=wei\_LUx \cdot Xu\_dir+(1-wei\_LUx) \cdot Xu\_ind$$

$$Yu\_wei=wei\_LUy \cdot Yu\_dir+(1-wei\_LUy) \cdot Yu\_ind$$

the weight-averaged values have consecutively smooth changes as shown in FIG. 48 without having rapid changes when selectively switching the directly detected coordinates and the indirectly detected coordinates.

Figure 49:
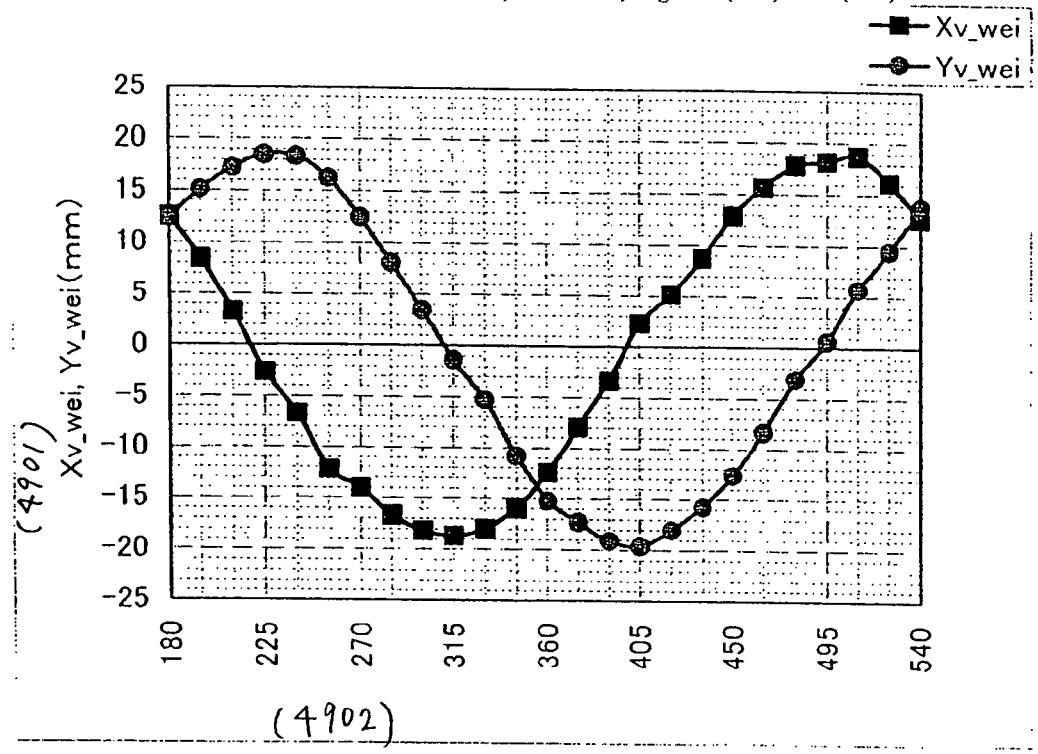
FIG. 49 is a graph illustrating regions (331) and (221) of the azimuth-angle dependency of weight-averaged coordinates of directly and indirectly detected coordinates (coordinates with coil fw as a reference) of coil fv.

Similarly, in the case of the coil fv, by using the following expressions to perform weight averaging, the weight-averaged values have smooth changes as shown in FIG. 49.

$$Xv\_wei=wei\_LVx \cdot Xv\_dir+(1-wei\_LVx) \cdot Xv\_ind$$

$$Yv\_wei=wei\_LVy \cdot Yv\_dir+(1-wei\_LVy) \cdot Yv\_ind$$

Figure 50:
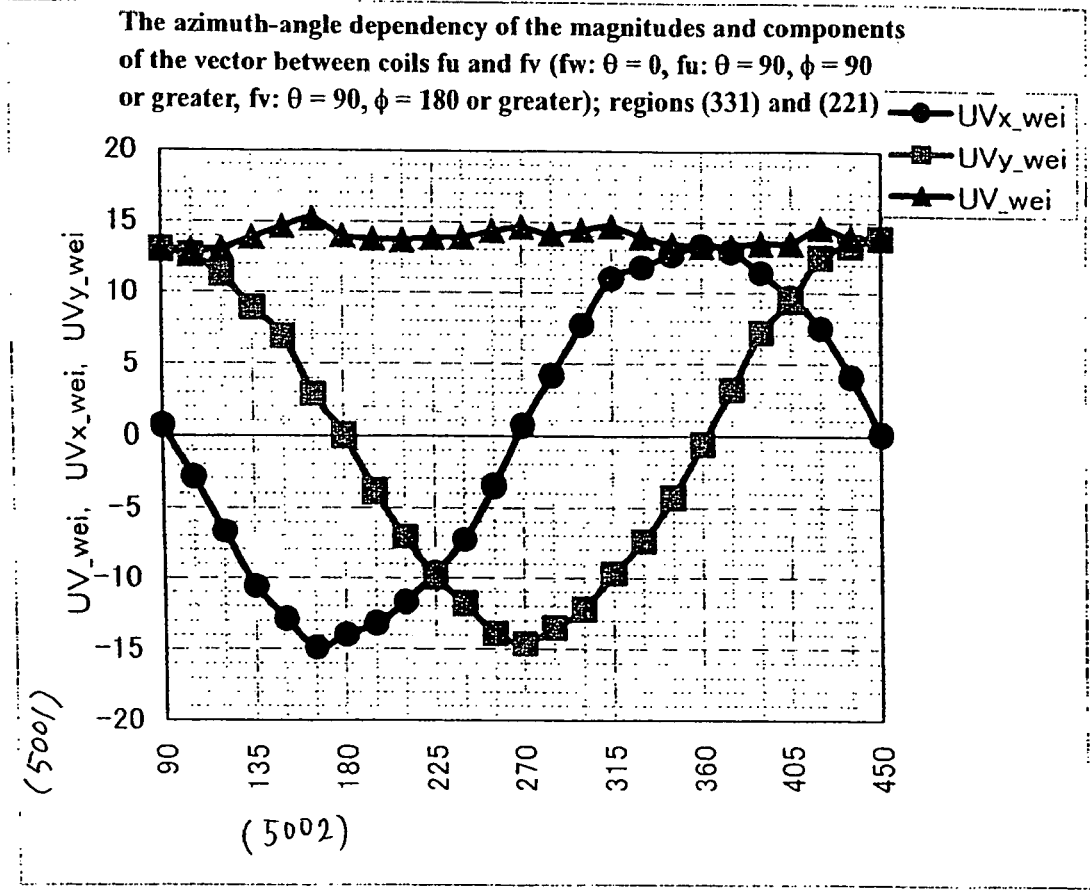
FIG. 50 is a graph illustrating regions (331) and (221) of the azimuth-angle dependency of the magnitudes and components of the vector between coils fu and fv (fw: $\theta=0$, fu: $\theta=90$, $\phi=90$ or greater, fv: $\theta=90$, $\phi=180$ or greater)

These results are used to calculate the vector between the coils fu and fv. FIG. 50 is a graph showing that the magnitude component of the vector between the coils fu and fv is dependent on the azimuth angle φu of the coil fu.

Figure 51:
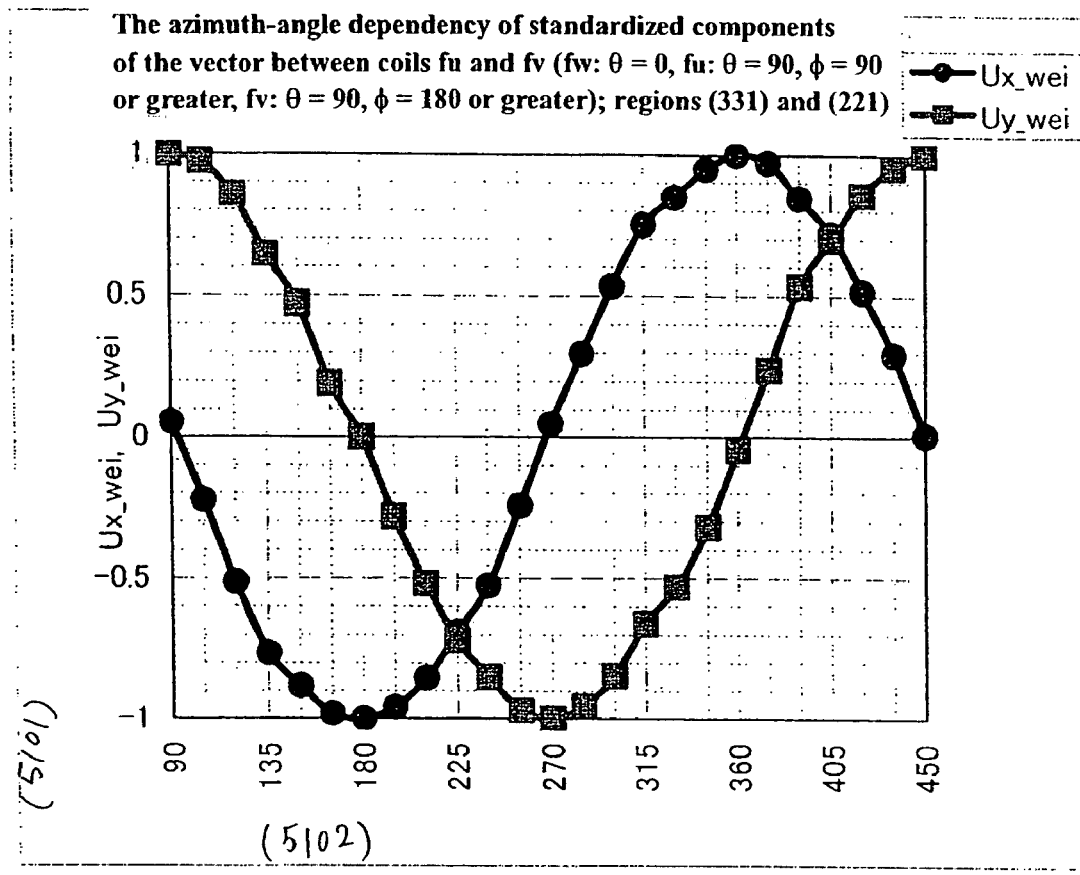
FIG. 51 is a graph illustrating regions (331) and (221) of the azimuth-angle dependency of standardized components of the vector between coils fu and fv (fw: $\theta=0$, fu: $\theta=90$, $\phi=90$ or greater, fv: $\theta=90$, $\phi=180$ or greater)
Figure 52:
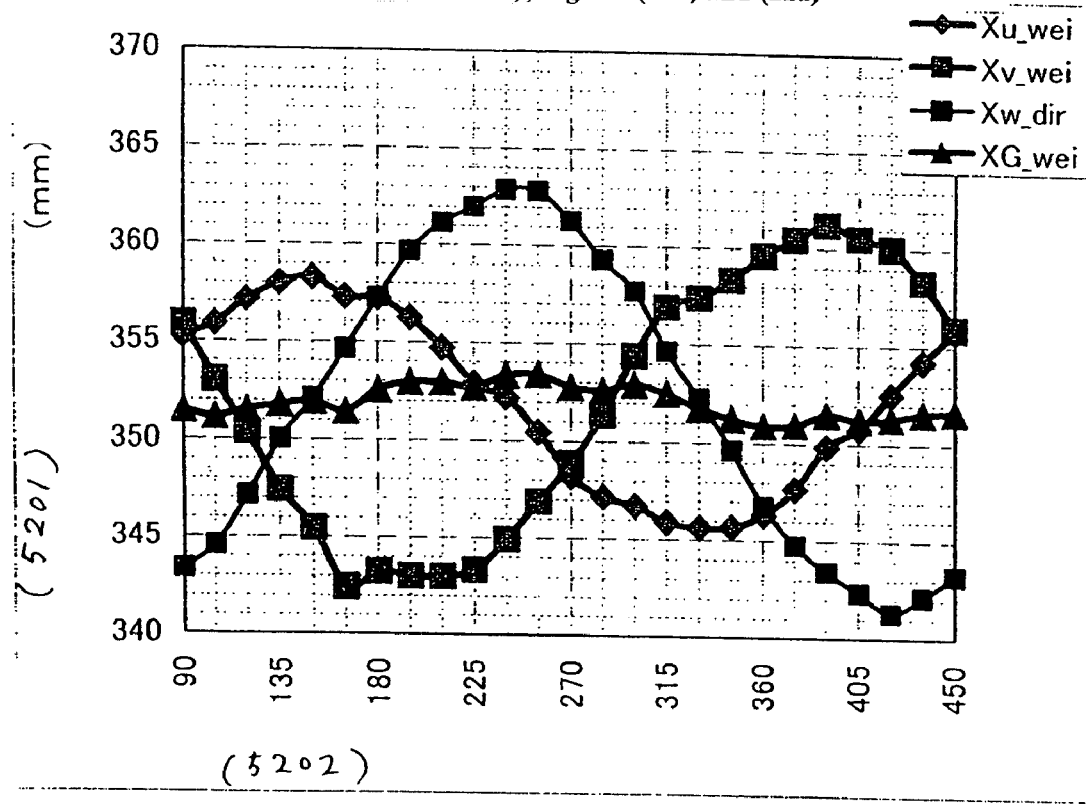
FIG. 52 is a graph illustrating regions (331) and (221) of the azimuth-angle dependency of indirectly detected X-coordinates of three coils and the center of gravity of a sphere (coil fw represented in directly detected coordinates)
Figure 53:
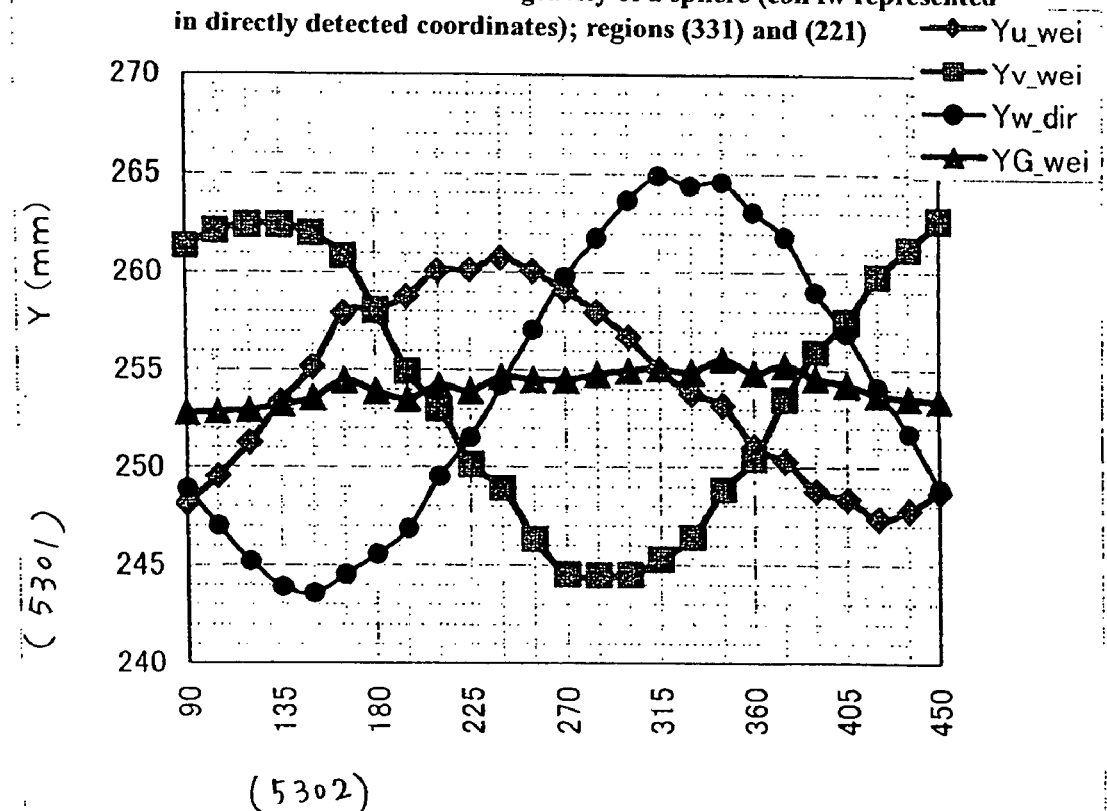
FIG. 53 is a graph illustrating regions (331) and (221) of the azimuth-angle dependency of indirectly detected Y-coordinates of three coils and the center of gravity of a sphere (coil fw represented in directly detected coordinates)

FIG. 51 is a graph showing the azimuth-angle dependency of a standardized component of the vector between the coils fu and fv.

Next, when inputting detected coordinates (Xw, Yw) on the tablet and drawing a graph from coordinates with the coil fw as the origin, it is found that, although both the coordinates Xw and YW trigonometrically change, the center of the sphere 102 is close to being constant.

Figure 54:
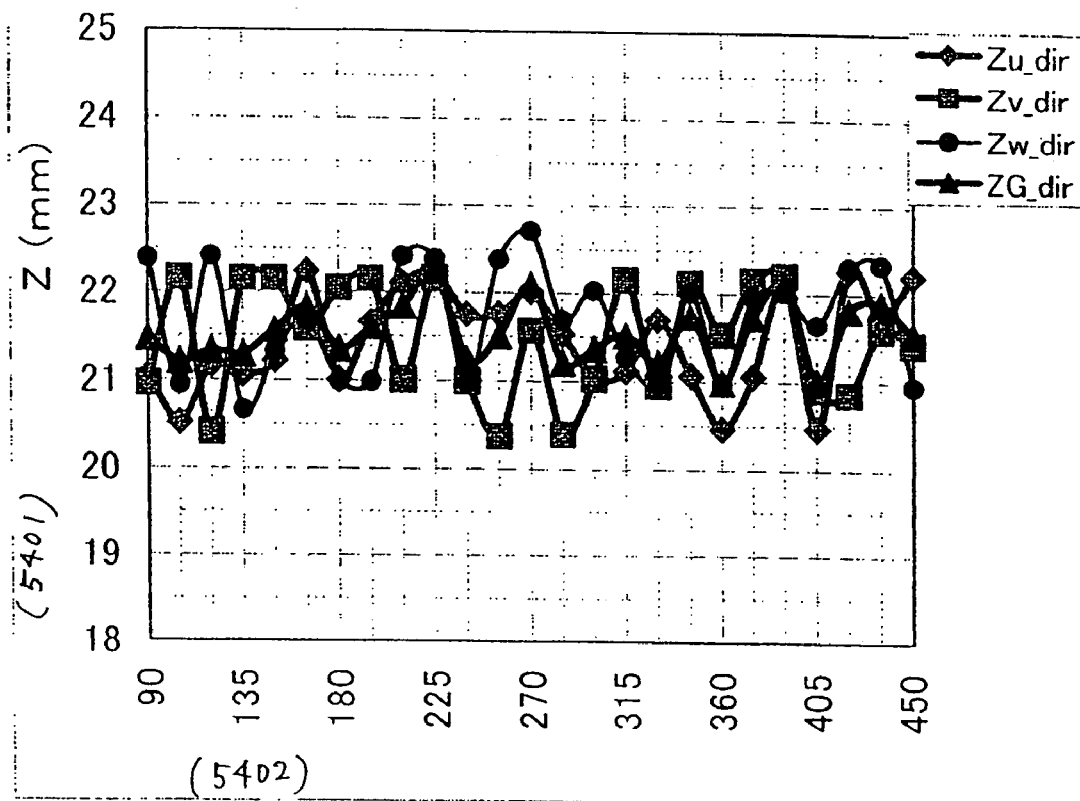
FIG. 54 is a graph illustrating regions (331) and (221) of the azimuth-angle dependency of Z-coordinates of three coils and the center of gravity of a sphere.

FIG. 54 is a graph showing, for the azimuth angle φu of the coil fu, changes in the directly detected central heights of three coils fu, fv, and fw, and in the central height of the sphere 102.

Figure 55:
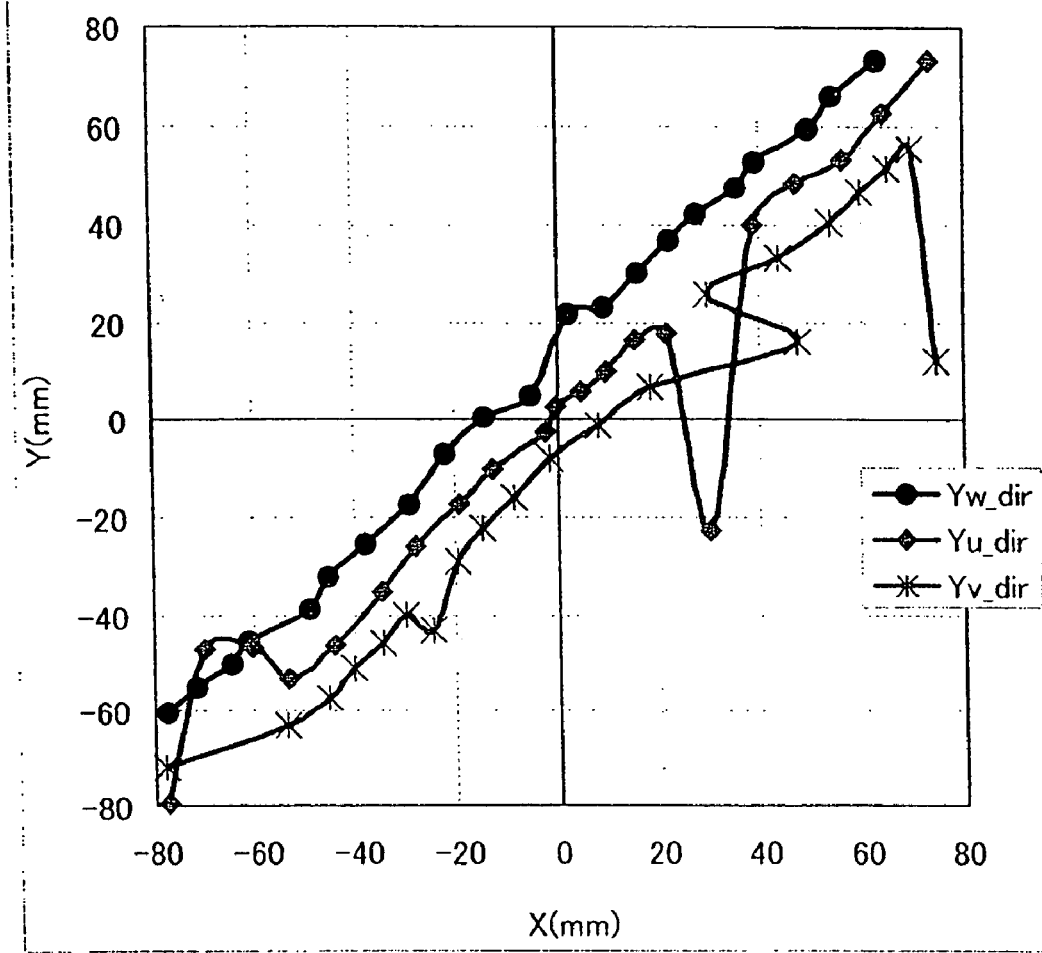
FIG. 55 is a graph illustrating changes in directly detected coordinates of three coils when a sphere is rolled in a direction in which azimuth $\phi=45$ degrees.
Figure 56:
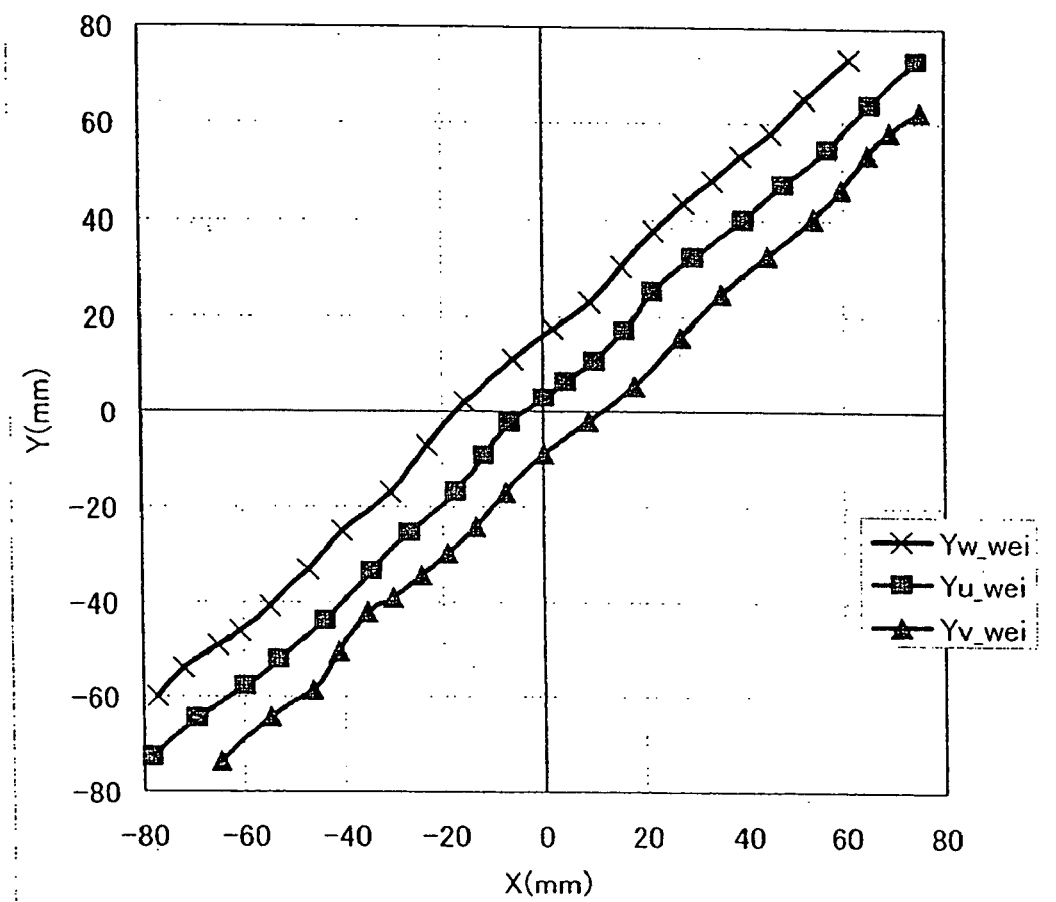
FIG. 56 is a graph illustrating changes in weight-averaged values of indirectly and directly detected coordinates of three coils when a sphere is rolled in a direction in which azimuth $\phi=45$ degrees.

FIG. 55 is a graph showing changes in the X- and Y-coordinates of the three coils fu, fv, and fw which are detected each time the inputting device 101 travels by 10 millimeters when it is rolled in a direction in which the azimuth angle φ=45 degrees. As shown in FIG. 55, the changes include turning portions, and the portions have indefinite coordinates, thus causing discontinuity in detected coordinates.

When averaging the weights of the directly detected coordinates and the indirectly detected coordinates of the X- and Y-coordinates, the changes become substantially linear as indicated by Yu_wei, Yv_wei, and Yw_wei.

Figure 57:
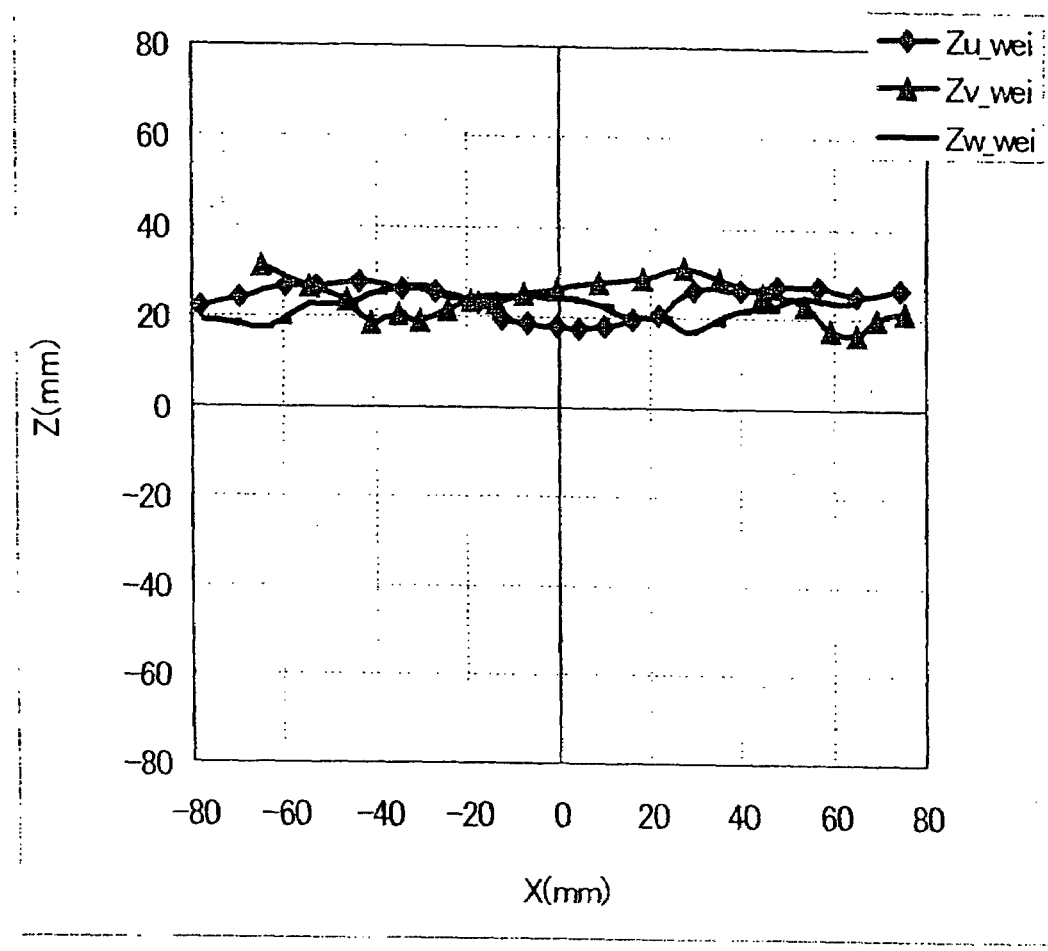
FIG. 57 is a graph illustrating changes in weight-averaged coordinates of indirectly and directly detected coordinates of three coils when a sphere is rolled in a direction in which azimuth $\phi=45$ degrees.

FIG. 57 is a graph showing changes in heights Z of three coils fu, fv, and fw when the inputting device 101 is rolled in a direction in which the azimuth angle φ=45 degrees. Since there are no indefinite coordinates concerning height Z as shown in FIG. 57, the directly detected coordinates are directly employed.

Figure 58:
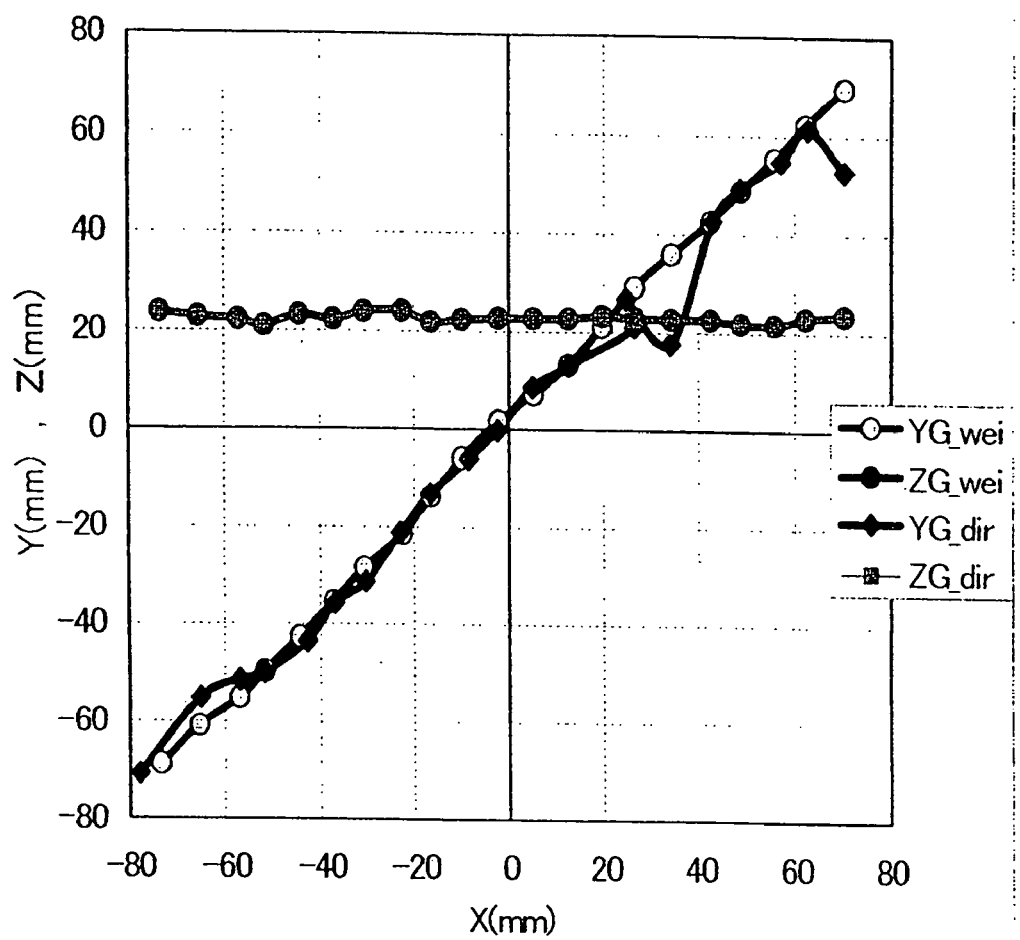
FIG. 58 is a graph illustrating changes in weight-averaged coordinates of directly and indirectly detected coordinates of the center of gravity when a sphere is rolled in a direction in which azimuth $\phi=45$ degrees.

The directly detected X- and Y-coordinates of the center of the inputting device 101 (the sphere 102) may have large error due to coordinate indefiniteness. However, by averaging the weights of the indirectly detected X- and Y-coordinates, a coordinate-change state is linearly detected as indicated by YG_wei in FIG. 58. In addition, as the height Z, a directly detected Z-coordinate is used.

The three-dimensional coordinates (XG_wei, YG_wei, ZG_wei) of the center of the inputting device 101 (the sphere 102) are detected (step S326). This center is, in this embodiment, the center (composite center) of the centers of the three input coils 106 to 108.

Figure 59:
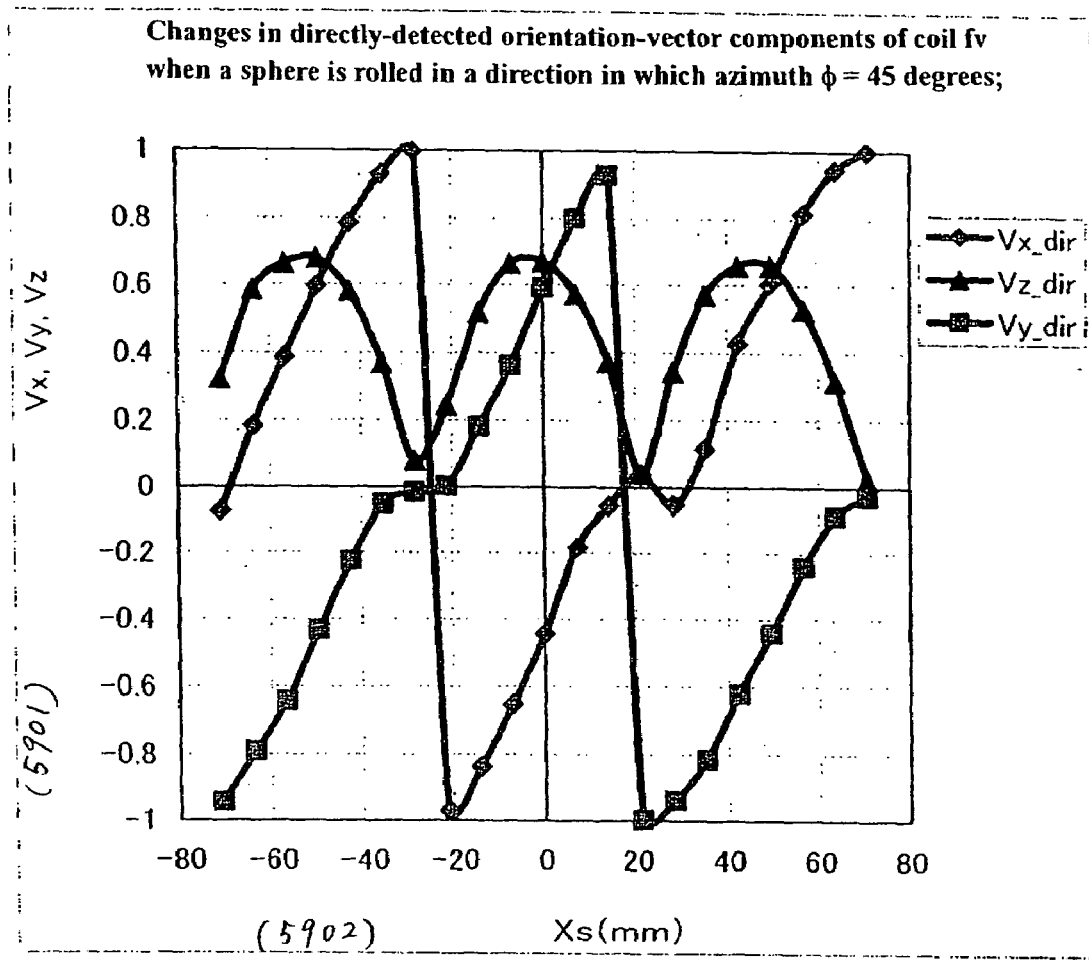
FIG. 59 is a graph illustrating changes in directly-detected orientation-vector components of coil fv when a sphere is rolled in a direction in which azimuth $\phi=45$ degrees.

For example, a directly detected orientation vector component of the coil fv among the three coils fu, fv, and fw is directed to only the northern hemisphere (the Z-component is always zero or positive). Accordingly, as shown in FIG. 59, the polarities of the X- and Y-components are often inverted. The coils fu and fw have similar characteristics.

Figure 60:
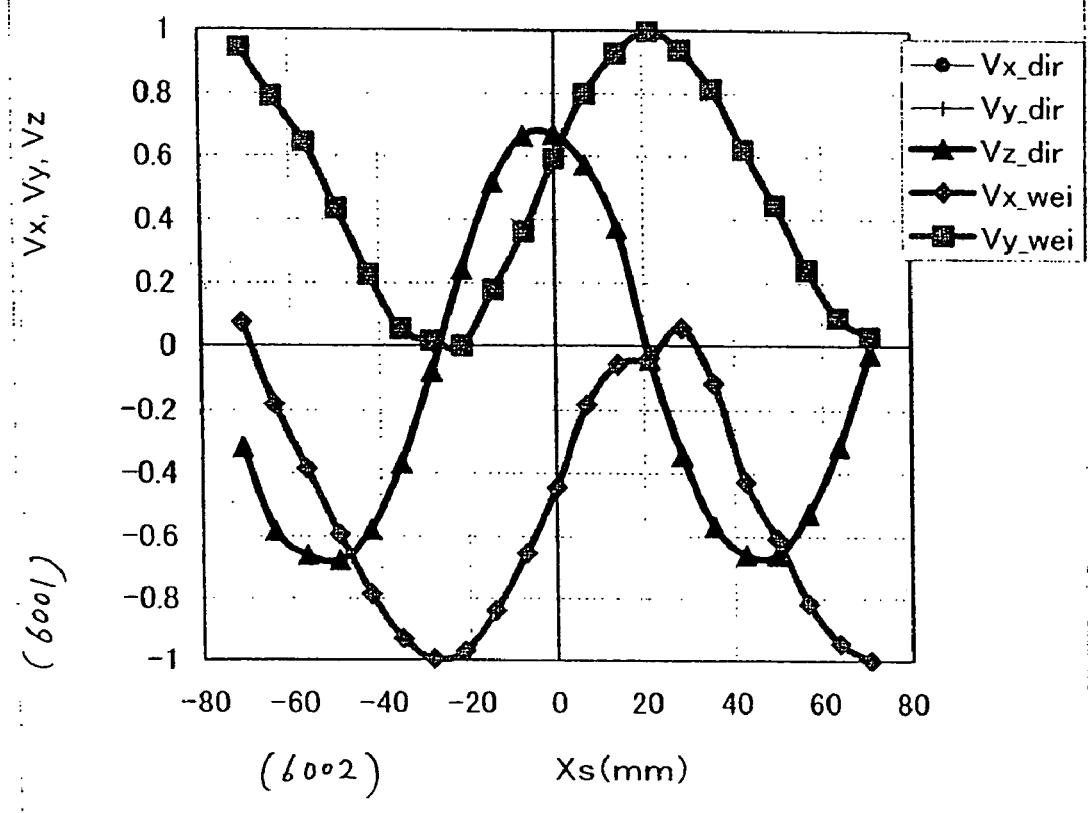
FIG. 60 is a graph illustrating changes in weight-averaged values of directly- and indirectly-detected orientation-vector components of coil fv when a sphere is rolled in a direction in which azimuth $\phi=45$ degrees.

After identifying mirror images and the reference and reverse sides for the directly detected orientation vectors on the basis of the indirectly detected orientation vectors, by averaging the weights of the directly detected orientation vectors and the indirectly detected orientation vectors, the obtained values have smooth trigonometrical changes as shown in FIG. 60. However, regarding only the Z-components of the orientation vectors, the directly detected orientation vector components are directly used as weight averages. Accordingly, as represented by the following expression, the attitude of the inputting device 101 is detected (step S327).

$$(U\_wei \quad V\_wei \quad W\_wei) = \begin{pmatrix} Ux\_wei & Vx\_wei & Wx\_wei \\ Uy\_wei & Vy\_wei & Wy\_wei \\ Uz\_wei & Vz\_wei & Wz\_wei \end{pmatrix}$$

where: U_wei, V_wei, and W_wei respectively represent orientation vectors calculated based on averaging of the weights of the coils fu, fv, and fw; Ux_wei, Uy_wei, and Uz_wei represent the X-, Y-, and Z-coordinates of the orientation vector U_wei; Vx_wei, Vy_wei, Vz_wei represent the X-, Y-, and Z-coordinates of the orientation vector V_wei, and Wx_wei, Wy_wei, and Wz_wei represent the X-, Y-, and Z-coordinates of the orientation vector W_wei.

Adding the above-described three-dimensional coordinates and this attitude, six-dimensional detection is performed.

Figure 61:
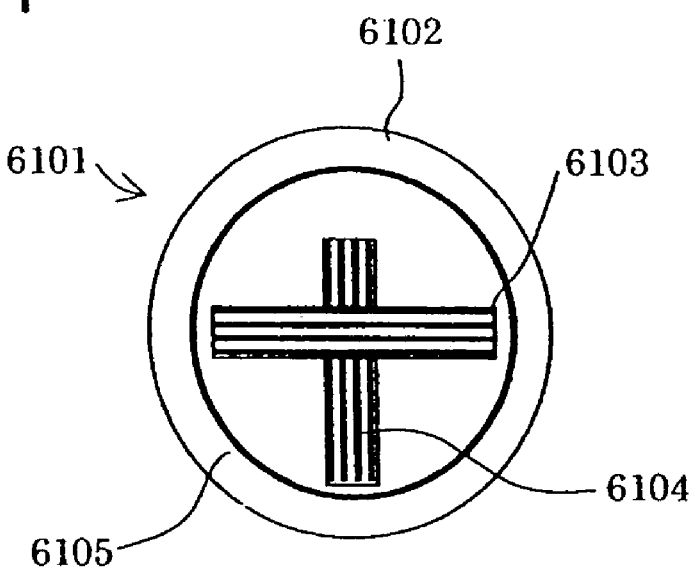
FIG. 61 is a plan view of a three-dimensional-information inputting device according to a second embodiment of the present invention.
Figure 62:
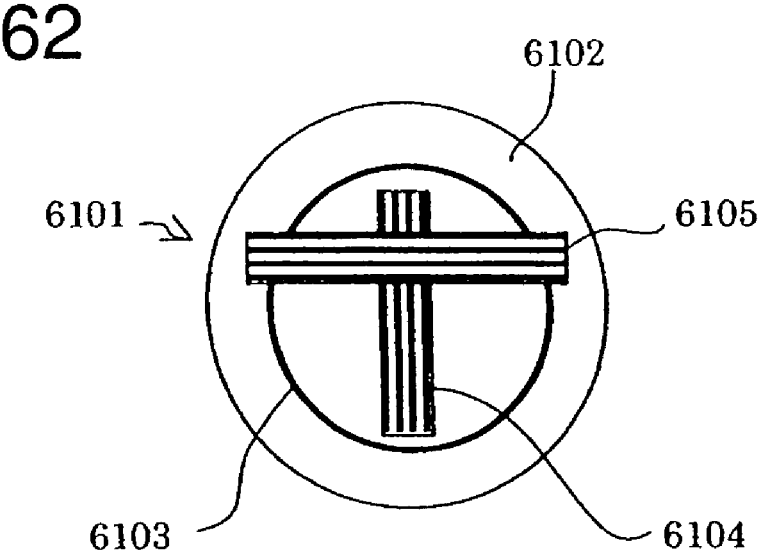
FIG. 62 is a front view of the inputting device according to the second embodiment of the present invention.
Figure 63:
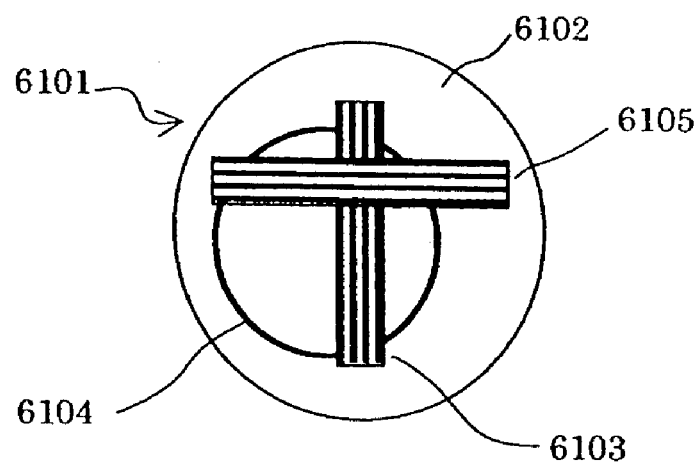
FIG. 63 is a right side view of the inputting device according to the second embodiment of the present invention.

FIGS. 61 to 63 are a plan view, front view, and right side view of a three-dimensional-information inputting device 6101 according to a second embodiment of the present invention. In FIGS. 61 to 63, identical portions are denoted by identical reference numerals.

As shown in FIGS. 61 to 63, the inputting device 6101 is provided on and in a sphere 6102, and includes a plurality of input coils (three input coils 6103, 6104, and 6105 in the second embodiment) that form input elements.

The input coils 6103 to 6105 are cylindrical air-core coils, and are provided in the sphere 6102, which is made of insulating material such as resin, so that axes (coil axes) that pass through the cylindrical centers of the input coils 6103 to 6105 are at right angles to one another. However, the input coils 6103 to 6105 may be provided so as to cross one another in chain form.

Also in the inputting device 6101 according to the second embodiment, which includes the input coils 6103 to 6105 arranged so as not to magnetically interfere with one another, processing similar to that described concerning the first embodiment is performed by a three-dimensional-information detecting device, whereby the reference and reverse sides and mirror images can be identified and three-dimensional information, such as a position and attitude, input from the inputting device 6101, can be easily detected.

Accordingly, three-dimensional information input by the inputting device 6101 can be detected by the detecting device. Although, in the inputting device 101 according to the first embodiment, the two coils 106 and 107 (the input elements 103 and 104) are coplanar, in a three-dimensional-information inputting device 6401 according to the second embodiment, all the input coils are provided on different planes, so that the inputting device 101 and the inputting device 6101 differ in that the coil positions shift. Thus, when using the detecting device to calculate three-dimensional information from detection signals, a three-dimensional-information detecting system using the inputting device 6101 needs to perform calculation considering the amount of shifting of the coils.

Figure 64:
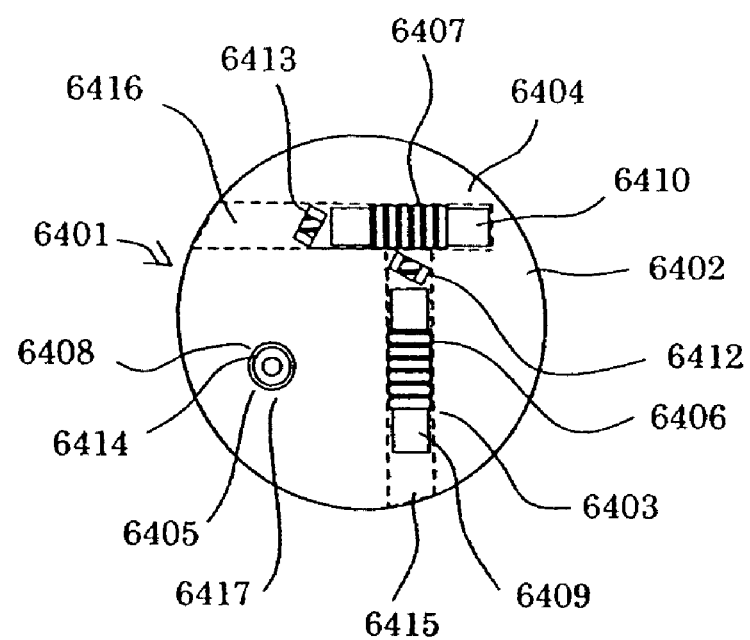
FIG. 64 is a plan view of a three-dimensional-information inputting device according to a third embodiment of the present invention.
Figure 65:
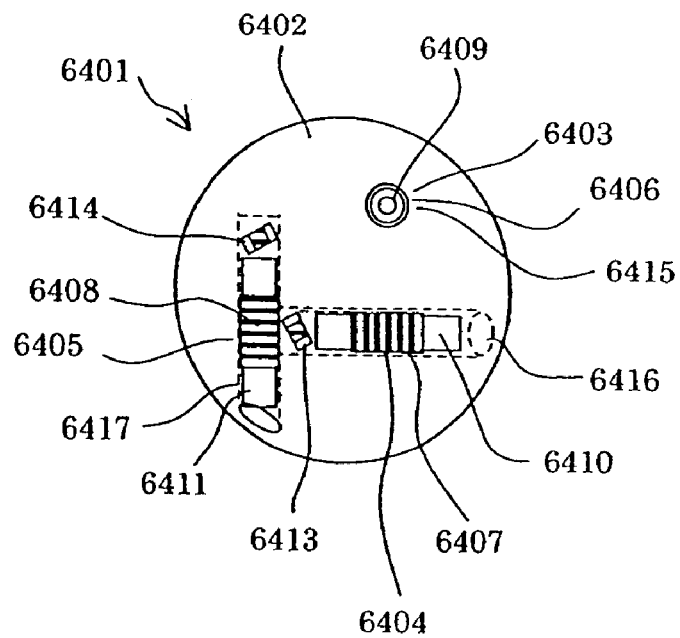
FIG. 65 is a front view of the inputting device according to the third embodiment of the present invention.
Figure 66:
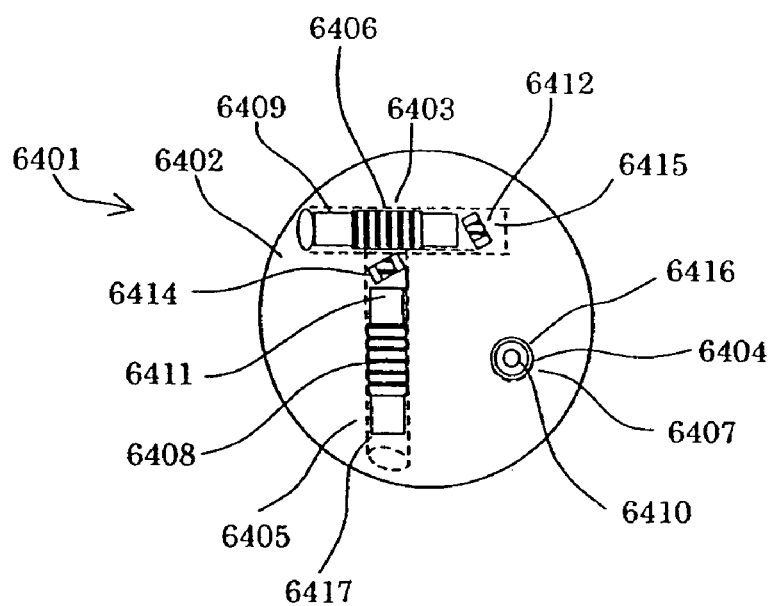
FIG. 66 is a right side view of the inputting device according to the third embodiment of the present invention.
Figure 67:
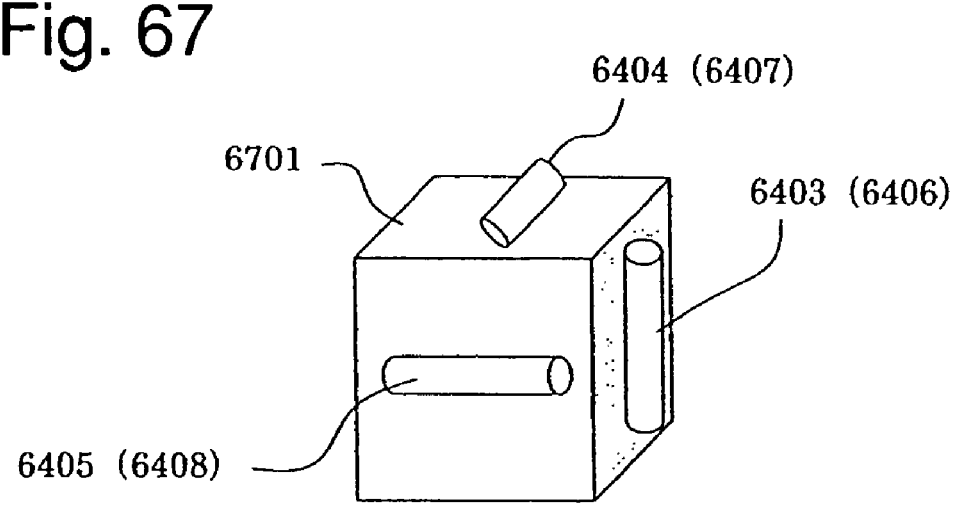
FIG. 67 is a perspective view illustrating the inputting device according to the third embodiment of the present invention.

FIGS. 64 to 66 are a plan view, front view, and right side view of a three-dimensional-information inputting device 6401 according to a third embodiment of the present invention. FIG. 67 is a perspective view illustrating the arrangement of input elements 6403 to 6405 in the inputting device 6401. In order for the inputting device 6401 to be clearly viewed, FIG. 67 shows the inputting device 6401 in a different attitude. In FIGS. 64 to 67, identical portions are denoted by identical reference numerals.

As shown in FIGS. 64 to 67, a plurality of input elements (three input elements 6403 to 6405 in the third embodiment) are provided in a sphere 6401 made of insulating material such as resin so as to be perpendicular to one another, with a predetermined distance provided between two input elements, in a state in which axes (longitudinal central axes) passing in the longitudinal directions of the input elements 6403 to 6405 through their centers do not directly cross one another.

Referring to FIG. 67, the arrangement of the input elements 6403 to 6405 is described below based on assumption of a virtual cube 6701. By providing the input elements 6403 to 6405 on different mutually-perpendicular planes of the cube 6701, the input elements 6403 to 6405 are perpendicular to one another without directly crossing with a predetermined distance between two elements.

In other words, a normal plane which passes through the center of the first input coil 6406 (the input element 6403) and which is perpendicular to the longitudinal axis of the input coil 6406 is considered. Between the other input coils 6407 and 6408, one input coil at a distance form the normal plane is referred to as a second coil, and the other one is referred to as a third coil. In FIG. 67, the second input coil is the input coil 6407, and the third input coil is the input coil 6408. In an axial direction of the first input coil 6406 (the input element 6403), a unit vector whose magnitude is 1 is considered. The direction of this unit vector on the reference and reverse sides is selected by the second input coil 6407 (the input element 6404), and this unit vector is used as an orientation vector of the first input coil 6406.

Similarly, next, in an axial direction of the second input coil 6407 (the input element 6404), a unit vector whose magnitude is 1 is considered. The direction of this unit vector on the reference and reverse sides is selected by the second input coil 6408 (the input element 6405), and this unit vector is used as an orientation vector of the second input coil 6407. Furthermore, similarly, in an axial direction of the third input coil 6408 (the input element 6405), a unit vector whose magnitude is 1 is considered. The direction of this unit vector on the reference and reverse sides is selected by the first input coil 6406 (the input element 6403), and this unit vector is used as an orientation vector of the third input coil 6408 (the input element 6405).

In the third embodiment, when a vector product that is calculated by multiplying the right of the orientation vector of the first coil 6406 (the input element 6403) by the orientation of the second coil 6407 (the input element 6404) substantially coincides with the orientation of the third coil 6408 (the input element 6405), it is defined that the three input coils 6406 to 6408 (the input elements 6403 to 6405) are provided in arrangement for use with a right hand. The inputting device 6401 according to the third embodiment is an example of a three-dimensional-information inputting device based on arrangement for use with a right hand. At this time, when the calculated vector product substantially coincides with a vector opposite in direction to the orientation of the third coil 6408 (the input element 6405), it is defined that the three input coils 6406 to 6408 (the input elements 6403 to 6405) are provided in arrangement for use with a left hand. An example of a three-dimensional-information inputting device based on arrangement for use with a left hand is described later.

The input element 6403 includes a core 6409 formed of magnetic material, the first input coil 6406, which is wound around a core 6409, and a capacitor 6412 connected in parallel to the first input coil 6406. The input element 6404 includes a core 6410 formed of magnetic material, the second input coil 6407, which is wound around the core 6410, and a capacitor 6413 connected in parallel to the second input coil 6407. The input element 6405 includes a core 6411 formed of magnetic material, the third input coil 6408, which is wound around the core 6411, and a capacitor 6414 connected in parallel to the third input coil 6408.

The input coils 6406 to 6408 are wound on the cores 6403 to 6405 around the centers (central positions) of the input elements 6403 to 6405. The input coil 6406 and the capacitor 6412 constitute a first parallel resonant circuit that resonates at first resonant frequency fu. The input coil 6407 and the capacitor 6413 constitute a second parallel resonant circuit that resonates at second resonant frequency fv. In addition, the input coil 6408 and the capacitor 6414 constitute a third parallel resonant circuit that resonates at third resonant frequency fw. The sphere 6402 has cylindrical holes 6415 to 6417 formed therein for holding the input elements 6403 to 6405 in the above arrangement, and the input elements 6403 to 6405 are accommodated in the holes 6415 to 6417 so as not to shift in positions in the sphere 6402.

Also in the inputting device 6401 according to the third embodiment, which includes the input coils 6406 to 6408 provided so as not to magnetically interfere with one another, processing similar to that described concerning the first embodiment is performed by the detecting device, whereby the reference and reverse sides and mirror images can be identified and three-dimensional information, such as a position and attitude, input from the inputting device 6401 can be easily detected. Accordingly, the three-dimensional information input by the inputting device 6401 can be detected by the detecting device. Although, in the inputting device 101 according to the first embodiment, the two input coils 106 and 107 (the input elements 103 and 104) are coplanar, in the inputting device according to the third embodiment, all the coils are provided on different planes. Accordingly, the inputting device 101 and the inputting device 6401 differ in that the coil positions shift. Thus, when using the three-dimensional-information detecting device to calculate three-dimensional information from detection signals, a three-dimensional-information detecting system using the inputting device 6401 needs to perform calculation considering the amount of shifting of the coils.

Figure 68:
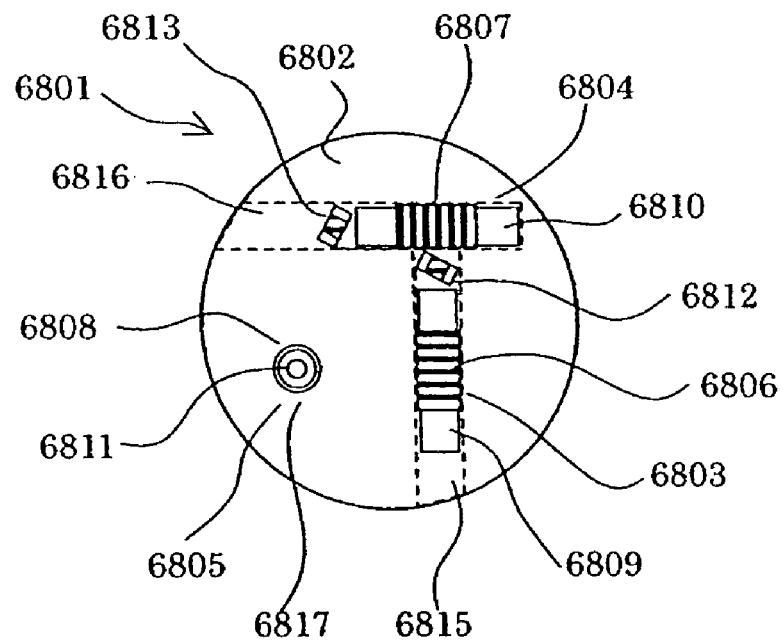
FIG. 68 is a plan view of a three-dimensional-information inputting device according to a fourth embodiment of the present invention.
Figure 69:
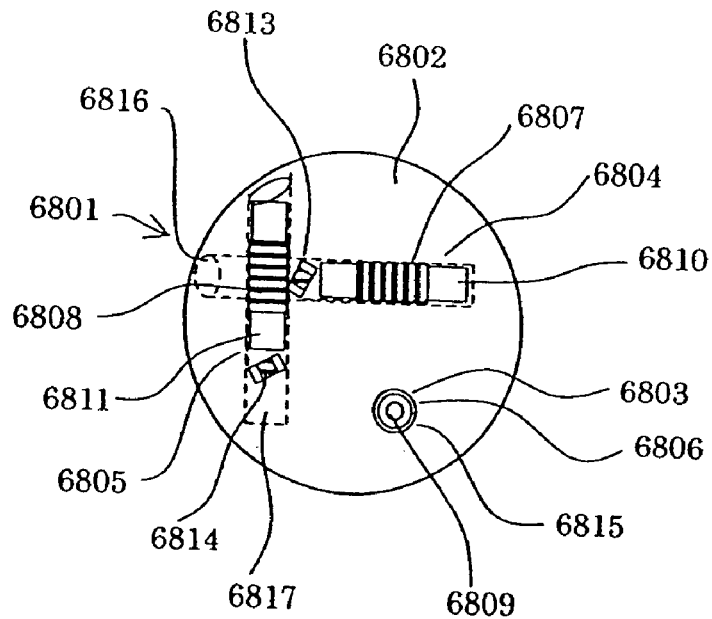
FIG. 69 is a front view of the inputting device according to the fourth embodiment of the present invention.
Figure 70:
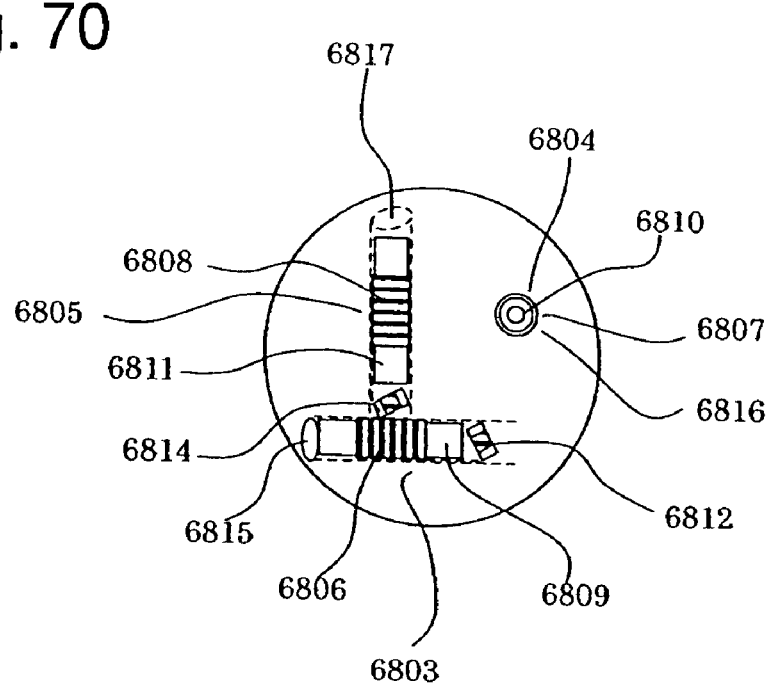
FIG. 70 is a right side view of the inputting device according to the fourth embodiment of the present invention.
Figure 71:
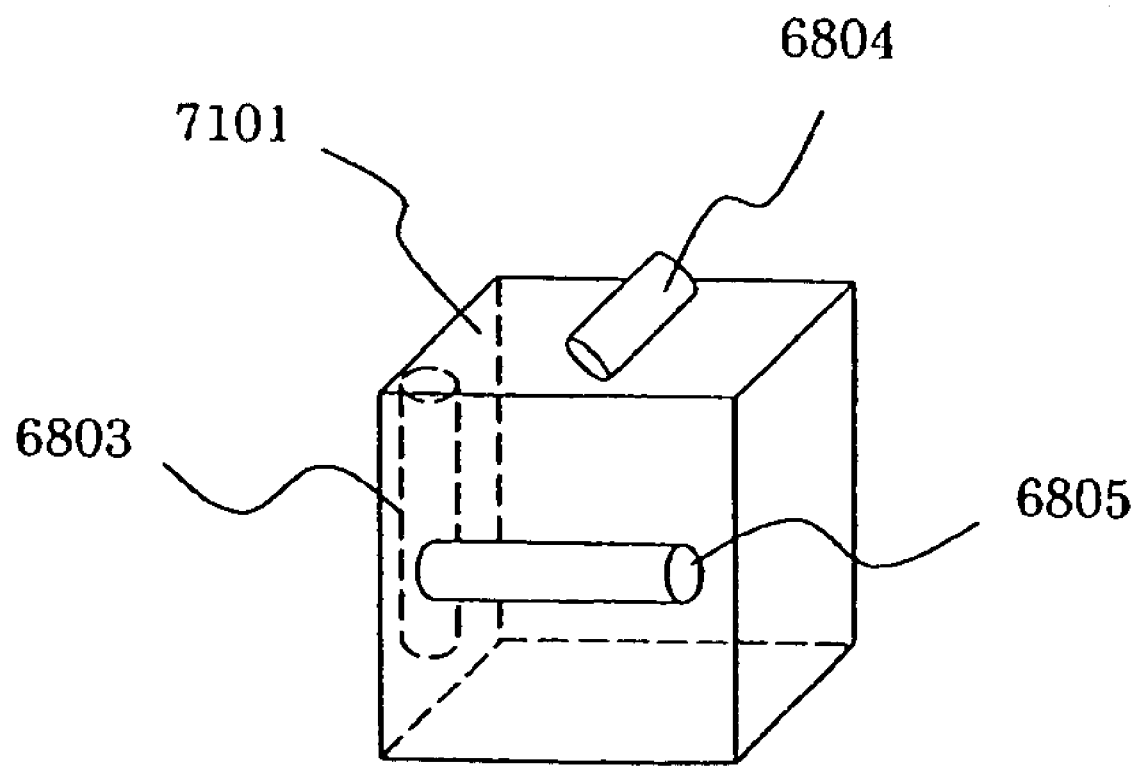
FIG. 71 is a perspective view illustrating the inputting device according to the fourth embodiment of the present invention.

FIGS. 68 to 70 are a plan view, front view, and right side view of a three-dimensional-information inputting device 6801 according to a fourth embodiment of the present invention. In addition, FIG. 71 is a perspective view illustrating the arrangement of input elements 6803 to 6805 in the inputting device 6801. In order for the inputting device 6801 to be clearly viewed, FIG. 71 shows the inputting device 6801 in a different attitude. In FIGS. 68 to 71, identical portions are denoted by identical reference numerals. Although, in the third embodiment, an example of a three-dimensional-information inputting device based on arrangement for use with a right hand, the inputting device 6801 according to the fourth embodiment is an example of a three-dimensional-information inputting device based on arrangement for use with a left hand.

In FIGS. 68 to 71, a plurality of input elements (three input elements 6803 to 6805 in the fourth embodiment) are provided in a sphere 6802 made of insulating material such as resin so as to be perpendicular to one another, with a predetermined distance provided between two input elements, in a state in which axes (longitudinal central axes) passing in the longitudinal directions of the input elements 6803 to 6805 through their centers do not directly intersect one another. Referring to FIG. 71, the arrangement of the input elements 6803 to 6805 is described below based on assumption of a virtual cube 7101. By providing the input elements 6803 to 6805 on different mutually-perpendicular planes of the cube 7101, the input elements 6803 to 6805 are perpendicular to one another without directly intersecting with a predetermined distance between two elements.

The input element 6803 includes a core 6809 made of magnetic material, a first input coil 6806 wound around the core 6809, and a capacitor 6812 connected in parallel to the first input coil 6806. The input element 6804 includes a core 6810 made of magnetic material, a first input coil 6807 wound around the core 6810, and a capacitor 6813 connected in parallel to the second input coil 6807. The input element 6805 includes a core 6811 made of magnetic material, a third input coil 6808 wound around the core 6811, and a capacitor 6814 connected in parallel to the third input coil 6808.

The input coils 6806 to 6808 are wound on the cores 6809 to 6811 around the centers (central positions) of the input elements 6803 to 6805. The input coil 6806 and the capacitor 6812 constitute a first parallel resonant circuit that resonates at first resonant frequency fu. The input coil 6807 and the capacitor 6813 constitute a second parallel resonant circuit that resonates at second resonant frequency fv. The input coil 6808 and the capacitor 6814 constitute a third parallel resonant circuit that resonates at third resonant frequency fw. The sphere 6802 has cylindrical holes 6815 to 6817 formed therein for holding the input elements 6803 to 6805 in the above arrangement, and the input elements 6803 to 6805 are accommodated in the holes 6815 to 6817 so as not to shift in positions in the sphere 6802.

Also in a three-dimensional-information detecting system using the inputting device 6801 according to the fourth embodiment, by using the detecting device to perform processing similar to that described concerning the first embodiment, three-dimensional information input by the inputting device can be detected by the detecting device. Although, in the inputting device 101 according to the first embodiment, the two coils 106 and 107 (the input elements 103 and 104) are coplanar and have arrangement for use with a right hand, in the inputting device 6801 according to the third embodiment, all the input coils are provided on different planes and have arrangement for use with a left hand. Therefore, in a three-dimensional-information detecting system using the inputting device 6801, when using the detecting device to calculate three-dimensional information from detection signals, by performing calculation considering difference in input coil arrangement and the amount of shifting of the input coils, implementation of processing similar to that in the first embodiment enables detection of three-dimensional information.

Figure 72:
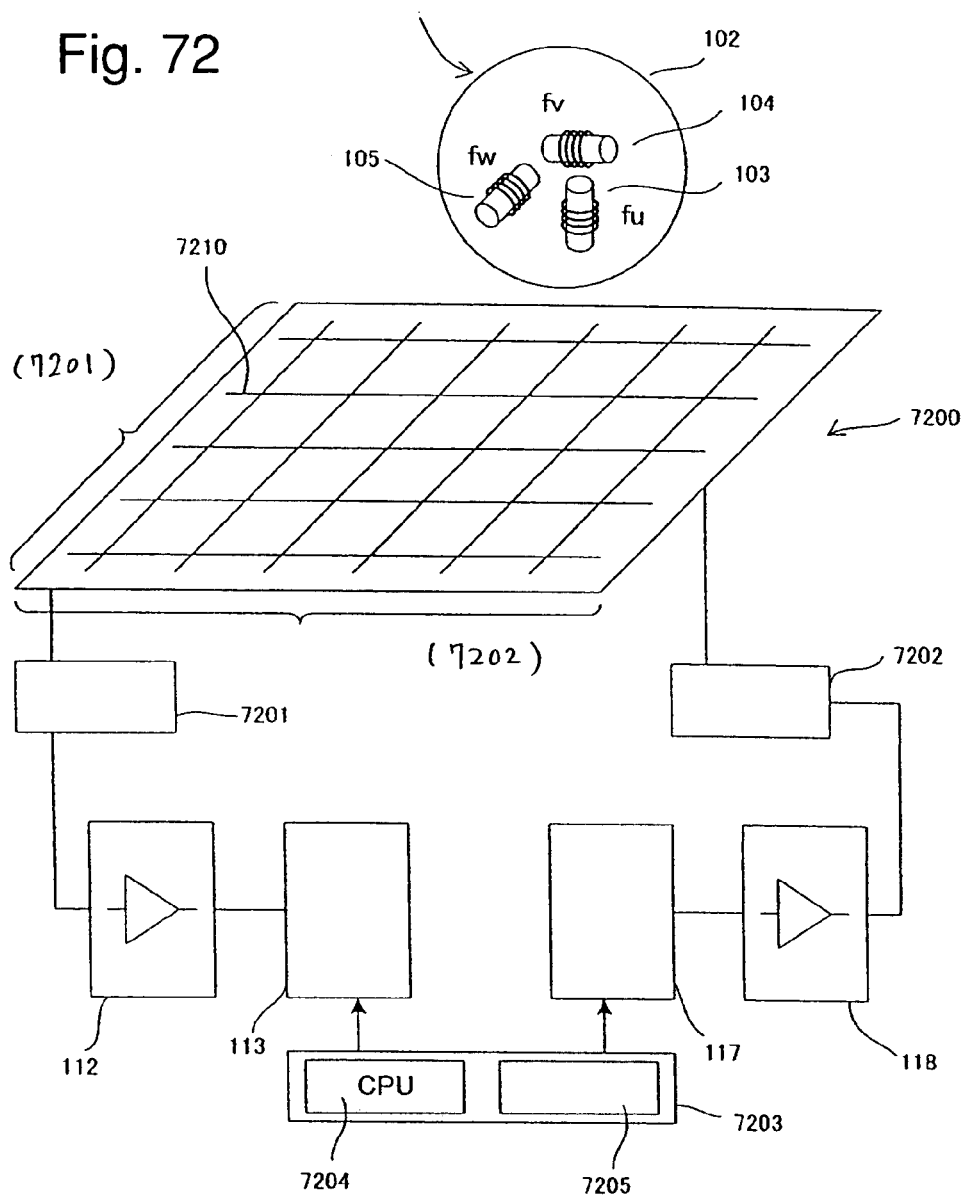
FIG. 72 is a block diagram showing the three-dimensional-information detecting system according to the second embodiment of the present invention.

FIG. 72 is a block diagram showing the three-dimensional-information detecting system according to the second embodiment of the present invention. In FIG. 72, by denoting portions identical to those shown in FIG. 1 by identical reference numerals, their description is omitted. The three-dimensional-information detecting system according to the second embodiment includes the inputting device 101, and a three-dimensional-information detecting device 7200 that detects three-dimensional information such as the position and attitude of the inputting device 101. The detecting device 7200 includes a plurality of coils 7200 (a plurality of signal-detecting sensor coils and a plurality of signal-transmitting coils) arranged so as to be mutually perpendicular on substantially the entire detecting surface. The sensor coils among the coils 7210 include a plurality of X-sensor coils and a plurality of Y-sensor coils. The sensor coils are connected to the detecting portion 113 included in the signal detecting unit via a switching portion 7201 that switches the sensor coils and the receiving circuit 112 including an amplifying circuit. The detecting portion 113 includes a detector circuit that detects plural types of frequency signals (e.g., frequencies fu, fv, and fw) in order to detect received signals.

The transmission control portion 117 included in the signal generating unit includes a transmission-signal generating circuit that generates plural types of frequency signals (e.g., frequencies fu, fv, and fw) and a selector circuit which performs switching to select one of the generated signals and which outputs the signal to the transmitting circuit 118. The transmitting circuit 118 includes an amplifying circuit and its output end is connected to a plurality of signal transmitting coils among the coils 7210 via the switching portion 7202. A control unit 7203 includes a central processing unit (CPU) 7204 and a memory 7205 which stores a program to be executed by the CPU 7204 and which stores data, etc. The control unit 7203 performs calculating three-dimensional information and controls the switching portions 7201 and 7202, the receiving circuit 112, the detecting portion 113, the transmission control portion 117, and the transmitting circuit 118.

When three-dimensional information of the inputting device 101 is detected, under the control of the control unit 7203, the transmission control portion 117 transmits a detecting signal from the signal transmitting coils selected by the control unit 7203 through the transmitting circuit 118 and the switching portion 7202. The inputting device 101 sends back the signal transmitted from the signal transmitting coils. The signal from the inputting device 101 is detected by the sensor coils selected by the control unit 7203 and is detected by the detecting portion 113 via the receiving circuit 112. Based on the signal detected by the detecting portion 113, the control unit 7203 calculates three-dimensional information such as the position and attitude of the inputting device 101. This performs detection of the three-dimensional information input by the inputting device 101.

Figure 73:
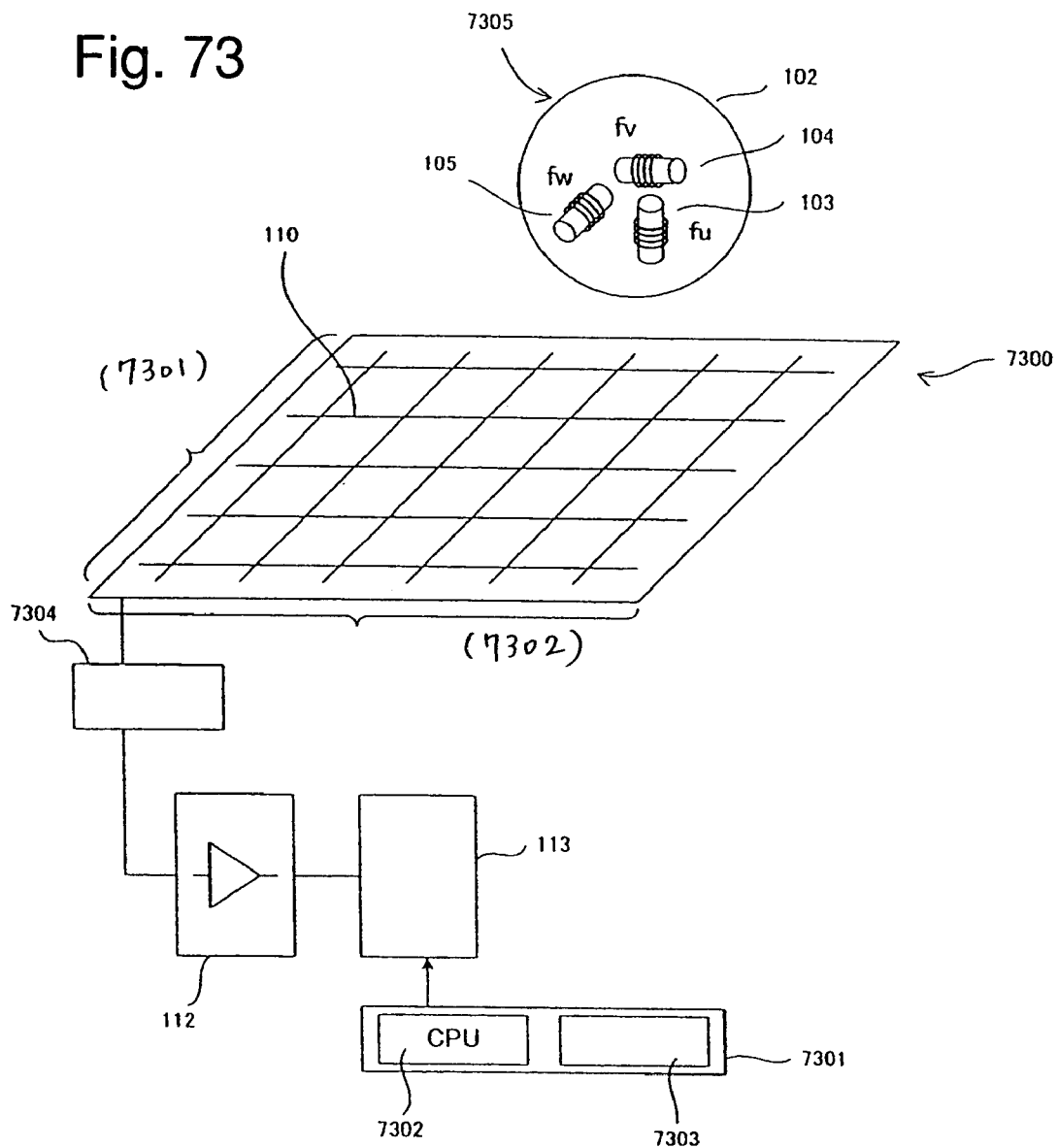
FIG. 73 is a block diagram showing the three-dimensional-information detecting system according to the third embodiment of the present invention.

FIG. 73 is a block diagram showing the three-dimensional-information detecting system according to the third embodiment of the present invention. By denoting portions identical to those shown in FIG. 1 by identical reference numerals, their description is omitted. The three-dimensional-information detecting system according to the third embodiment includes a three-dimensional-information inputting device 7305 and a three-dimensional-information detecting device 7300 that detects three-dimensional information such as the position and attitude of the inputting device 7305. The inputting device 7305 includes the input elements 103 to 105 in the above-described arrangement, a signal generating circuit (not shown) for allowing the input elements 103 to 105 to generate plural types of frequency signals (e.g., frequencies fu, fv, and fw), and a power supply (not shown). The detecting device 7300 includes the mutually perpendicular sensor coils 110 substantially on the entire detecting surface.

The sensor coils 110 includes the X-sensor coils and the Y-sensor coils and are connected to the detecting portion 113 included in the signal detecting unit via a switching portion 7304 that switches the sensor coils 110 and the receiving circuit 112 including the amplifying circuit. The detecting portion 113 includes the detector circuit that detect the plural types of frequency signals (e.g., frequencies fu, fv, and fw) in order to detect received signals. An output end of the detecting portion 113 is connected to a control unit 7301. The control unit 7301 includes a CPU 7302 and a memory 7303 which stores a program to be executed by the CPU 7302 and which stores data, etc., and performs calculating three-dimensional information and controls the receiving circuit 112 and the detecting portion 113.

When three-dimensional information of the inputting device 101 is detected, signal having different frequencies are transmitted with predetermined timing from the input elements 103 to 105 in the inputting device 7305.

In the detecting device 7300, under the control of the control unit 7301, by controlling the switching portion 7304 to perform switching, the signal from the inputting device 101 is detected by sensor coils selected by the control unit 7203 among the sensor coils 110, and is detected by the detecting portion 113 via the receiving circuit 112. Based on the signal detected by the detecting portion 113, the control unit 7301 calculates three-dimensional information such as the position and attitude of the inputting device 7305. This performs detection of the three-dimensional information input by the inputting device 7305.

Figure 74:
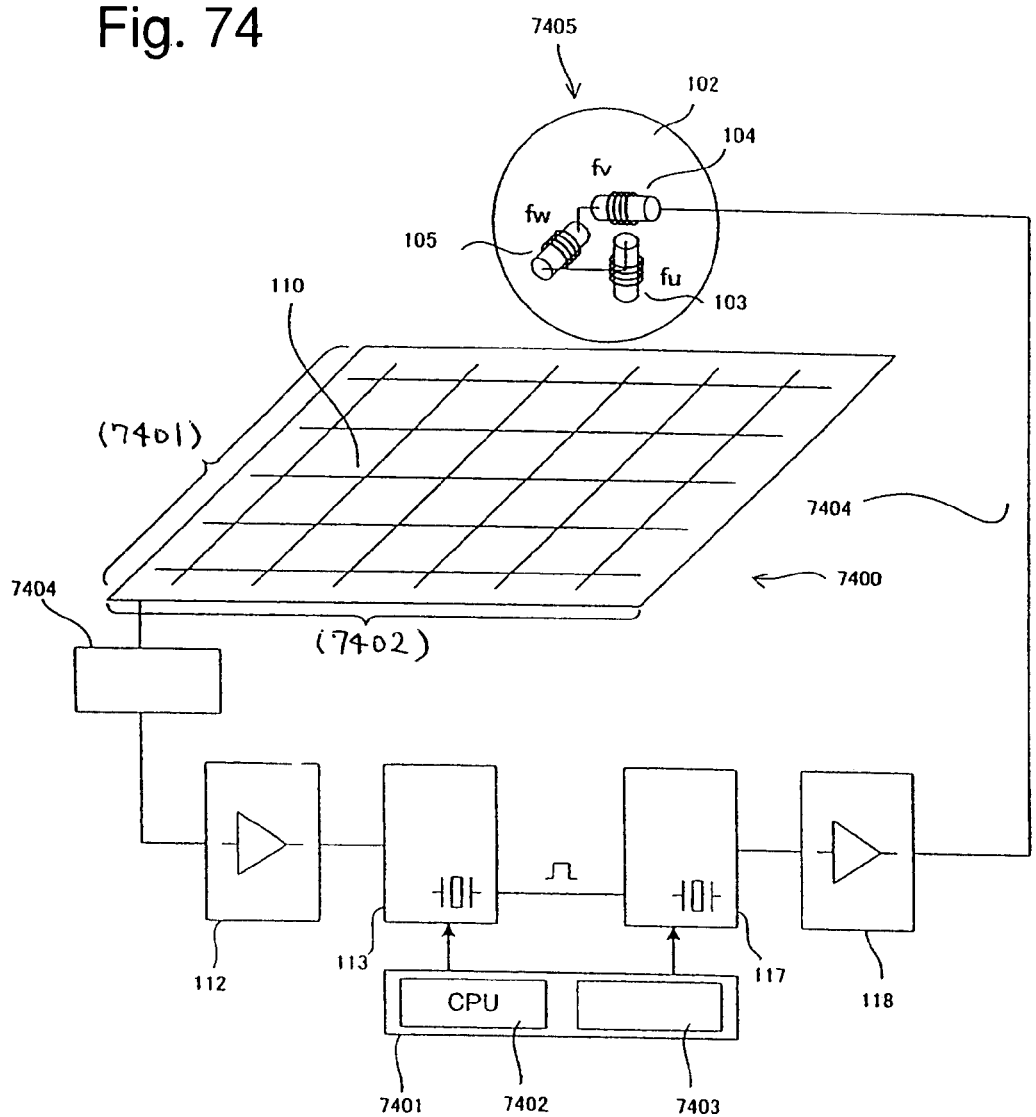
FIG. 74 is a block diagram showing the three-dimensional-information detecting system according to the fourth embodiment of the present invention.

FIG. 74 is a block diagram showing the three-dimensional-information detecting system according to the fourth embodiment of the present invention. By denoting portions identical to those shown in FIG. 1 by identical reference numerals, their description is omitted.

The three-dimensional-information detecting system according to the fourth embodiment includes a three-dimensional-information inputting device 7405 and a three-dimensional-information detecting device 7400 that detects three-dimensional information such as the position and attitude of the inputting device 7405. The inputting device 7405 and the detecting device 7400 are connected to each other by an electric cable 7404. Through the electric cable 7404, the inputting device 7405 receives signals transmitted from the detecting device 7400 to the input elements 103 to 105, and its electronic components are supplied with power.

The inputting device 7405 includes the input elements 103 to 105 in the above-described arrangement. The input elements 103 to 105 receive different frequency signals (e.g., frequencies fu, fv, and fw) from the transmitting circuit 118 through the electric cable 7404, and uses electromagnetic coupling to output the signals to the detecting device 7400.

The detecting device 7400 includes mutually perpendicular sensor coils 110 substantially on the entire detecting surface.

The sensor coils 110 includes the X-sensor coils and the Y-sensor coils and are connected to the detecting portion 113 included in the signal detecting unit via a switching portion 7404 that switches the sensor coils 110 and the receiving circuit 112 including the amplifying circuit. The detecting portion 113 includes the detector circuit that detects the plural types of frequency signals (e.g., frequencies fu, fv, and fw) in order to detect received signals.

The output end of the detecting portion 113 is connected to the control unit 7401. The control unit 7401 includes a CPU 7402 and a memory 7403 which stores a program to be executed by the CPU 7402 and which stores data, etc. The control unit 7401 performs calculating three-dimensional information and controls the receiving circuit 112, the detecting portion 113, the transmission control portion 117, and the transmitting circuit 118.

The transmission control portion 117 included in the signal transmitting unit includes the transmission-signal generating circuit that generates plural types of frequency signals (e.g., frequencies fu, fv, and fw) and the selector circuit which performs switching to select one of the generated signals and which outputs the signal to the transmitting circuit 118. The transmitting circuit 118 includes the amplifying circuit and its output end is connected to each input coil of the inputting device 7405 through an electric cable 7404.

The detecting portion 113 and the transmission control portion 117 are connected in order to establish signal-transmission/reception synchronization between the inputting device 7405 and the detecting device 7400.

When three-dimensional information of the inputting device 101 is detected, under the control of the control unit 7401, the sensor coils 110 are switched by the switching portion 7404, and the transmission control portion 117 outputs plural types of frequency signals (e.g., frequencies fu, fv, and fw) with predetermined timing to the inputting device 7405 via the transmitting circuit 118 through an electric cable 7406. The plural types of frequency signals are output from the input coils in the inputting device 7405 to the detecting device 7400 with predetermined timing.

In the detecting device 7400, under the control of the control unit 7401, the signal from the inputting device 101 is detected by electromagnetic coupling by sensor coils detected by the memory 7403 among the sensor coils 110 and is detected by the detecting portion 113 via the receiving circuit 112. Based on the signal detected by the detecting portion 113, the control unit 7401 calculates three-dimensional information such as the position and attitude of the inputting device 7405. This performs detection of the three-dimensional information input by the inputting device 7405. In this embodiment, identifying of the reference and reverse sides, etc., can be easily performed since transmission/reception synchronization is established between the inputting device 7405 and the detecting device 7400.

In each of the above-described embodiments, when the coordinates and attitude of a three-dimensional-information inputting device are calculated, the tables (the reference data table, the correcting table) stored beforehand in the memory 116, etc., are referred to. However, after beforehand storing, in the memory 116, in the form of a program, expressions (approximate expressions) for calculating coordinates, azimuth angle $\phi$, and angle $\theta$ of inclination, the expressions may be executed by the CPU 115. In addition, each of the above-described embodiments performs using a three-dimensional-information inputting device to receive a signal generated from a sensor coil of a three-dimensional-information detecting device, sending back the signal from the inputting device to the detecting device, receiving a signal from the inputting device by using the same sensor coil that transmits the signal to the inputting device, and detecting the position and direction of each input element on the side of the detecting device, whereby the position and attitude of the inputting device are detected. However, the signal transmission and reception may be performed by using different sensor coils.

Furthermore, the input coils of the inputting device and the sensor coils of the detecting device can constitute oscillating circuits. When the inputting device is present, the detecting device can self-oscillate.

Moreover, by incorporating, in the inputting device, a power supply or a power-supply circuit supplied with power from the outside of the inputting device, a signal generating circuit that generates a signal for transmission/reception, a transmitting/receiving circuit for the signal, a calculating portion, and a transmitting circuit that transmits the result of calculation in a wireless manner such as infrared radiation or radio, and two-dimensionally providing the detecting device with a plurality of coils constituting resonant circuits, a configuration may be formed in which, after a signal transmitted from the inputting device is received and sent back by the detecting device, and is received by the transmitting/receiving circuit of the inputting device, three-dimensional information (the direction and three-dimensional coordinates) of each input element is calculated by the calculating portion and is transmitted by the transmitting circuit to another device such as a higher-level device.

The inputting device may include a power supply or a power-supply circuit supplied with power from the outside of the inputting device, a signal generating circuit that generates a signal for transmission/reception, a transmitting/receiving portion for the signal, a signal processing portion that processes a received signal into a predetermined transmission format, and a transmitting circuit that transmits the result of the signal processing in a wireless manner such as infrared radiation or radio. In addition, the detecting device may include a plurality of sensor coils constituting resonant circuits which are provided two-dimensionally or in curved form, and a calculating portion that calculates the position and direction of the inputting device in response to the signal from the transmitting circuit.

In addition, the inputting device may include a power supply or a power-supply circuit supplied with power from the outside of the inputting device, a receiving portion for a signal, a signal processing portion that processes the received signal into a predetermined transmission format, and a transmitting circuit that transmits the result of the signal processing in a wireless manner such as infrared radiation or radio, and the detecting device may include a plurality of sensor coils constituting resonant circuits, a selecting circuit that selectively switches the sensor coils, a signal generating circuit that generates a signal for transmission and reception, and a calculating portion that calculates three-dimensional information of each input element in response to the signal from the transmitting circuit.

In addition, by incorporating, in the inputting device, a power supply or a power-supply circuit supplied with power from the outside of the inputting device, a receiving portion for a signal, a three-dimensional-information calculating portion, and a transmitting circuit that transmits the result of the calculation in a wireless manner such as infrared radiation or radio, and the detecting device with a plurality of sensor coils constituting resonant circuits and a signal generating circuit, after transmitting, to the inputting device, the signal from the signal generating circuit while selectively switching the sensor coils, and calculating three-dimensional information by the inputting device, the three-dimensional information may be wirelessly transmitted to another device such as a higher-level device.

The inputting device may have, in addition to a sphere, various forms such as a cylinder and an ellipsoid.

When the inputting device includes the oscillating circuit, the input coils can be prevented from constituting resonant circuits.

When the detecting device includes the oscillating circuit, the sensor coils can be prevented from constituting resonant circuits.

Furthermore, when the input coils and the detecting device include a resonant circuit, a signal that is transmitted/received does not need to completely coincide with the resonant frequency of the resonant circuit, and may be within a range having such a difference that a substantial received signal can be obtained, that is, may be relevant to the resonant frequency.

Moreover, after a detecting signal is transmitted from the sensor coils and is received by the inputting device, three-dimensional information such as the position and attitude of the inputting device can be calculated based on the signal detected by the inputting device.

As described above, a three-dimensional-information detecting system according to an embodiment of the present invention particularly includes a three-dimensional-information inputting device including a plurality of input coils for inputting three-dimensional information, a plurality of sensor coils provided along a detecting surface so as to intersect one another, the sensor coils being electromagnetically coupled with the plurality of input coils, a selecting unit which selects sensor coils from among the plurality of sensor coils in a coil-switching manner, a signal generating unit which uses electromagnetic coupling to generate signals to be transmitted and received between the plurality of input coils and the selected sensor coils, a signal detecting unit which detects signals received by the selected sensor coils or the plurality of input coils, and a calculating unit which, based on the signals detected by the signal detecting means, calculates three-dimensional information of the three-dimensional-information inputting means in three-dimensional space. In the inputting device, the plurality of input coils include first, second, and third input coils, and the central axes of the first and second input coils are coplanar.

In addition, a three-dimensional-information detecting system according to an embodiment of the present invention particularly includes a three-dimensional-information inputting device including a plurality of input coils for inputting three-dimensional information, a plurality of sensor coils provided along a detecting surface so as to intersect one another, the sensor coils being electromagnetically coupled with the plurality of input coils, a selecting unit which selects sensor coils from among the plurality of sensor coils in a coil-switching manner, a signal generating unit which uses electromagnetic coupling to generate signals to be transmitted and received between the plurality of input coils and the selected sensor coils, a signal detecting unit which detects signals received by the selected sensor coils or the plurality of input coils, and a calculating unit which, based on the signals detected by the signal detecting means, calculates three-dimensional information of the three-dimensional-information inputting means in three-dimensional space. In the three-dimensional-information inputting means, the plurality of input coils include first, second, and third input coils, and the central axes of the first, second, and third input coils are at right angles to one another so as not to directly intersect one another.

For example, the first, second, and third input coils may be provided for use with a right hand. The first, second, and third input coils may also be provided for use with a left hand. The form of the three-dimensional-information inputting means may be a sphere, and the first, second, and third input coils may be provided in the sphere. In addition, a composite central position of the first, second, and third input coils, and the central position of the sphere may coincide with each other. Each input coil may have a form wound around a magnetic substance. The first, second, and third input coils may have air cores. The first, second, and third input coils may respectively connect to capacitors for resonance which combine with the first, second, and third input coils to form resonant circuits having different frequencies.

The three-dimensional-information detecting system may further include a plurality of series resonant circuits which are connected in series to the resonant circuits and which have resonant frequencies equal to those of corresponding resonant circuits, and a transmission signal generating circuit which generates a transmission signal. The transmission signal from the transmission signal generating circuit may be output from one input coil corresponding to one series resonant circuit by the series resonant circuit. The three-dimensional-information detecting system may include a battery for supplying driving power to the transmission signal generating circuit. The calculating unit may calculate at least the coordinates of the three-dimensional-information inputting unit in three-dimensional space based on the signals detected by the signal detecting unit.

The calculating unit may calculate the attitude and coordinates of the three-dimensional-information inputting unit in three-dimensional space based on the signals detected by the signal detecting unit. The X-coordinate and Y-coordinate of each input coil may be calculated based on at least three signals in the vicinity of a peak value in the signals detected by the signal detecting unit, and the attitude and/or coordinates of the three-dimensional-information inputting unit may be calculated by obtaining the height of the input coil from the width of signal distribution at a predetermined level value of the detected signals. The calculating unit may obtain the angle of inclination and azimuth angle of the three-dimensional-information inputting unit from relationships of the signals detected for the input coils by the signal detecting unit. The calculating unit may obtain the angle of inclination and azimuth angle of the three-dimensional-information inputting unit from the sub-signal ratio of the detected signals corresponding to the input coils. The calculating unit may obtain the angle of inclination and azimuth angle of the three-dimensional-information inputting unit from the ratios of left-and-right half-side widths of the detected signals corresponding to the input coils.

The signal generating unit may generate signals having a plurality of frequencies corresponding to the input coils, and the signals having different frequencies may be transmitted and received between each input coil and the selected sensor coils. Signals may be transmitted from the input coils by supplying currents from the signal generating unit to the input coils, and the signal detecting unit may detect signals generated in the sensor coils. Signals may be transmitted from the sensor coils by supplying currents from the signal generating unit to the sensor coils, and the signal detecting unit may detect signals generated in the input coils.

After signals are transmitted from the sensor coils by supplying currents from the signal generating unit to the sensor coils, the input coils may receive the transmitted signals and may send back the received signals to the sensor coils, and the signal detecting unit may detect the signals received by the sensor coils. As described above, by providing the input coils included in the inputting device so as not to interfere with one another, the three-dimensional-information detecting system, which has a simplified configuration, enables identifying the reference and reverse sides and identifying mirror images. In addition, three-dimensional information, such as a position and attitude, input from the inputting device can be easily detected. Furthermore, since a simplified configuration using the inputting device and the perpendicular sensors enables identifying the reference and reverse sides and identifying mirror images, three-dimensional information can be detected in the simplified configuration.

The present invention is applicable not only to three-dimensional-information systems but also to various types of systems, such as computer graphics systems and information input systems such as games, which detect three-dimensional information and use the result of detecting three-dimensional information.

What we claim is:

1. A three-dimensional-information detecting system comprising:

three-dimensional-information inputting means including a plurality of input coils for inputting three-dimensional information;

a plurality of sensor coils provided along a detecting surface so as to intersect one another, the sensor coils being electromagnetically coupled with the plurality of input coils;

selecting means which selects sensor coils from among the plurality of sensor coils in a coil-switching manner;

signal generating means which uses electromagnetic coupling to generate signals to be transmitted and received between the plurality of input coils and the selected sensor coils;

signal detecting means which detects signals received by the selected sensor coils or the plurality of input coils; and calculating means which, based on the signals detected by the signal detecting means, calculates thee-dimensional information of the three-dimensional-information inputting means in three-dimensional space, wherein:

in the three-dimensional-information inputting means, the plurality of input coils include first, second, and third input coils; and the central axes of the first, second, and third input coils are at right angles to one another so as not to magnetically interfere with one another and so as not to directly intersect one another.

2. The three-dimensional-information detecting system according to claim 1, wherein the first, second, and third input coils are provided for use with a right hand.

3. The three-dimensional-information detecting system according to claim 1, wherein the first, second, and third input coils are provided for use with a left hand.

4. The three-dimensional-information detecting system according to claim 1, wherein:

the form of the three-dimensional-information inputting means is a sphere; and the first, second, and third input coils are provided in the sphere.

5. The three-dimensional-information detecting system according to claim 4, wherein a composite central position of the first, second, and third input coils, and the central position of the sphere coincide with each other.

6. The three-dimensional-information detecting system according to claim 1, wherein each input coil has a form wound around a magnetic substance.

7. The three-dimensional-information detecting system according to claim 1, wherein the first, second, and third input coils have air cores.

8. The three-dimensional-information detecting system according to claim 1, wherein the first, second, and third input coils respectively connect to capacitors for resonance which combine with the first, second, and third input coils to form resonant circuits having different frequencies.

9. The three-dimensional-information detecting system according to claim 1, wherein the calculating means calculates at least an attitude of the three-dimensional-information inputting means in three-dimensional space based on the signals detected by the signal detecting means.

10. The three-dimensional-information detecting system according to claim 1, wherein the calculating means calculates at least coordinates of the three-dimensional-information inputting means in three-dimensional space based on the signals detected by the signal detecting means.

11. The three-dimensional-information detecting system according to claim 1, wherein the calculating means calculates an attitude and coordinates of the three-dimensional-information inputting means in three-dimensional space based on the signals detected by the signal detecting means.

12. The three-dimensional-information detecting system according to claim 1, wherein:

an X-coordinate and Y-coordinate of each input coil are calculated based on at least three signals in the vicinity of a peak value in the signals detected by the signal detecting means; and an attitude and/or coordinates of the three-dimensional-information inputting means are calculated by obtaining a height of the input coil from the width of signal distribution at a predetermined level value of the detected signals.

13. The three-dimensional-information detecting system according to claim 1, wherein, regarding an attitude of the three-dimensional-information inputting device, the calculating means obtains an angle of inclination and azimuth angle of the three-dimensional-information inputting means from relationships of the signals detected for the input coils by the signal detecting means.

14. The three-dimensional-information detecting system according to claim 13, wherein the calculating means obtains the angle of inclination and azimuth angle of the three-dimensional-information inputting means from a sub-signal ratio of the detected signals corresponding to the input coils.

15. The three-dimensional-information detecting system according to claim 13, wherein the calculating means obtains the angle of inclination and azimuth angle of the three-dimensional-information inputting means from ratios of left-and-right half-side widths of the detected signals corresponding to the input coils.

16. The three-dimensional-information detecting system according to claim 1, wherein the signal generating means generates signals having a plurality of frequencies corresponding to the input coils, and signals having different frequencies are transmitted and received between the plurality of input coils and the selected sensor coils.

17. The three-dimensional-information detecting system according to claim 1, wherein signals are transmitted from the input coils by supplying currents from the signal generating means to the input coils, and the signal detecting means detects signals generated in the sensor coils.

18. The thee-dimensional-information detecting system according to claim 1, wherein signals are transmitted from the sensor coils by supplying currents from the signal generating means to the sensor coils, and the signal detecting means detects signals generated in the input coils.

19. The three-dimensional-information detecting system according to claim 1, wherein, after signals are transmitted from the sensor coils by supplying currents from the signal generating means to the sensor coils, the input coils receive the transmitted signals and send back the received signals to the sensor coils, and the signal detecting means detects the signals received by the sensor coils.

20. A thee-dimensional-information inputting device comprising a plurality of input coils for inputting three-dimensional information, wherein:

the three-dimensional-information inputting device inputs three-dimensional information to a three-dimensional-information detecting device by using electromagnetic coupling to transmit and receive signals between the plurality of input coils and the three-dimensional-information detecting device;

the plurality of input coils include first, second, and third input coils;

the central axes of the first, second, and third input coils are at right angles to one another so as not to magnetically interfere with one another and so as not to directly intersect one another, and the first, second, and third input coils are provided for use with a right hand.

21. A three-dimensional-information inputting device comprising a plurality of input coils for inputting three-dimensional information, wherein:

the three-dimensional-information inputting device inputs three-dimensional information to a three-dimensional-information detecting device by using electromagnetic coupling to transmit and receive signals between the plurality of input coils and the three-dimensional-information detecting device;

the plurality of input coils include first, second, and third input coils;

the central axes of the first, second, and third input coils are at right angles to one another so as not to magnetically interfere with one another and so as not to directly intersect one another; and the first, second, and third input coils are provided for use with a left hand.

22. The thee-dimensional-information inputting device according to claim 20, wherein:

the form of the three-dimensional-information inputting device is a sphere; and the first, second, and third input coils are provided in the sphere.

23. The three-dimensional-information inputting device according to claim 22, wherein a composite central position of the first second, and third input coils, and the central position of the sphere coincide with each other.

24. The three-dimensional-information inputting device according to claim 20, wherein each input coil has a form wound around a magnetic substance.

25. The thee-dimensional-information inputting device according to claim 20, wherein the first, second, and third input coils have air cores.

26. The three-dimensional-information inputting device according to claim 20, wherein the first, second, and third input coils respectively connect to capacitors for resonance which combine with the first, second, and third input coils to form resonant circuits having different frequencies.

* * * * *